United States Patent

Hibi et al.

[11] Patent Number: 5,886,742
[45] Date of Patent: Mar. 23, 1999

[54] VIDEO CODING DEVICE AND VIDEO DECODING DEVICE WITH A MOTION COMPENSATED INTERFRAME PREDICTION

[75] Inventors: Keiichi Hibi, Matsudo; Nobuyuki Ema, Nagareyama, both of Japan

[73] Assignee: Sharp Kabushiki Kaisha, Osaka, Japan

[21] Appl. No.: 7,103

[22] Filed: Jan. 14, 1998

Related U.S. Application Data

[63] Continuation of Ser. No. 697,731, Aug. 29, 1996.

[30] Foreign Application Priority Data

Jan. 12, 1995 [JP] Japan .................................. 8-003918
Mar. 18, 1995 [JP] Japan .................................. 8-061267
Aug. 29, 1995 [JP] Japan .................................. 7-220387
Oct. 18, 1995 [JP] Japan .................................. 7-270262

[51] Int. Cl.⁶ .................................................. H04N 7/32
[52] U.S. Cl. ........................................... 348/402; 348/699
[58] Field of Search ............................... 348/699, 432, 348/402, 407, 413, 416; H04N 7/32

[56] References Cited

U.S. PATENT DOCUMENTS 5,006,929  4/1991  Barbero .................................. 348/407
5,481,310  1/1996  Hibi ....................................... 348/416

FOREIGN PATENT DOCUMENTS 3-32185   2/1991  Japan .
6-197331  7/1994  Japan .
6-327000  11/1994 Japan .

*Primary Examiner*—Howard Britton

[57] ABSTRACT

In a video-coding and video-decoding device, motion-compensated interframe prediction is achieved by determining motion vectors of respective pixels according to representative motion vectors with weighting, and determining accurate motion vectors between video frames, dividing each frame into areas optimal to an objective figure, size and location and performing effective encoding and decoding of the motion vectors. According to the invention a motion-compensated interframe predicting portion generates a predicted video-frame by varying codable area according to a reference video-frame received from a frame memory portion and an input video frame and obtains side-information. A motion vector searching portion searches a motion vector. An effective-area selecting portion selects a valid or invalid mask depending upon a position of a processable object, divides a processable area of the input video frame into suitable areas, a variable-area predicted-frame generating portion generates a predicted frame by affine transformation and translational displacement. An area-diving pattern deciding portion outputs side-information such as the predicted image, motion vectors and divided areas, a side-information coding portion encodes an additional motion vector as a difference from an average basic-motion vector or predictively encodes a motion vector from a median value of three neighboring motion-vectors. A difference between the input video-frame and the predicted video-frame from the predicting portion is encoded, transferred and stored.

2 Claims, 30 Drawing Sheets

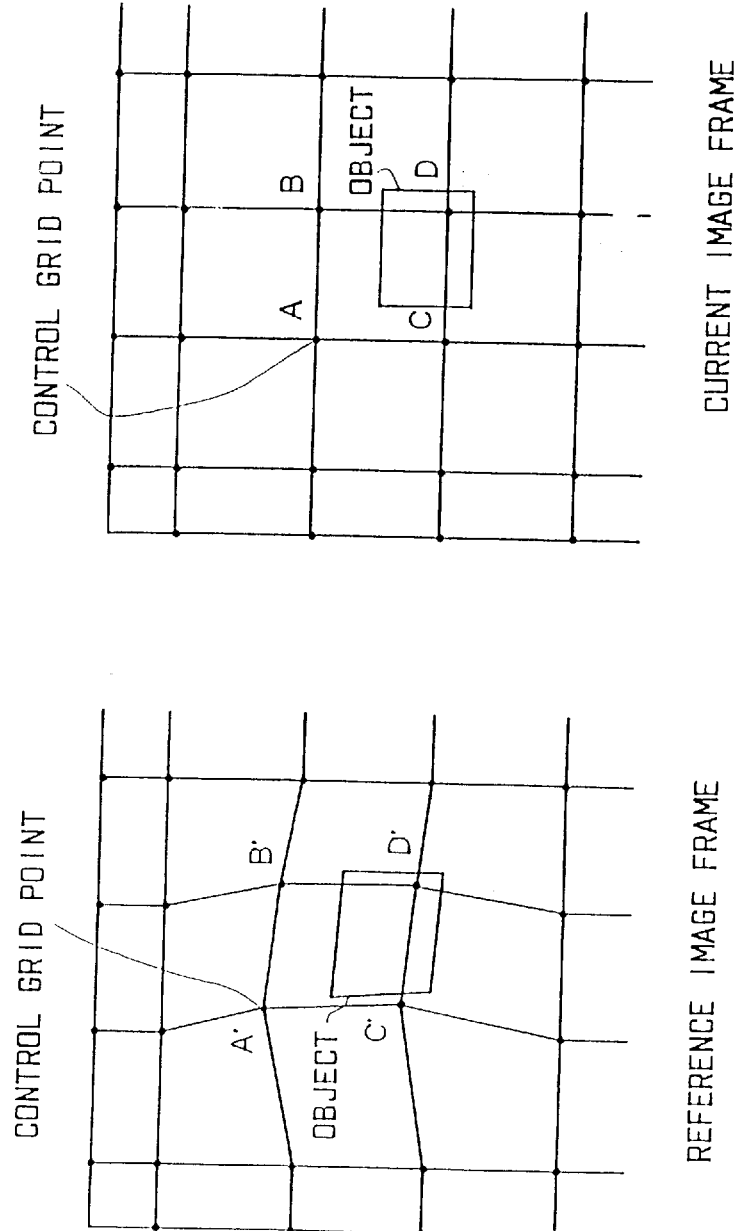

FIG.20
DIVIDING INTO 2 TRIANGLES
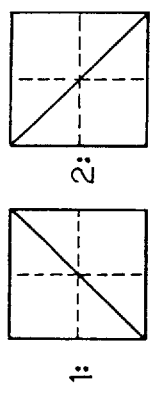
DIVIDING INTO 5 TRIANGLES
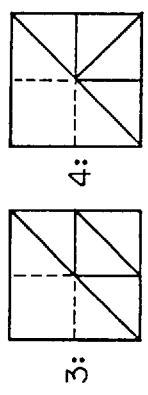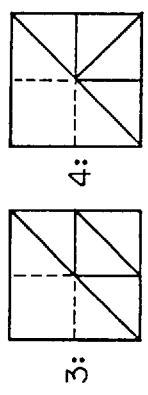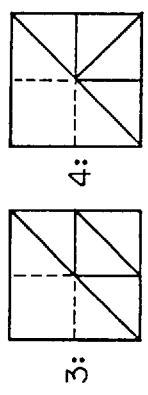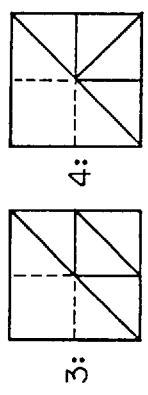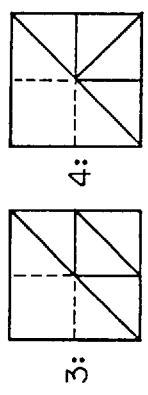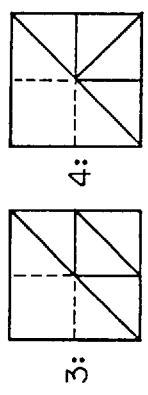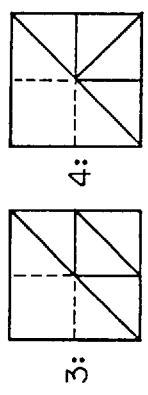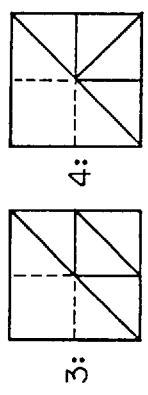
DIVIDING INTO 8 TRIANGLES
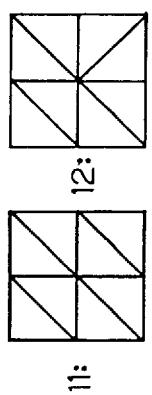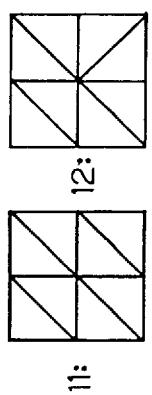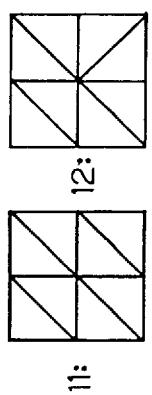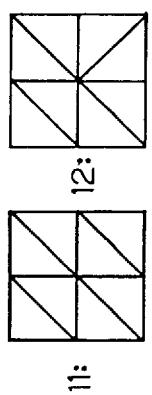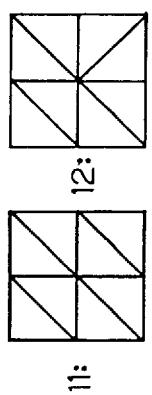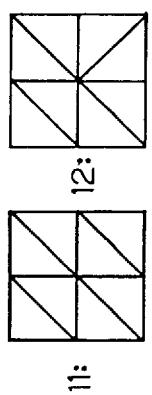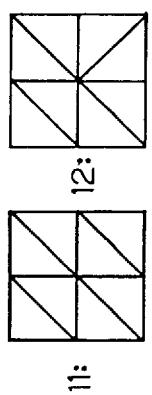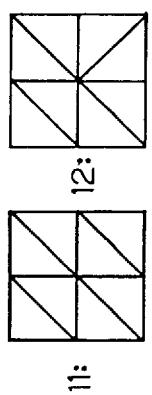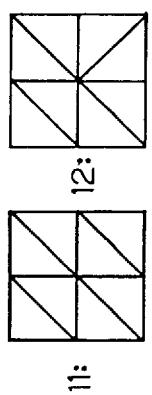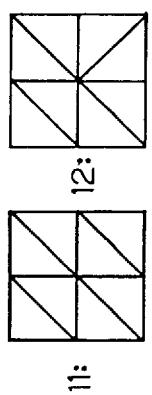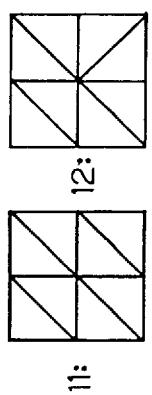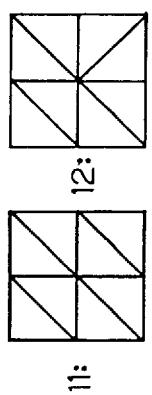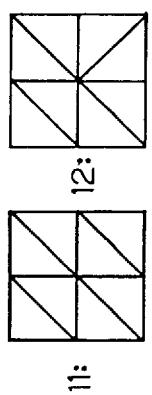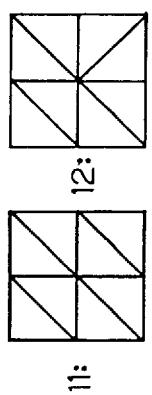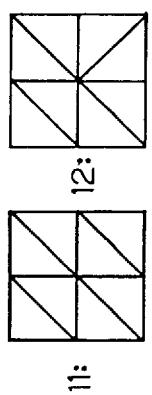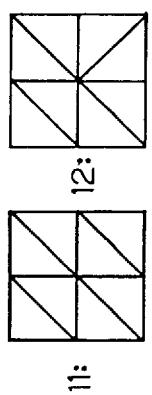

VIDEO CODING DEVICE AND VIDEO DECODING DEVICE WITH A MOTION COMPENSATED INTERFRAME PREDICTION

This application is a continuation of copending application Ser. No. 08/697,731, filed on Aug. 29, 1996, the entire contents of which are hereby incorporated by reference.

BACKGROUND OF THE INVENTION

The recent progress of high-speed digital signal processing systems with advances in LSI technology and development of video processing technique has meet an increasing interest for more effective usage of video information. In the field of telecommunications, construction and development of digital networks that is represented by ISDN (Integrated Service Digital Network) have realized video communications services such as videophones, video conferencing services, video data base services and so on. Furthermore, the spread of mobile communications networks with advances in digital information technology has increased users' need to realize mobile video communications services.

It is impractical to handle video information because the video information generally contains a very large amount of information. However, it is possible to reduce the amount of video information by reducing redundancy of the video information. High efficient video compression techniques are particularly important to the mobile communications networks that have a small amount of transmission line capacity. By this reason, international organizations ITU-T and ISO/IEC have energetically work to settle international standards on video coding methods for encoding video signal at a very low bit-rate.

A video signal contains time-sequential information such as a change of motion in picture and spatial information concerning a content of one frame (video frame or video field; both will be hereinafter called a frame), each of them has a redundancy. A motion compensative interframe prediction with orthogonal transform encoding method that has been preferably used is such that the temporal redundancy of information is first reduced through the interframe prediction with motion compensation. According to the principle of the motion compensative interframe prediction encoding method, the motion compensative interframe predicting portion prepares predicted value of an input video signal from an already encoded signal stored in a frame memory and outputs a difference between the predicted value and the input video signal as a prediction error signal. A prediction error signal encoding portion encodes the prediction error signal by orthogonal transforming method to further reduce spatial redundancy of the information. The encoded prediction error signal is locally decoded, then stored in the frame memory and is used for prediction of a proceeding frame.

In very low bit-rate video encoding, it is necessary to represent a video-signal with a very small amount of information. An amount of information allocated to the orthogonal transform encoding (i.e. prediction error encoding), therefore, is considerably limited. Accordingly, it is very important to improve the efficiency of the interframe prediction by using an interframe prediction method that can more correctly predict a change of a video signal with time.

In the latest years, many studies have been made on interframe prediction methods using affine transformation and bilinear transformation. While the motion compensative interframe prediction method represents a movement contained in a video as a translational motion by using a motion vector per unit-area, the method using the affine transformation and bilinear transformation can more accurately represent a movement in a video, i.e., with increased prediction efficiency since it can represent movement, rotation, enlargement and deformation.

An interframe predicting portion of the conventional video-coding device comprises a frame memory portion for storing already coded video signals, a motion vector detecting portion for determining a representative motion vector per unit area from a difference between an input video signal and a video signal read from the frame memory portion, a motion vector interpolating portion for determining a motion vector per pixel from the representative motion vector and a pixel value predicting portion for preparing a predicted video signal from a video signal read from the frame memory portion by using the motion vector per pixel.

The operation of the above-mentioned interframe predicting portion is as follows:

The frame memory portion stores already coded video signals as reference video frames for interframe prediction. The motion vector detecting portion receives an input video-frame signal to be encoded and reads a reference video frame stored in the frame memory. The motion vector detecting portion divides the coding video frame into unit-areas and scans the reference video frame to find an area most similar to a current coding unit-area. A displacement of a unit-area of the coding video-frame from the area found in the reference video frame is outputted as a motion vector. The motion vector is a representative motion vector representing a interframe displacement of a representative point within a unit-area (usually, a center of the unit-area). The relationship between a representative point and a vector searched unit-area are specified. In searching a similar area in a reference video frame, a sum of differential absolute values or a square-sum of differential values of each pixel in a unit-area is used as a scale of similarity. Furthermore, a center portion of the unit-area may be weighted by multiplying a differential pixel value at the center portion of the unit-area by a large coefficient and a differential pixel value at the periphery thereof by a small coefficient prior to summation so as to more accurately determine a displacement of the representative point.

The representative motion vector is transferred to the motion vector interpolating portion which in turn determines motion vectors for respective pixels using the received representative motion vectors. For affine transformation, a motion vector for each pixel existing within a triangle area surrounded by three neighboring representative points (hereinafter called transformable unit-area) is determined by solving an affine transformation expression from the representative motion vectors of the respective representative points. For bilinear transformation, a motion vector for each pixel existing within a quadrangular area surrounded by four neighboring representative points (hereinafter called transformable unit-area) is determined by solving a bilinear transformation expression from the representative motion vectors of the respective representative points. For a transformation unit-area being quadrangular or rectangular, it is equivalent that a motion vector value of each representative point is distributed in a vertical direction and a horizontal direction in proportion to an a distance between a remarked pixel and a representative point.

The pixel value predicting portion receives the (remarked) pixel motion vectors inputted pixel by pixel and, considering the motion vectors to be a displacement of the remarked pixel from its corresponding position in the reference frame, reads a pixel value at the corresponding position from the frame memory as a predicted value of the remarked pixel to compose a predicted frame. If the pixel value indicates a position in the reference frame, where no pixel exists, e.g., the pixel motion vector (displacement) is a decimal fraction, a neighboring pixel value in the reference frame is read-out from the frame memory and a predicted value of the remarked pixel is determined as an interpolating value according to a known bilinear interpolation method.

In a simplified structure of an interframe predicting portion of a conventional video-decoding device using affine and bilinear transformation method, the interframe predicting portion of the conventional decoding device comprises a frame memory portion for storing already decoded video signals, a motion-vector interpolating portion for determining a motion vector of each pixel from a representative motion vector inputted for each unit-area, a pixel value predicting portion for preparing a predicted video signal from a video signal read from a frame memory by using the pixel motion vectors.

The conventional video coding and decoding devices may show an excellent performance if an entire area surrounded by representative points can be represented by the same parameters of affine transformation and bilinear transformation. However, in the case of positions of the representative points being different from changes between video frames, e.g., positions and movement of an object, representative motion vectors of the representative points represent different movements of different frame object resulting in that a motion vector of a pixel, obtained from the representative motion vector, can not represent an adequate displacement of the pixel. Consequently, the conventional art device in this case may suffer a considerably decreased efficiency of interframe prediction, i.e., coding efficiency.

Video communication services, e.g., videophones and video conferencing have been realized over high-speed digital communication networks such as ISDN (Integrated Service Digital Network).

Recently, with the spread of radio transmission networks represented by PHS (Personal Handyphone System), progress of data modulation/demodulation techniques for PSTN (Public Switched Telephone Network) and advance of image compressing techniques, there have been increasing demands for video communication services over lower bit-rate transmission lines.

Video communication services like video telephones and a video conferencing system must transmit a very large amount of information over limited transmission lines. Accordingly, it is necessary to reduce an amount of information by compressing and to encode the video information in view of transmission speed and costs of usable transmission lines.

As well known, H.261, MPEG-1 (Moving Picture Coding Expert Group) and MPEG-2 are internationally established standard coding methods for compressing video information. In addition, MPEG-4 is now promoted to be standardized a method for coding at a very low bit-rate of not more than 64 kbps.

The standardized video-coding methods adopt a hybrid video coding method performing interframe prediction coding in combination with intraframe prediction coding.

The interframe prediction coding is to generate a predictive video-frame from a reference video-frame and encode a difference of the predictive frame from a current video-frame to reduce an amount of codes to be transmitted. This enables using effective use of transmission lines.

The interframe predictive coding is known as be a block-matching method, an affine transformation method and a warping prediction method. A conventional video-coding and video-decoding device using the affine transformation will be described as follows:

The operation of the conventional video-coding device is first explained below.

It is assumed that a reference video frame usable for producing a predictive video-frame is stored in a frame memory portion in a normal operating condition of the conventional video-coding device for conducting the motion-compensated interframe predictive coding.

An input video frame enters into a subtracting portion and a motion-compensated interframe-predicting portion. The motion-compensated interframe-predicting portion determines a predictive motion from the reference video-frame stored in the frame memory portion and the input video-frame and outputs a predicted video-frame to the subtracting portion.

The subtracting portion subtracts from the input video-frame the predicted video-frame entered by the motion-compensated interframe predicting portion and outputs the subtraction result, i.e., predicted error information to a video coding portion.

The video coding portion spatially transforms the input predicted-error-information, e.g., by using DCT (Discrete Cosine Transform), quantizes the transformed information and outputs coded video-information. At the same time, the coded video-information outputted from the video coding portion is locally decoded by a video-decoding portion and is then transferred to the adder portion.

The adder portion adds the predicted video-information outputted from the video-decoding portion to the predicted error-information outputted from the motion-compensated interframe-predicting portion to form a new reference video-frame which is then transferred to the frame memory portion.

The frame memory portion stores therein the new reference video-frame outputted from the adding portion. This new reference video-frame is given to the motion-compensated interframe predicting portion when encoding a succeeding input video-frame.

The video coding device outputs a series of coded video information (predicted error information) and a series of coded side-information by repeating the above-mentioned sequence of operations.

The operation of the conventional video-decoding device is now described below.

It is assumed that a reference video-frame usable for producing a predictive video-frame is stored in a frame memory portion in a normal operating condition of the conventional video-coding device for conducting the motion-compensated interframe predictive coding. Coded video-information inputted into the video-decoding device enters into a video-decoding portion which decodes the coded-video information by performing the same operations as the video-decoding portion of the video-coding device and outputs the obtained differential video-frame to an adder portion.

Coded side-information inputted into the video-decoding device enters into a motion-compensated interframe predicting portion.

The motion-compensated interframe predicting portion decodes the received coded side-information and obtains motion vectors, then it produces a predicted video-frame by using the obtained motion vectors and a reference video-frame read from the frame memory portion and transfers the produced predicted video-frame to an adder portion.

The adder portion obtains an output video-frame by adding the differential video-frame from the video-decoding portion to the predicted video-frame from the motion-compensated interframe predicting portion. The output video-frame is outputted from the video-decoding device and at the same time is transferred to the frame memory.

The frame memory stores therein the video-frame inputted from the adder portion as a new reference video-frame that will be used by the motion-compensated interframe predicting portion when decoding a proceeding video-frame.

The video decoding device realizes outputting a series of decoded video-frames by repeating the above-mentioned sequential operations.

The operation of a motion-compensated interframe predicting portion in a video-coding device and a video-decoding device and prior arts applied therein will be described below.

An exemplified structure of a motion-compensated interframe predicting portion and its operation will be first described as follows:

The motion-compensated interframe-predicting portion comprises a motion-vector searching portion, a fixed-area predicted-frame generating portion and a motion-vector coding portion.

The motion-vector searching portion searches motion vectors in an input video-frame and a reference video-frame read from a frame memory and outputs the detected motion-vectors to the fixed-area-size predicted-frame generating portion.

When searching motion vectors, the motion-vector searching portion searches a motion vector of a control grid point by previously weighting a center pixel of a processable area and outputs a motion vector of each control grid point to the fixed-area-size predicted-frame generating portion.

According to the conventional method, a processable area has a fixed size with control grid points set one for 16 or 8 pixels.

The fixed-area-size predicted-frame generating portion performs interframe prediction on each processable area having a fixed size (generally in a rectangular block of 16×16 pixels) by using motion vectors inputted from the motion vector searching portion and a preceding video-frame read from the frame memory portion.

The interframe prediction is realized by determining affine parameters from positions of three vertex points of each objective triangular area, performing affine transformation on every pixel existing within the triangular area and repeating the same processing on all processable triangular areas to produce a predicted video-frame.

The produced predicted video-frame is transferred to the before-described subtracting portion and adder portion. The motion vectors are transferred to the motion vector coding portion.

The motion vector coding portion encodes the motion vectors received from the fixed-area predicted-frame generating portion and outputs them as coded side-information.

The motion-vector coding device encodes the motion vectors by the following method:

Motion vectors are generally encoded not directly but by predictive method. Namely, a predictive value of each codable objective motion vector is determined and a difference between the predicted value and the motion vector value is encoded. By doing so, the efficiency of coding can be improved with a saved amount of information.

The most simple method of determining a predicted value is such that just coded vector value is adopted as a predicted value of a proceeding motion-vector. According to this method, differences of two successive neighboring motion vectors are encoded in turn. By reason of a high correlation between motion vectors, it is possible to effectively encode motion vectors particularly in the case when neighboring motion vectors have similar values. This prediction coding method is adopted in a motion-vector coding method defined by ITU-T Recommendation H.261.

Another method is to determine a predicted value from a plurality of motion vectors including a just-preceding vector. In this case, a prediction value is determined by using values of three motion-vectors which are located, respectively, left, just above and above right from a coding objective motion-vector. The prediction value may be a mean value or a median of three values of the three neighboring motion-vectors. In comparison with the predicting method using only just-preceding motion vector this method can use a wider range of correlation, i.e., higher correlation of motion vectors, attaining a further improved coding efficiency. The video coding system defined by the ITU-T Recommendation H.263 adopts the prediction method for coding predicted a motion vector by using a median of the three motion-vector values, which is well known to be more effective.

The structure and operation of a motion-compensated interframe-predicting portion of a conventional video-decoding device will now described as follows:

The motion-compensated interframe predicting portion is composed of a fixed-area-size predicted-frame generating portion and a motion-vector coding portion.

Coded side-information inputted into the motion-compensated interframe predicting portion is transferred to the motion-vector coding portion which in turn decodes the received coded side-information, obtains motion vectors and outputs the motion vectors to the fixed-area-size predicted-frame generating portion.

The fixed-area-size predicted-frame generating portion performs interframe prediction processing by using the motion vectors received from the motion vector decoding portion and a reference video-frame received from the frame memory portion.

Interframe prediction is to determine affine parameters from positions of three vertices of an objective triangular area and motion vectors and then to perform affine transformation of all pixels within the triangular area by using the determined affine parameters. This processing is repeated on all objective triangular areas to generate a predicted video-frame.

The fixed-area-size predicted-frame generating portion outputs the obtained predicted video-frame to an adder portion.

Some kinds of methods used for motion-compensated interframe prediction in the above-mentioned video-coding and video-decoding devices will be described below.

A motion vector searching method is as follows:

A so-called "pixel-matching" method that weights generally a center pixel in a processable area is used for determining a motion vector of a control grid point. The processable area is composed of 21 pixels for instance each in X-direction and Y-direction. The pixel matching is such that an area of a reference frame, which matches with the processable area of a current frame is determined by calculation and then motion vectors are determined as displacement values in X-direction and Y-direction. In matching calculation, a difference between the processable area of the current video-frame and the matched area of the reference frame processable is multiplied by a weighting coefficient. By doing so, motion vectors are searched putting a weight on a center pixel in the processable area.

Motion vectors at control grid points located at the periphery of a video-frame are set as follows:
  Motion vectors at quadrangular control grid points:
    X- and Y-components of each vector are set both at 0.
  Motion vectors at the top and bottom control grid points:
    An X-component is determined as an X-component of a motion vector detected at a control grid point one inside from an objective control grid point. A Y-component is set at 0.
  Motion vectors at the left-side and right-side control-grid points:
    An X-component of each motion vector is set at 0.
  A Y-component is determined as a Y-component of a motion vector detected at a control grid point one inside from an objective control grid point.

The affine transformation is described as follows:

The affine transformation is conducted by representing a map from a video-frame to another video-frame by using six parameters.

The affine transformation is conducted, for the sake of simplifying calculation of affine parameters, usually on a triangular area.

Motion vectors of control grid points A, B, C and D of the current video-frame are detected at corresponding control grid points A', B', C' and D' of a reference video-frame.

Three of four control grid points are first selected and an area is divided to determine affine parameters. For example, the area on the current video-frame is divided into two triangles ABC and BCD on the current video-frame and a corresponding area on the reference video-frame is divided into two angles A'B'C' and B'C'D'.

On the triangles into which the area is divided, affine parameters are determined from vertex positions of each triangle (vertex positions of one triangle and motion vectors of the other may be used).

A predictive video-frame is generated by mapping thereto all pixels of all triangular sub-areas according to the obtained affine parameters.

If a position of any referred pixel in the reference video-frame is not an integer, a predicted value is bilinearly interpolated to determine a pixel value of the predicted video-frame.

A predicted video-frame is generated by performing the above-mentioned processing operations.

The motion-compensated interframe prediction according to the above-mentioned prior art using affine transformation of a fixed area-size has such a drawback that the efficiency of motion prediction is decreased when an object to be mapped has an insufficient size or its periphery is divided by a plurality of areas to create a considerable difference between the object edge and the area dividing lines.

The motion-compensated interframe prediction with the affine transformation may be accompanied by geometrical distortion peculiar to the affine transformation, resulting in that the prediction efficiency is decreased with deterioration of the quality of coded video frames. The motion-compensated interframe prediction may have a considerable decrease of the prediction efficiency if an input video contains a motion of an objective area by a parallel displacement that can not correctly be represented.

High accuracy of setting motion vectors of control-grid points at the peripheral part of a video-frame may be impossible because they are set affinely from respective inside points of the control grid.

In the case of conducting affine transformation of a variable in size area, the number of control grid points must be increased and therefore the number of motion vectors is increased as compared with the conventional affine transformation of a fixed-size area. Accordingly, motion vectors must be encoded at a high efficiency.

In the affine transformation of the variable in size area, the number of control grid points varies with the size of a selected area, i.e., the number of motion vectors varies with the number of the control grid points. Consequently, motion vectors may be arranged dispersively in the video-frame. This makes it difficult to apply the conventional motion-vector coding method as it is. The coding efficiency is also decreased. It is necessary to use a highly efficient motion-vector coding system adapted to variable area-size affine transformation.

Another operation of a motion-compensated interframe predicting portion in a video-coding device and a video-decoding device and methods applied therein will be described below.

An exemplified structure of a motion-compensated interframe predicting portion and its operation will be first described as follows:

The motion-compensated interframe-predicting portion comprises a motion-vector searching portion, a predicted-frame generating portion and a motion-vector coding portion.

The motion-vector searching portion searches motion vectors in an input video-frame and a reference video-frame read from a frame memory portion and outputs the detected motion-vectors to the predicted frame generating portion.

The predicted frame generating portion generates a predictive image by using any one of prediction methods, i.e., block-displacement method, affine transformation method and bilinear transformation method, etc.

In the process of generating a predicted video-frame, side-information such as area-information and motion vectors can be obtained.

The generated predicted video-frame is transferred to the subtracting portion and the adder portion while the side-information is transferred to the side-information coding portion.

The side-information coding portion encodes the side-information received from the predicted-frame generating portion and outputs the coded side-information.

Another structure and another operation of the motion-compensated interframe-predicting portion of a conventional video-decoding device will now described as follows:

The motion-compensated interframe predicting portion is composed of a predicted-frame generating portion and side-information decoding portion.

Coded side-information inputted into the motion-compensated interframe predicting portion is transferred to the side-information decoding portion.

The side-information decoding portion decodes the received coded side-information, obtains decoded side-information including area-information and motion vectors, etc., and outputs the decoded side-information to the predicted-frame generating portion.

The predicted-frame generating portion performs interframe-prediction processing by using the side-information received from the side-information decoding portion and the reference video-frame received from the frame memory portion and outputs the produced predicted video-frame to the adder portion.

The prior art uses a fixed method for motion-compensated interframe prediction. Therefore, a conventional device using affine transformation area-size can not be adapted to the case when the number of codes can be more reduced in total by using the block displacement prediction.

The motion-compensated interframe prediction with the affine transformation may be not always performed with sufficient prediction efficiency depending on shape, size and position of the object to be mapped.

SUMMARY OF THE INVENTION

The present invention relates to a video coding device for encoding video information by reducing volume of information contained in a video signal and a video decoding device for decoding coded information into a video signal and, more particularly, to a coding device for conducting interframe prediction per pixel by determining a motion vector from a representative motion vector according to a motion-vector-interpolation predicting method, to a video coding device and a video decoding device, both of which use motion-compensated interframe prediction method by applying affine transformation, to video-coding and video-decoding devices which are provided with an adaptive motion-compensated interframe prediction system.

The present invention was made to provide a video coding device and a video decoding device, which can achieve high efficiency of interframe prediction and coding of video signals by accurately determining pixel motion vectors with a minimized effect of motion vectors irrelevant to each remarked pixel by previously weighting the representative motion vectors to be used for determining therefrom motion vectors for respective pixels.

The present invention was made to provide a video-coding and decoding device which is capable of determining accurate motion vectors between successive video-frames, dividing each frame into areas optimal to the size and shape of an object in the video-frame efficiently encoding motion vectors, decoding the efficiently encoded motion vectors and reproducing a predicted video-frame obtained by predicting with the frame areas optimally divided in accordance with the size and shape of the object in the frame. The global object of the present invention is to realize highly efficient motion-compensated interframe prediction of video-frames and communication of video-information by using communication lines of a lower bit-rate.

The present invention provides:

(1) a video coding device comprising frame memory means for storing already encoded video signals, motion vector detecting means for determining a representative motion vector per unit-area from a difference between an input video signal and a video signal read from the frame memory means, motion vector interpolating means for determining a motion vector per pixel from the representative motion vector, pixel value predicting means for preparing a predicted video signal from a video signal read from the frame memory means by using the motion vector per pixel, wherein weighting coefficient control means for instructing the vector interpolating means to weight a representative motion vector is provided for determining a weighting coefficient for each representative motion vector determined by the motion vector detecting means and instructing the motion vector interpolating means to weight each representative motion vector;

(2) a video-coding device as defined in item (1), characterized in that the weighting coefficient control means selects one of previously prepared patterns of weighting coefficients for representative vectors and instructs the motion vector interpolating means;

(3) a video-coding device as defined in any one of items (1) and (2), characterized in that the weight coefficient control means determines a vector weighting coefficient according to a direction of each representative motion vector; and (4) a video-coding device as defined in any one of items (1) and (2), characterized in that the weighting coefficient control means determines a vector weighting coefficient according to a vector value of each representative motion vector.

(5) a video decoding device comprising frame memory means for storing already decoded video signals, vector interpolating means for determining a motion vector per pixel from a representative motion vector inputted per unit area, pixel value predicting means for preparing a predicted video signal from a video signal read from the frame memory means by using the motion vector per pixel, wherein weighting coefficient control means for instructing the vector interpolating means to weight a representative motion vector is provided for determining a weighting coefficient for each representative motion vector instructing the motion vector interpolating means to weight each representative motion vector;

(6) a video-decoding device as defined in item (5), characterized in that the weighting coefficient control means selects one of previously prepared patterns of weighting coefficients for representative vectors and instructs the motion vector interpolating means; and (7) a video-decoding device as defined in any one of items (5) and (6), characterized in that motion vector converting means is provided for determining a motion vector for a skipped frame from a representative motion vector inputted for a unit area of encoded image frame (screenful) and an interpolating video signal corresponding to an image frame thinned-out without having been encoded is prepared.

In the above-mentioned video-coding device, the frame memory portion stores already coded video-signals as a reference video frame to be used for interframe prediction. The motion vector detecting portion receives an input video frame signal to be encoded and reads a reference video frame stored in the frame memory and searches in said reference frame so that an area being most similar to a current processable unit-area of an input video frame is found. The displacement of the found similar area in the reference frame from the processable unit-area is outputted as a motion vector. The weighting coefficient control portion determines a weighting coefficient for each motion vector of the unit-area and informs the motion vector interpolating portion of the weighting coefficients specified for respective motion vectors. The weighting coefficients are determined in such a way that the interfering effect of the respective representative motion vectors representing different motions of different objects in an image is reduced enough to obtain a correct displacement of a current remarked pixel. The motion vector interpolating portion determines motion vectors of respective pixels by using the motion vectors outputted from the motion vector detecting portion and the weighting coefficients specified by the weighting coefficient control portion and outputs the calculated results. At this time, a combination of a devised method for weighting each motion vector and affine/bilinear transformation technique in comparison with the conventional method can more accurately determine a motion vector of each pixel, attaining a higher efficiency of interframe prediction and video-signal coding. In the pixel value predicting portion, the motion vectors of the respective pixels outputted from the motion vector interpolating portion are used as displacement values of the respective pixels from the corresponding pixels of the reference frames and the corresponding pixel values are read from the frame memory to compose a predicted frame.

In the weighting coefficient control portion, it is also possible to previously prepare several patterns of weighing coefficients, select a suitable one of the patterns and give only information about the selected pattern, instead of direct indication of the values, to the motion vector interpolating portion.

Furthermore, the weighting coefficient control portion may also determine a weighting coefficient according to only a direction of each representative motion vector in such a way that a motion vector indicating a particular direction is weighted with a small weight or, if there is a large dispersion of directions of motion vectors, only motion vectors of nearest neighbors to a remarked pixel are weighted with a larger weight. This method is effective to easily determine correct weighting coefficients, improving the efficiency of interframe prediction.

The Weighting coefficient control portion may also determine a vector weighting coefficient according to a vector value of each representative motion vector by discriminating a dispersion of motion vectors and separating a motion vector that has a particular value representing the motion of another object in an image. This is effective to obtain adequate weighting coefficients for determining accurate motion vectors of respective pixels. The efficiency of interframe prediction can be improved.

Furthermore, the present invention provides:

(8) A video coding device, which is used for encoding predicted-error information representing a difference between an input video-frame and a predicted video-frame obtained by performing motion-compensated interframe prediction, and whose motion-compensated interframe predicting portion is provided with a variable-area predicted-frame generating portion for dividing a processable area of a video-frame into suitable areas according to motion vectors and a reference video-frame and generating a predicted frame by using affine transformation and an area-dividing pattern deciding portion for controlling dividing of a processable area and outputting a predicted video-frame and side-information such as motion vector information and area-dividing information;

(9) A video-coding device, which is used for encoding predicted-error information representing a difference between an input video-frame and a predicted video-frame obtained by performing motion-compensated interframe prediction, and whose motion-compensated interframe predicting portion is provided with a variable-area predicted-frame generating portion for generating a predicted video-frame by translational displacement of a processable area and dividing a processable area of a video-frame into suitable areas according to motion vectors and a reference video-frame and generating a predicted frame by using affine transformation and an area-dividing pattern deciding portion for controlling dividing of a processable area and outputting a predicted video-frame and side-information such as motion vector information and area dividing information;

(10) A video coding device, which is used for encoding predicted-error information determined as a difference between an input video-frame and an predicted video-frame obtained by executing motion-compensated interframe prediction, and whose motion-compensated interframe-predicting portion is provided with an effective-area selecting portion for selecting a valid processing mask or a invalid processing mask depending upon location of an objective area in a video-frame when searching a motion vector;

(11) A video coding device, which has the same construction as defined in any one of (8) and (9) above and used for encoding predicted-error information determined as a difference between an input video-frame and an predicted video-frame obtained by executing motion-compensated interframe prediction, and whose motion-compensated interframe-predicting portion is further provided with an effective-area selecting portion for selecting a valid processing mask or a invalid processing mask depending upon location of an objective area in a video-frame when searching a motion vector;

(12) A video coding device, which is used for encoding predicted error information determined as a difference between an input video-frame and an predicted video-frame obtained by executing motion-compensated interframe prediction, and whose motion-vector coding portion is provided with a side-information coding portion for encoding an additional motion vector as a difference from a mean of four basic motion-vectors;

(13) A video coding device, which has the same construction as defined in any one of (8) and (9) above and wherein the motion-vector coding portion of the area-dividing pattern deciding portion is further provided with a side-information coding portion for encoding an additional motion vector as a difference from a mean of four basic motion-vectors;

(14) A video coding device, which is used for encoding predicted error information determined as a difference between an input video-frame and an predicted video-frame obtained by executing motion-compensated interframe prediction, wherein a motion-vector coding portion is provided with a side-information coding portion for encoding an additional motion vector positioned between two basic motion-vectors as a difference from a mean of the two basic motion-vectors and encoding a center additional motion-vector as a difference from a mean of four basic motion-vectors;

(15) A video coding device, which has the same construction as defined in any one of (8) and (9) above, wherein the motion-vector coding portion of the area-dividing pattern deciding portion is further provided with a side-information coding portion for encoding an additional motion vector positioned between two basic motion-vectors as a difference from a mean of the two basic motion-vectors and encoding a center additional motion-vector as a difference from a mean of four basic motion-vectors;

(16) A video coding device, which is used for encoding predicted error information determined as a difference between an input video-frame and an predicted video-frame obtained by executing motion-compensated interframe prediction, and whose motion-vector coding portion is provided with a side-information coding portion for encoding an objective motion-vector value by prediction from values of three motion-vectors which are already encoded basic or additional motion-vectors existing at the left-side, the just upper-side and the upper right-side of the object motion vector;

(17) A video coding device, which has the same construction as defined in (16) above, and whose motion-vector coding portion determines a mean of the three motion vectors as a predicted value of the objective motion-vector and encodes a difference between the objective motion-vector and the predicted value;

(18) A video coding device, which has the same construction as defined in (16) above, and whose motion-vector coding portion determines a median of the three motion vectors as a predicted value of the objective motion-vector and encodes a difference between the objective motion-vector and the predicted value;

(19) A video coding device, which has the same construction as defined in any one of (8) and (9) above, and whose area-dividing pattern deciding portion is further provided with the motion-vector coding portion defined in any one of (16), (17) and (18) above;

(20) A video coding device, which has the same construction as defined in any one of (8), (9), (11), (13), (15) and (19) above, and whose motion-compensated interframe-predicting portion is further provided with an area-dividing pattern deciding portion for instructing kinds of dividing patterns of all areas to the variable-area predicted-frame generating portion, adopting an area-dividing pattern minimizing a predicted-error (error information value), outputting motion-vectors and area-dividing information to side-information coding portion and outputting a predicted video-frame;

(21) A video coding device, which has the same construction as defined in any one of (8), (9), (11), (13), (15) and (19) above, and whose motion-compensated interframe-predicting portion is further provided with an area-dividing deciding portion which instructs the variable-area predicted-frame generating portion to divide an area into two small areas as an initial setting and/or make prediction by translational displacement, instructs the variable-area predicted-frame generating portion to more finely divide the area again if a predicted error (error information value) of a predicted-frame generated with the initial setting exceeds a preset threshold value, and which deciding portion outputs motion-vectors and area-dividing information to the side-information coding portion when the prediction error (error information value) became smaller than the preset threshold value, and also outputs a predicted video-frame;

(22) A video decoding device, which has the same construction as defined in any one of (8), (9), (11), (20) and (21) above and is further provided with a subtracting portion whereto the input video frame and the predicted video-frame from the motion-compensated interframe-predicting portion are transferred, a video coding portion for encoding an error (differential) video-frame from the subtracting portion according to an instruction of the coding control portion, a video encoding portion for decoding a coded video frame from the video coding portion, an adder portion for adding a predicted video-frame from the motion-compensated interframe-predicting portion to a decoded video-frame from the video decoding portion and a frame memory for storing a reference video-frame from the adder portion and outputting stored information to the motion-compensated interframe-predicting portion;

(23) A video decoding device, which is used for reproducing a video-frame from a coded side-information inputted from a video-coding device and a reference video-frame inputted from a frame memory, wherein a motion- compensated interframe-predicting portion for generating and outputting a predicted video-frame by changing a codable area-size is provided with a side-information decoding portion for decoding coded side-information from the video coding device and obtaining thereby motion-vectors and area-dividing information and a variable-area predicted video-frame generating portion for generating a predicted video-frame by using motion vectors and area dividing information from the side-information decoding portion and a reference video-frame from the frame memory;

(24) A video decoding device, which is used for reproducing a video-frame from a coded side-information inputted from a video-coding device and a reference video-frame inputted from a frame memory, and which is further provided with a side-information decoding portion for decoding four basic motion-vectors contained in the side-information before decoding motion-vectors and for decoding additional motion-vectors representing a difference from a mean of the basic vectors;

(25) A video decoding device, which has the same construction as defined in (16) above and whose side-information decoding portion decodes four basic motion-vectors contained in the side-information before decoding motion-vectors and for decoding additional motion-vectors representing a difference from a mean of the basic vectors;

(26) A video decoding device, which is used for reproducing a video-frame from a coded side-information inputted from a video-coding device and a reference video-frame inputted from a frame memory, wherein a side-information decoding portion is provided for decoding four basic motion-vectors contained in the side-information before decoding motion-vectors and for decoding an additional motion-vector positioned between two basic motion-vectors as a difference from an obtained mean of the two basic motion-vectors and decoding a center additional motion-vector as a difference from an obtained mean of four basic motion-vectors;

(27) A video decoding device, which has the same construction as defined in (16) above, and wherein a side-information decoding portion decodes four basic motion-vectors contained in the side-information before decoding motion-vectors and decodes an additional motion-vector positioned between two basic motion-vectors as a difference from an obtained mean of the two basic motion-vectors and decoding a center additional motion-vector as a difference from an obtained mean of four basic motion-vectors.

(28) A video decoding device, which is used for reproducing a video-frame from a coded side-information inputted from a video-coding device and a reference video-frame inputted from a frame memory, and which is provided with a side-information decoding portion which decodes a objective motion-vector value by prediction from values of three motion-vectors which are already decoded basic or additional motion-vectors existing at the left-side, the just upper-side and the upper right-side of the object motion vector;

(29) A video decoding device, which has the same construction as defined in (28) above, and whose side-information decoding portion determines a mean of the three motion-vectors as a predicted value of the objective motion-vector and obtains a motion-vector value of the decoded-object by adding the decoded difference value to the predicted value;

(30) A video decoding device, which has the same construction as defined in (28) above, and whose side-information decoding portion determines a median of the three motion vectors as a predicted value of the objective motion-vector and obtains a decoded objective motion-vector value by adding the decoded difference value to the predicted value;

(31) A video decoding device, which as defined in (23), and whose the side-information decoding portion is further provided with the motion-vector decoding system as defined in any one of (28), (29) and (30) above;

(32) A video decoding device, which has the same construction as defined in any one of (23), (25), (27) and (31) above, and which is further provided with a video decoding portion for decoding a coded video-information inputted from a video coding device and outputting the decoded video-information, an adder portion for adding a decoded video-frame inputted from the video decoding portion to a predicted video-frame inputted from the motion-compensated interframe predicting portion and outputting an obtained video-frame as an output video-frame and a memory frame for storing a video-frame from the adder portion and for outputting said stored video-frame as a reference video-frame to the frame inputted from the motion-compensated interframe predicting portion.

(33) a video coding device using adaptive motion-compensated interframe prediction, which comprises a predicting portion for generating a plurality of predictive images of small variable-size areas by applying different predicting methods to each of the small variable-size areas in the process of the motion-compensated interframe prediction and outputting the generated predictive images, an area prediction deciding portion for determining an adaptive area size and an adaptive prediction method according to a plurality of the predictive images received from the predicting portion and outputting side-information composed of area-information, prediction-mode information, motion-vectors and so on, and a side-information coding potion for encoding the side-information outputted from the area prediction deciding portion;

(34) a video coding device using adaptive motion-compensated interframe prediction, which comprises a predicting portion for generating a plurality of predictive images of respective unit areas or further-divided subareas by applying different predicting methods to each of the unit areas or each of the subareas in the process of the motion-compensated interframe prediction and then outputting the the generated predictive images, an area prediction deciding portion for determining an area-information indicating whether the predicted images received from the predicting portion are unit-area images or subarea images and prediction methods applied to the respective predicted images and outputting side-information including area-information, prediction mode information, motion-vectors and the like, and a side-information coding portion for encoding the side-information received from the area prediction deciding portion;

(35) a video coding device using adaptive motion-compensated interframe prediction, which comprises a predicting portion for generating a plurality of predictive images of respective variable-size small areas by using a block-displacement (overlapped motion-compensative) predicting method, an affine transform predicting method, bilinear transform predicting method and a background predicting method, etc. in the process of the motion-compensated interframe prediction and then outputting the generated predictive images, an area prediction deciding portion for determining an adaptive area area-size and an adaptive prediction method from the predictive images received from the predicting portion and outputting side-information including area-information, prediction mode information and motion-vectors, etc., and a side-information coding portion for encoding the side-information received from the area prediction deciding portion;

(36) a video coding device using adaptive motion-compensated interframe prediction, which is provided with a predicting portion for diagonally dividing each encodable unit-area into two or four subareas, producing a predictive image for each subarea by affine transformation in the process of the motion-compensated interframe prediction and outputting the produced predicted images;

(37) a video coding device using adaptive motion-compensated interframe prediction, which has the same functions as defined in any one of items (33), (34) and (35), and is provided with a predicting portion for diagonally dividing each encodable unit-area into two or four subareas, producing a predictive image for each subarea by affine transformation in the process of the motion-compensated interframe prediction and outputting the produced predicted images;

(38) a video decoding device using adaptive motion-compensated interframe prediction, which comprises a side-information decoding portion for decoding coded side-information including area-information, prediction mode information and motion-vectors, etc. and outputting the decoded side-information, a predicting portion for generating a plurality of predictive images of small variable-size areas by applying different predicting methods to each of the small variable-size areas in the process of the motion-compensated interframe prediction and outputting the generated predictive images; and an area-prediction-mode selecting portion for generating an adaptive predictive image from a plurality of the predictive images received from the predicting portion according to the information received from the side-information decoding portion;

(39) a video decoding device using adaptive motion-compensated interframe prediction, which comprises a side-information decoding potion for decoding coded side-information including area-information, prediction mode information and motion-vectors, etc. and outputting the decoded side-information, a predicting portion for generating a plurality of predictive images of respective decodable unit-areas or further-divided subareas by applying different predicting methods to each of the unit areas or each of the subareas in the process of the motion-compensated interframe prediction and then outputting the generated predictive images, and an area-prediction-mode selecting portion for generating an adaptive predictive image from a plurality of the predictive images received from the predicting portion according to the information received from the side-information decoding portion;

(40) a video decoding device using adaptive motion-compensated interframe prediction, which comprises a side-information decoding potion for decoding coded side-information including area-information, prediction mode information and motion-vectors, etc. and outputting the decoded side-information; a predicting portion for generating a plurality of predictive images of respective decodable unit-area or further divided subareas by using a block-displacement (overlapped motion-compensative) predicting method, an affine transform predicting method, bilinear transform predicting method and a background predicting method, etc. in the process of the motion-compensated interframe compensated interframe prediction and then outputting the the generated predictive images, and an area-prediction-mode selecting portion for generating an adaptive predictive image from a plurality of the predictive images received from the predicting portion according to the information received from the side-information decoding portion;

(41) a video decoding device using adaptive motion-compensated interframe prediction, which is provided with a predicting portion for diagonally dividing each decodable unit-area into two or four subareas, producing a predictive image for each subarea by affine transformation in the process of the motion-compensated interframe prediction and outputting the produced predicted images; and

(42) a video decoding device using adaptive motion-compensated interframe prediction, which has the same functions as defined in any one of items (39) and (40) and is provided with a predicting portion for diagonally dividing each decodable unit-area into two or four subareas, producing a predictive image for each subarea by affine transformation in the process of the motion-compensated interframe prediction and then out a predictive image and outputting the produced predicted images.

The above-mentioned video-coding and video decoding devices can selectively use any adaptive one of two or more methods for motion-compensated interframe prediction, which may minimize the number of codes for representing side-information (e.g., motion vectors) or a prediction error.

In the motion-compensated interframe-prediction by using the affine-transformation technique, it is possible to reduce the amount of side-information (e.g., motion vectors) or prediction error in conformity with the shape, size and location of an object to be mapped. This could not be realized by the conventional method.

Owing to these advantages, the video-coding and video-decoding devices according to the present invention can achieve a more effective motion-compensated interframe prediction with an increased efficiency of video-coding and decoding. Application of the video-coding and video-decoding devices according to the present invention can realize video-communications over transmission lines and channels whose transmission bit-rate is very low.

BRIEF DESCRIPTION OF THE DRAWINGS

FIG. 11 is view for explaining interframe prediction using affine transformation in case of forwarding interframe prediction of deformation of an object.

FIG. 20 shows all kinds of areas divided by a triangle according to the present invention.

PREFERRED EMBODIMENT OF THE INVENTION

To begin with, prior art will be explained as a reference of the present invention.

Figure 1:
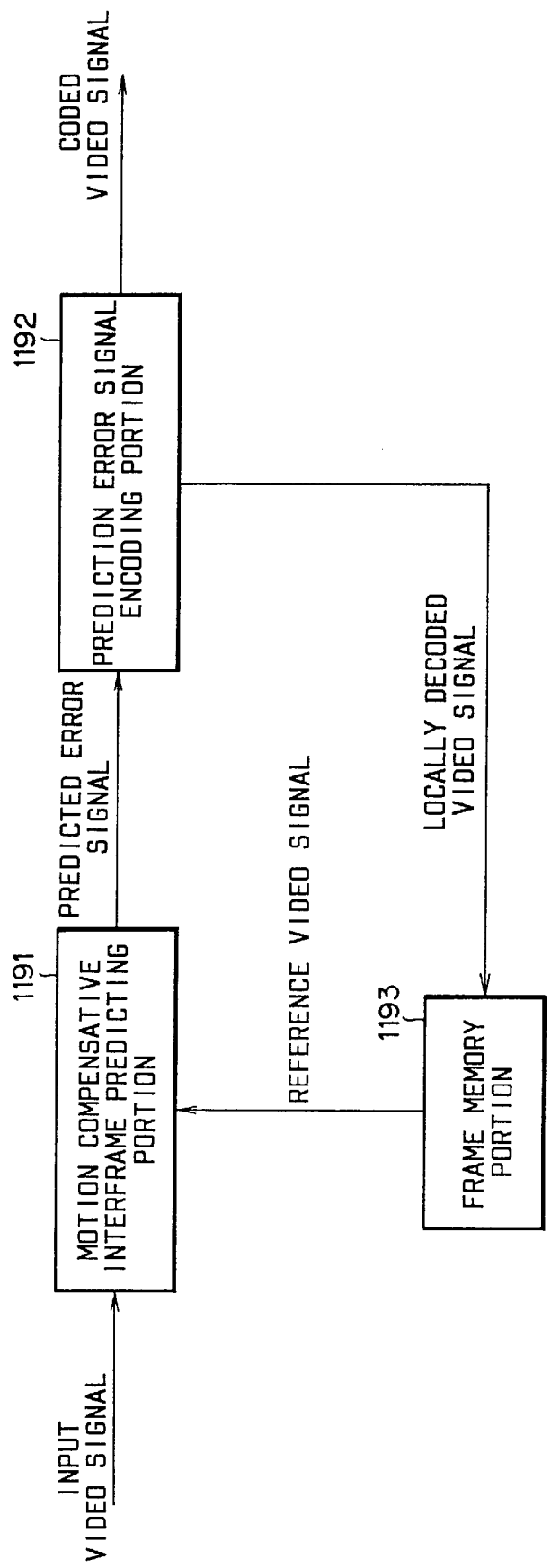
FIG. 1 is a block diagram for explaining the principle of a motion compensated interframe prediction with orthogonal transform encoding method.

A motion compensative interframe prediction with orthogonal transform encoding method that has been preferably used is such that the temporal redundancy of information is first reduced through the interframe prediction. FIG. 1 shows the principle of the motion compensative interframe prediction with orthogonal transform encoding method. The motion compensative interframe predicting portion 1191 prepares predicted value of an input video signal from an already encoded signal stored in a frame memory 1193 and outputs a difference between the predicted value and the input video signal as a prediction error signal. A prediction error signal encoding portion 1192 encodes the prediction error signal by orthogonal transforming method to further reduce redundancy of the information. The encoded prediction error signal is locally decoded, then stored in the frame memory 1193 and is used for prediction of a proceeding frame.

In very low bit-rate video encoding, it is necessary to represent a video-signal with a very small amount of information. An amount of information allocated to the orthogonal transform encoding (i.e., prediction error encoding), therefore, is considerably limited. Accordingly, it is very important to improve the efficiency of the interframe prediction by using an interframe prediction method that can more correctly predict a change of a video signal with time.

In the latest years, many studies have been made on interframe prediction methods using affine transformation and bilinear transformation. While the motion compensative interframe prediction method represents a movement contained in a video as a translational motion by using a vector per unit-area, the method using the affine transformation and bilinear transformation can more accurately represent a movement in a video, i.e., with increased prediction efficiency since it can represent movement, rotation, enlargement and deformation.

Figure 2:
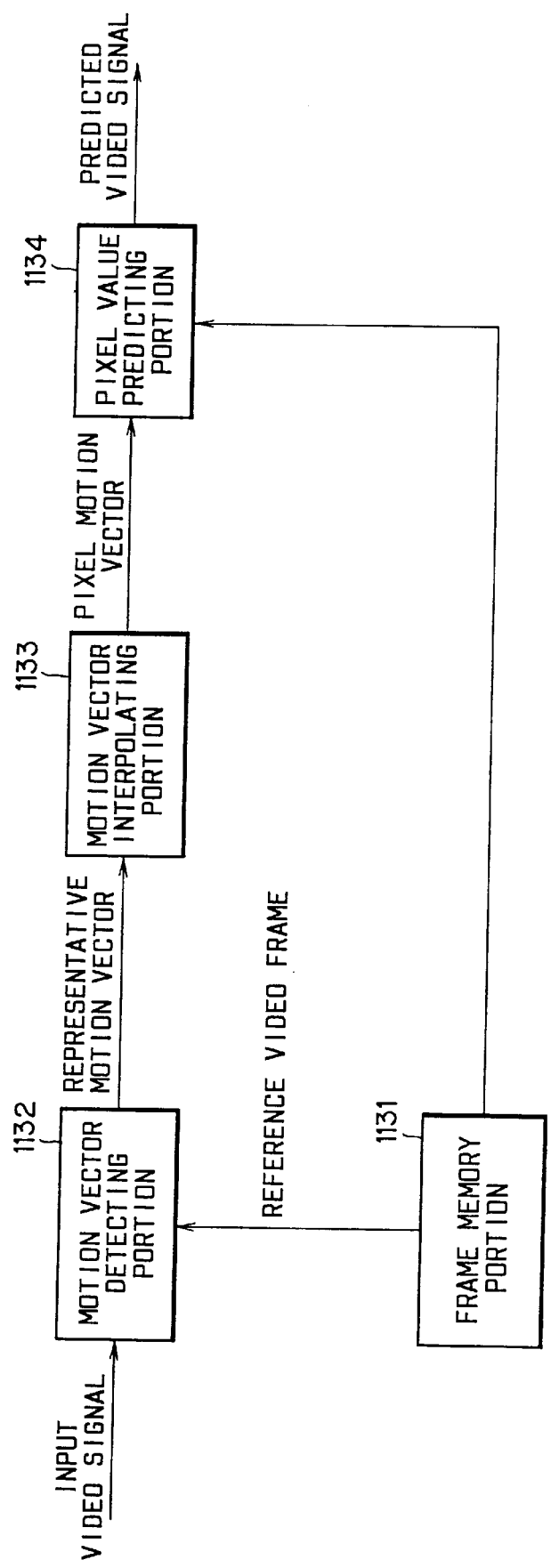
FIG. 2 is a simplified block diagram showing an exemplified structure of an interframe predicting portion of a conventional encoding device.

FIG. 2 is a schematic illustration of an interframe predicting portion of a conventional video-coding device that uses affine transformation and bilinear transformation.

An interframe predicting portion of the conventional video-coding device comprises a frame memory portion 1131 for storing already coded video signals, a motion vector detecting portion 1132 for determining a representative motion vector per unit area from a difference between an input video signal and a video signal read from the frame memory portion 1131, a motion vector interpolating portion 1133 for determining a motion vector per pixel from the representative motion vector and a pixel value predicting portion 1134 for preparing a predicted video signal from a video signal read from the frame memory portion 1131 by using the motion vector per pixel.

Figure 3:
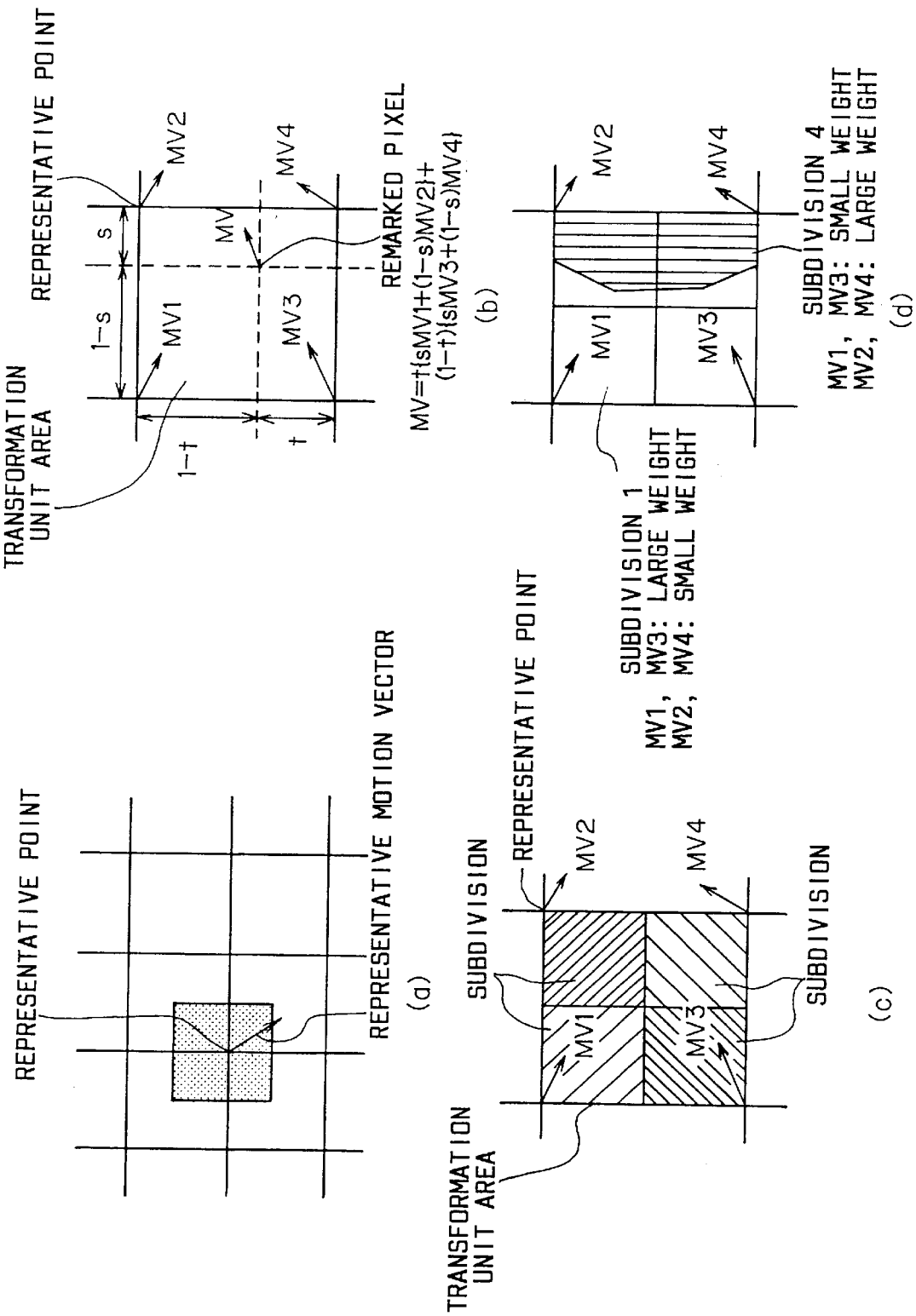
FIG. 3 is a view showing the correlation between a unit area to be transformed, a representative point and a representative motion vector.

The operation of the above-mentioned interframe predicting portion is as follows:

The frame memory portion 1131 stores already coded video signals as reference video frames for interframe prediction. The motion vector detecting portion 1132 receives an input video-frame signal to be encoded and reads a reference video frame stored in the frame memory 1131. The motion vector detecting portion 1132 divides the coding video frame into unit-areas and scans the reference video frame to find an area most similar to a current coding unit-area. A displacement of a unit-area of the coding video-frame from the area found in the reference video frame is outputted as a motion vector. The motion vector is a representative motion vector representing a interframe displacement of a representative point within a unit-area (usually, a center of the unit-area). FIG. 3(a) shows an example of relationship between a representative point and a vector searched unit-area are specified. In searching a similar area in a reference video frame, a sum of absolute differential values or a square-sum of differential values of each pixel in a unit-area is used as a scale of similarity. Furthermore, a center portion of the unit-area may be weighted by multiplying a differential pixel value at the center portion of the unit-area by a large coefficient and a differential pixel value at the periphery thereof by a small coefficient prior to summation so as to more accurately determine a displacement of the representative point.

The representative motion vector is transferred to the motion vector interpolating portion 1133 which in turn determines motion vectors for respective pixels using the received representative motion vectors. For affine transformation, a motion vector for each pixel existing within a triangle area surrounded by three neighboring representative points (hereinafter called transformable unit-area) is determined by solving an affine transformation expression from the representative motion vectors of the respective representative points. For bilinear transformation, a motion vector for each pixel existing within a quadrangular area surrounded by four neighboring representative points (hereinafter called transformable unit-area) is determined by solving a bilinear transformation expression from the representative motion vectors of the respective representative points. For a transformation unit-area being quadrangular or rectangular, it is equivalent that a motion vector value of each representative point is distributed in a vertical direction and a horizontal direction in proportion to an a distance between a remarked pixel and a representative point as shown in FIG. 3(b).

The pixel value predicting portion 1134 receives the (remarked) pixel motion vectors inputted pixel by pixel and, considering the motion vectors to be a displacement of the remarked pixel from its corresponding position in the reference frame, reads a pixel value at the corresponding position from the frame memory 1131 as a predicted value of the remarked pixel to compose a predicted frame. If the pixel value indicates a position in the reference frame, where no pixel exists, e.g., the pixel motion vector (displacement) is a decimal fraction, a neighboring pixel value in the reference frame is read-out from the frame memory and a predicted value of the remarked pixel is determined as an interpolating value according to a known bilinear interpolation method.

Figure 4:
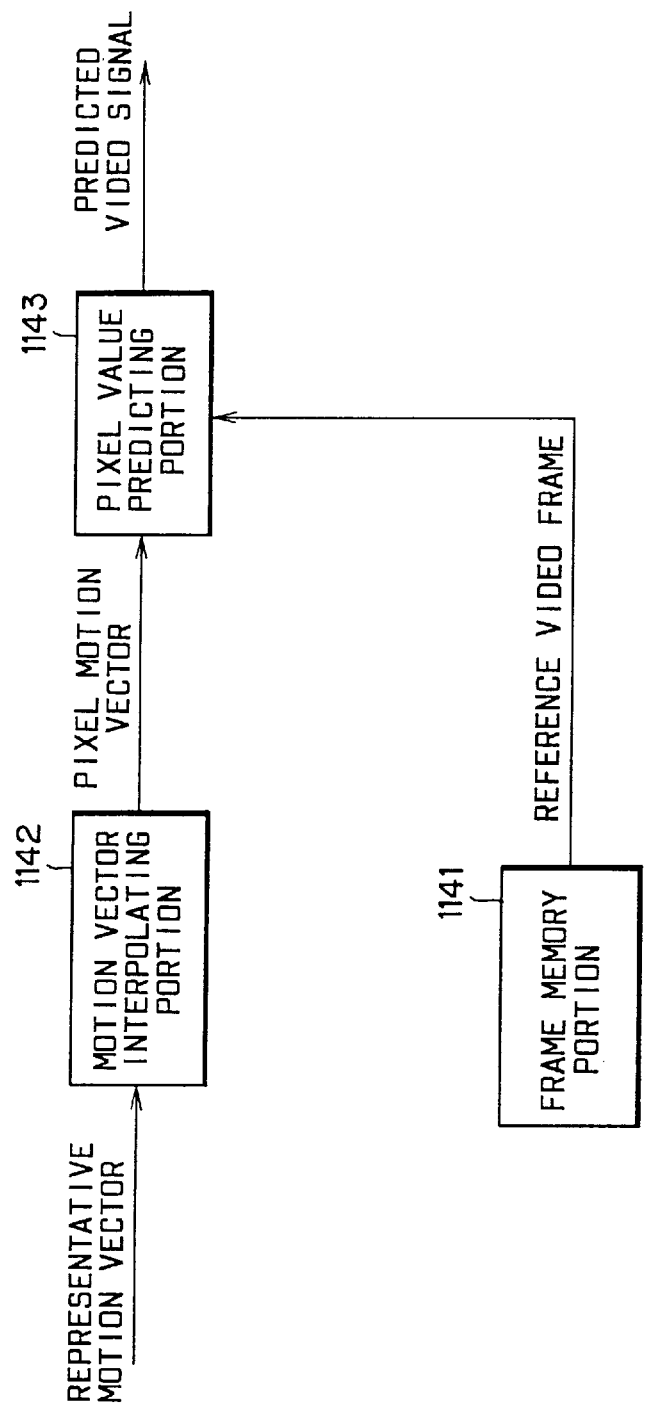
FIG. 4 is a simplified block diagram showing an exemplified structure of an interframe predicting portion of a conventional encoding device.

FIG. 4 shows a simplified structure of an interframe predicting portion of a conventional video-decoding device using affine and bilinear transformation method.

The interframe predicting portion of the conventional decoding device comprises a frame memory portion 1141 for storing already decoded video signals, a motion-vector interpolating portion 1142 for determining a motion vector of each pixel from a representative motion vector inputted for each unit-area, a pixel value predicting portion 1143 for preparing a predicted video signal from a video signal read from a frame memory by using the pixel motion vectors.

Figure 5:
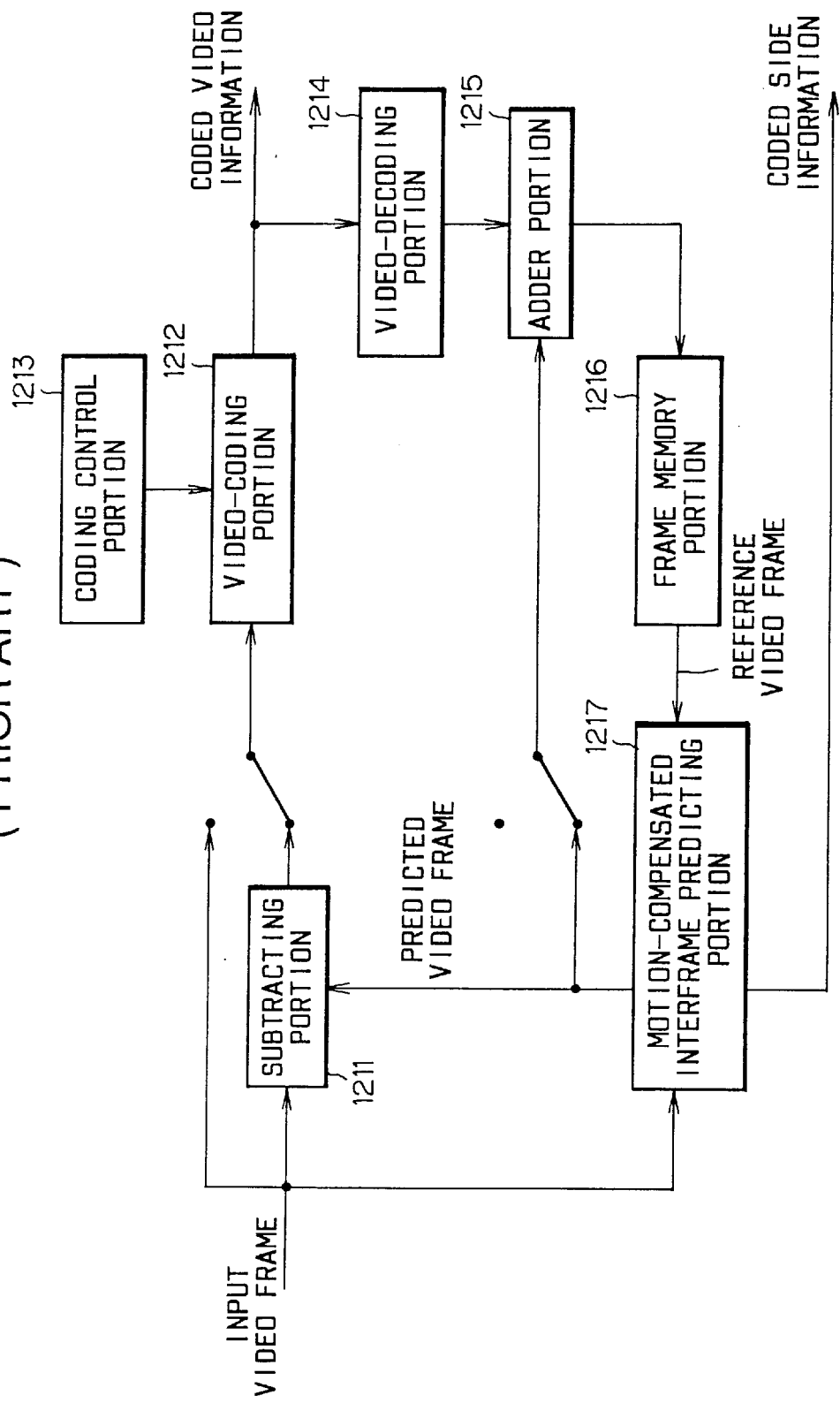
FIG. 5 is a schematic illustration of a whole system of a video coding device according to a prior art or the present invention.

Furthermore, the operation of the conventional video-coding device is first explained below. FIG. 5 shows an exemplified entire system of the conventional video-coding device.

It is assumed that a reference video frame usable for producing a predictive video-frame is stored in a frame memory portion 1216 in a normal operating condition of the conventional video-coding device for conducting the motion-compensated interframe predictive coding.

An input video frame enters into a subtracting portion 1211 and a motion-compensated interframe-predicting portion 1217. The motion-compensated interframe-predicting portion 1217 determines a predictive motion from the reference video-frame stored in the frame memory portion 1216 and the input video-frame and outputs a predicted video-frame to the subtracting portion 1211.

The subtracting portion 1211 subtracts from the input video-frame the predicted video-frame entered by the motion-compensated interframe predicting portion 1217 and outputs the subtraction result, i.e., predicted error information to a video coding portion 1212.

The video coding portion 1212 spatially transforms the input predicted-error-information, e.g., by using DCT (Discrete Cosine Transform), quantizes the transformed information and outputs coded video-information. At the same time, the coded video-information outputted from the video coding portion 1212 is locally decoded by a video-decoding portion 1214 and is then transferred to the adder portion 1215.

The adder portion 1215 adds the predicted video-information outputted from the video-decoding portion 1214 to the predicted error-information outputted from the motion-compensated interframe-predicting portion 1217 to form a new reference video-frame which is then transferred to the frame memory portion 1216.

The frame memory portion 1216 stores therein the new reference video-frame outputted from the adding portion 1215. This new reference video-frame is given to the motion-compensated interframe predicting portion 1217 when encoding a succeeding input video-frame.

The video coding device outputs a series of coded video information (predicted error information) and a series of coded side-information by repeating the above-mentioned sequence of operations.

Figure 6:
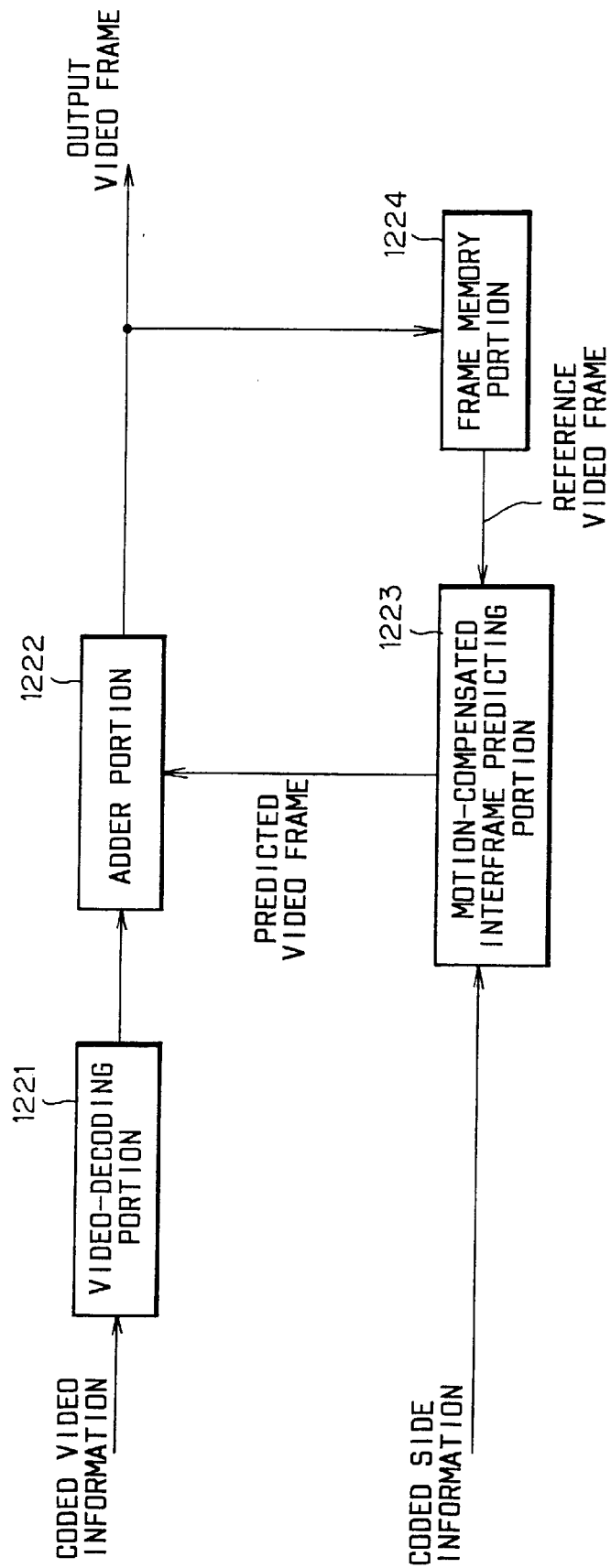
FIG. 6 is a schematic illustration of a whole system of a video decoding device according to a prior art or the present invention.

The operation of the conventional video-decoding device is now described below. FIG. 6 is illustrative of an exemplified entire system of the conventional video-coding device.

It is assumed that a reference video-frame usable for producing a predictive video-frame is stored in a frame memory portion 1216 in a normal operating condition of the conventional video-coding device for conducting the motion-compensated interframe predictive coding. Coded video-information inputted into the video-decoding device enters into a video-decoding portion 1221 which decodes the coded-video information by performing the same operations as the video-decoding portion 1214 of the video-coding device and outputs the obtained differential video-frame to an adder portion 1222.

Coded side-information inputted into the video-decoding device enters into a motion-compensated interframe predicting portion 1223.

The motion-compensated interframe predicting portion 1223 decodes the received coded side-information and obtains motion vectors, then it produces a predicted video-frame by using the obtained motion vectors and a reference video-frame read from the frame memory portion 1224 and transfers the produced predicted video-frame to an adder portion 1222.

The adder portion 1222 obtains an output video-frame by adding the differential video-frame from the video-decoding portion 1221 to the predicted video-frame from the motion-compensated interframe predicting portion 1223. The output video-frame is outputted from the video-decoding device and at the same time is transferred to the frame memory 1224.

The frame memory 1224 stores therein the video-frame inputted from the adder portion 1224 as a new reference video-frame that will be used by the motion-compensated interframe predicting portion 1223 when decoding a proceeding video-frame.

The video decoding device realizes outputting a series of decoded video-frames by repeating the above-mentioned sequential operations.

The operation of a motion-compensated interframe predicting portion in a video-coding device and a video-decoding device and prior arts applied therein will be described below.

Figure 7:
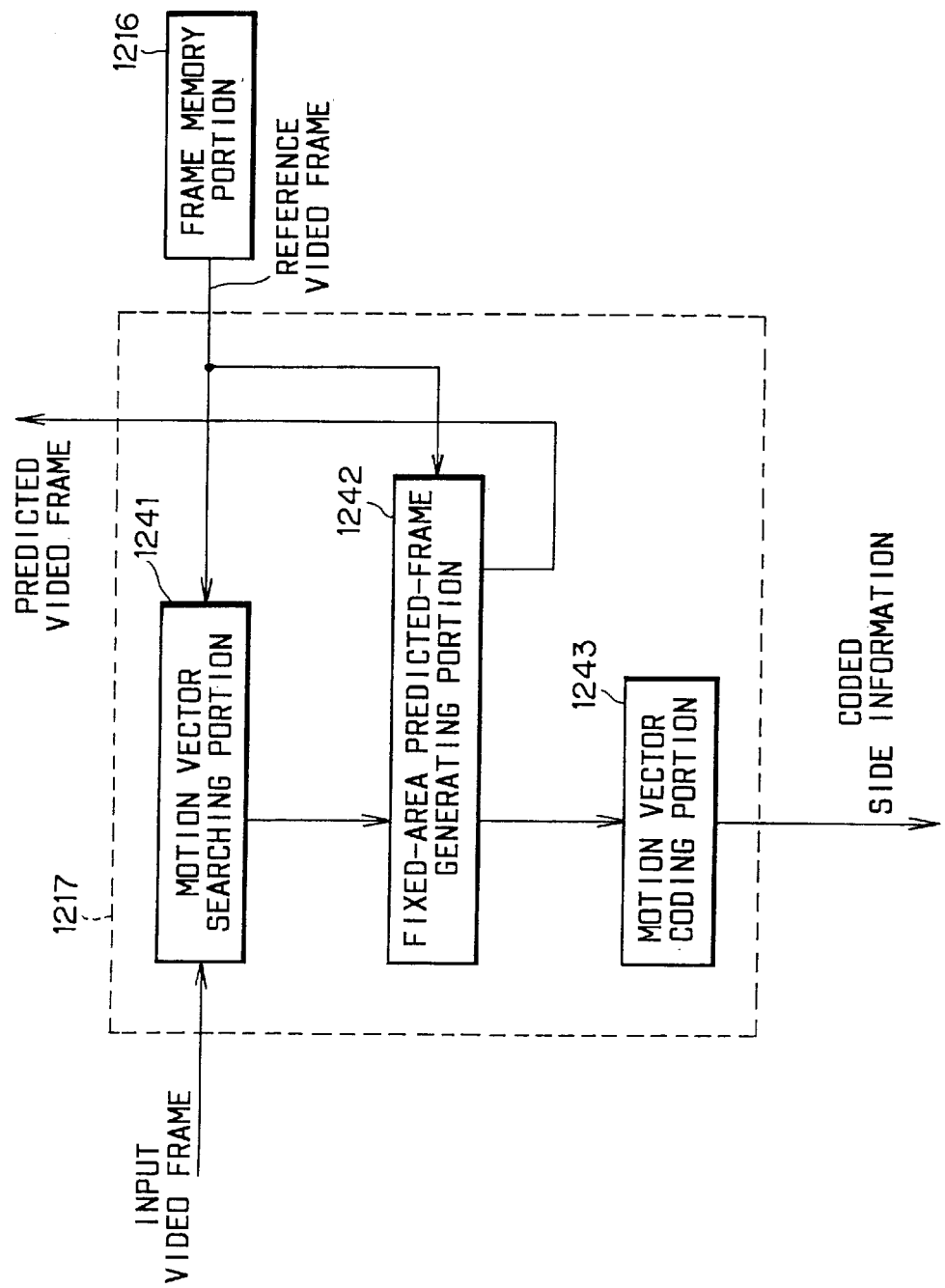
FIG. 7 is illustrative of a motion-compensated interframe predicting portion of a conventional video coding device.

An exemplified structure of a motion-compensated interframe predicting portion and its operation will be first described as follows:

FIG. 7 shows a conventional example of a motion-compensated interframe predicting portion of a video-coding device.

As FIG. 7 shows, the motion-compensated interframe-predicting portion 1217 comprises a motion-vector searching portion 1241, a fixed-area predicted-frame generating portion 1242 and a motion-vector coding portion 1243.

The motion-vector searching portion 1241 searches motion vectors in an input video-frame and a reference video-frame read from a frame memory 1216 and outputs the detected motion-vectors to the fixed-area-size predicted-frame generating portion 1242.

When searching motion vectors, the motion-vector searching portion 1241 searches a motion vector of a control grid point by previously weighting a center pixel of a processable area and outputs a motion vector of each control grid point to the fixed-area-size predicted-frame generating portion 1242.

Figure 14:
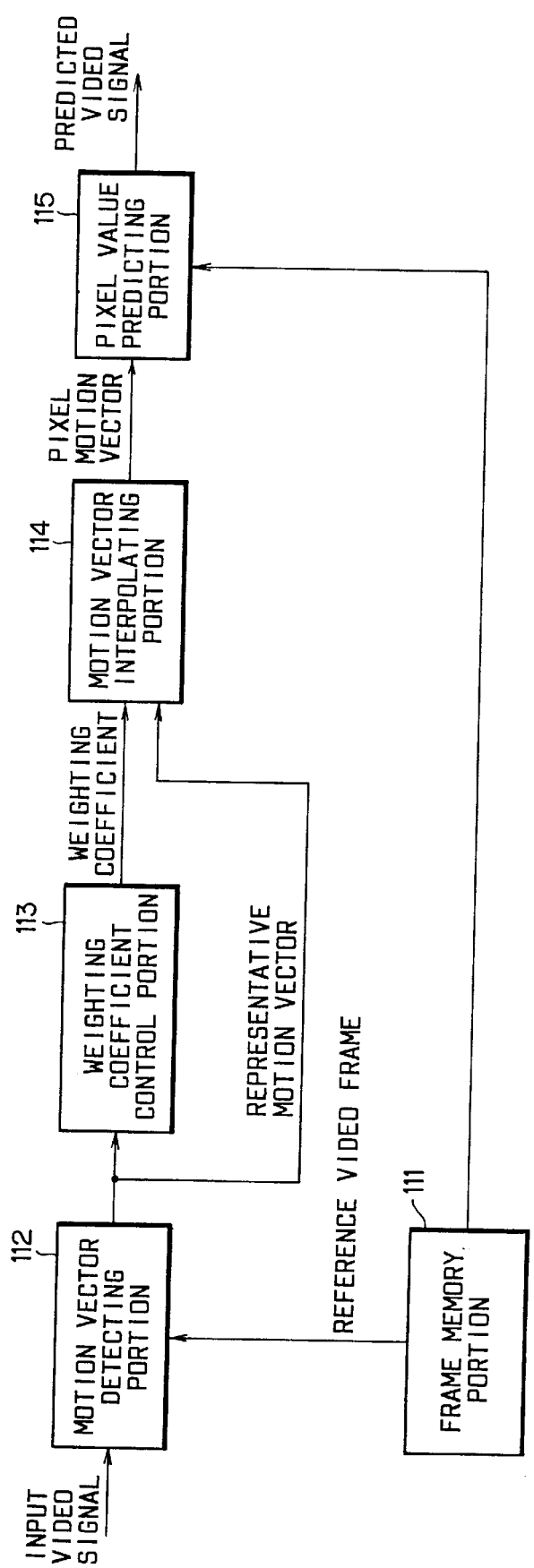
FIG. 14 is a simplified block diagram of a video coding device embodying the present invention.

According to the conventional method, a processable area has a fixed size with control grid points set one for 16 or 8 pixels. FIG. 14 illustrates an example of a control grid whose points set one for 16 pixels, indicating motion vectors existing therein.

The fixed-area-size predicted-frame generating portion 1242 performs interframe prediction on each processable area having a fixed size (generally in a rectangular block of 16×16 pixels) by using motion vectors inputted from the motion vector searching portion 1241 and a preceding video-frame read from the frame memory portion 1216.

The interframe prediction is realized by determining affine parameters from positions of three vertex points of each objective triangular area, performing affine transformation on every pixel existing within the triangular area and repeating the same processing on all processable triangular areas to produce a predicted video-frame.

The produced predicted video-frame is transferred to the before-described subtracting portion 1211 and adder portion 1215. The motion vectors are transferred to the motion vector coding portion 1243.

The motion vector coding portion 1243 encodes the motion vectors received from the fixed-area predicted-frame generating portion 1242 and outputs them as coded side-information.

The motion-vector coding device 1243 encodes the motion vectors by the following method:

Motion vectors are generally encoded not directly but by predictive method. Namely, a predictive value of each codable objective motion vector is determined and a difference between the predicted value and the motion vector value is encoded. By doing so, the efficiency of coding can be improved with a saved amount of information.

The most simple method of determining a predicted value is such that just coded vector value is adopted as a predicted value of a proceeding motion-vector. According to this method, differences of two successive neighboring motion vectors are encoded in turn. By reason of a high correlation between motion vectors, it is possible to effectively encode motion vectors particularly in the case when neighboring motion vectors have similar values. This prediction coding method is adopted in a motion-vector coding method defined by ITU-T Recommendation H.261.

Another method is to determine a predicted value from a plurality of motion vectors including a just-preceding vector. In this case, a prediction value is determined by using values of three motion-vectors which are located, respectively, left, just above and above right from a codable objective motion-vector. The prediction value may be a mean value or a median of three values of the three neighboring motion-vectors. In comparison with the predicting method using only just-preceding motion vector this method can use a wider range of correlation, i.e., higher correlation of motion vectors, attaining a further improved coding efficiency. The video coding system defined by the ITU-T Recommendation H.263 adopts the prediction method for coding predicted a motion vector by using a median of the three motion-vector values, which is well known to be more effective.

Figure 8:
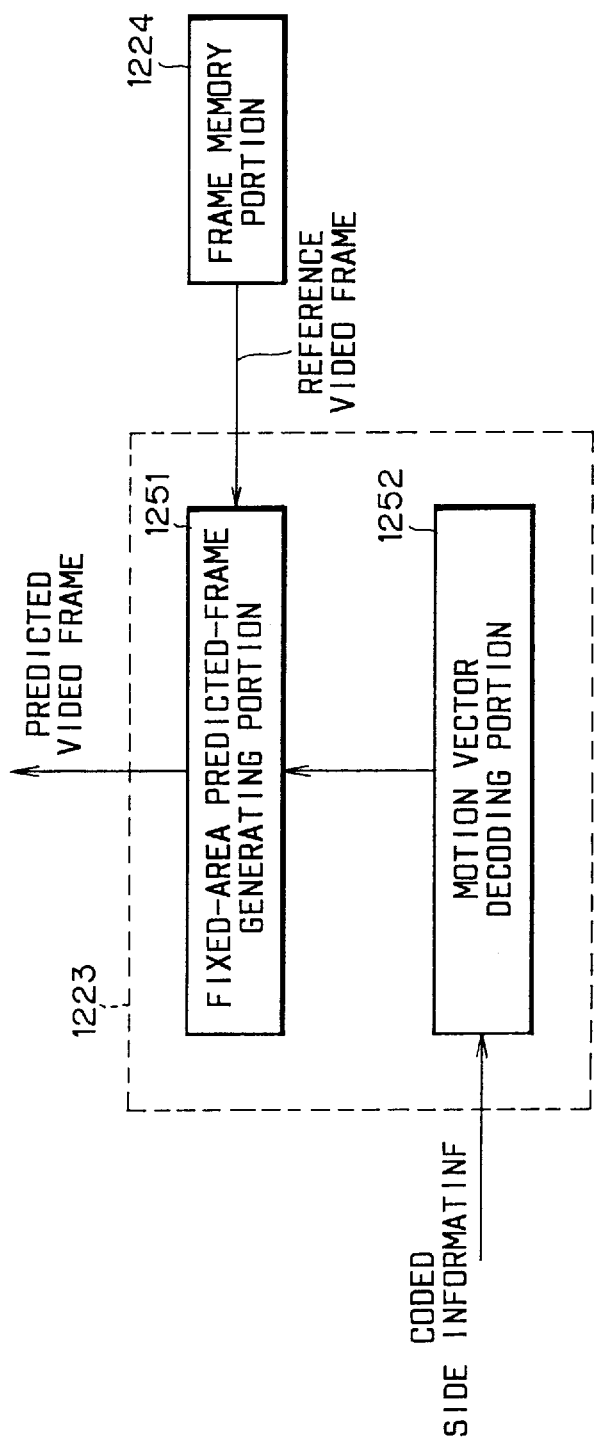
FIG. 8 is illustrative of a motion-compensated interframe predicting portion of a conventional video decoding device.

The structure and operation of a motion-compensated interframe-predicting portion 1223 of a conventional video-decoding device will now described as follows:

FIG. 8 is illustrative of an exemplified structure of the motion-compensated interframe-predicting portion of the video-decoding device.

As shown in FIG. 8, the motion-compensated interframe predicting portion 1223 is composed of a fixed-area-size predicted-frame generating portion 1251 and a motion-vector coding portion 1252.

Coded side-information inputted into the motion-compensated interframe predicting portion 1223 is transferred to the motion-vector coding portion 1252 which in turn decodes the received coded side-information, obtains motion vectors and outputs the motion vectors to the fixed-area-size predicted-frame generating portion 1251.

The fixed-area-size predicted-frame generating portion 1251 performs interframe prediction processing by using the motion vectors received from the motion vector decoding portion 1252 and a reference video-frame received from the frame memory portion 1224.

Interframe prediction is to determine affine parameters from positions of three vertices of an objective triangular area and motion vectors and then to perform affine transformation of all pixels within the triangular area by using the determined affine parameters. This processing is repeated on all objective triangular areas to generate a predicted video-frame.

The fixed-area-size predicted-frame generating portion 1251 outputs the obtained predicted video-frame to an adder portion 1222.

Some kinds of methods used for motion-compensated interframe prediction in the above-mentioned video-coding and video-decoding devices will be described below.

Figure 9:
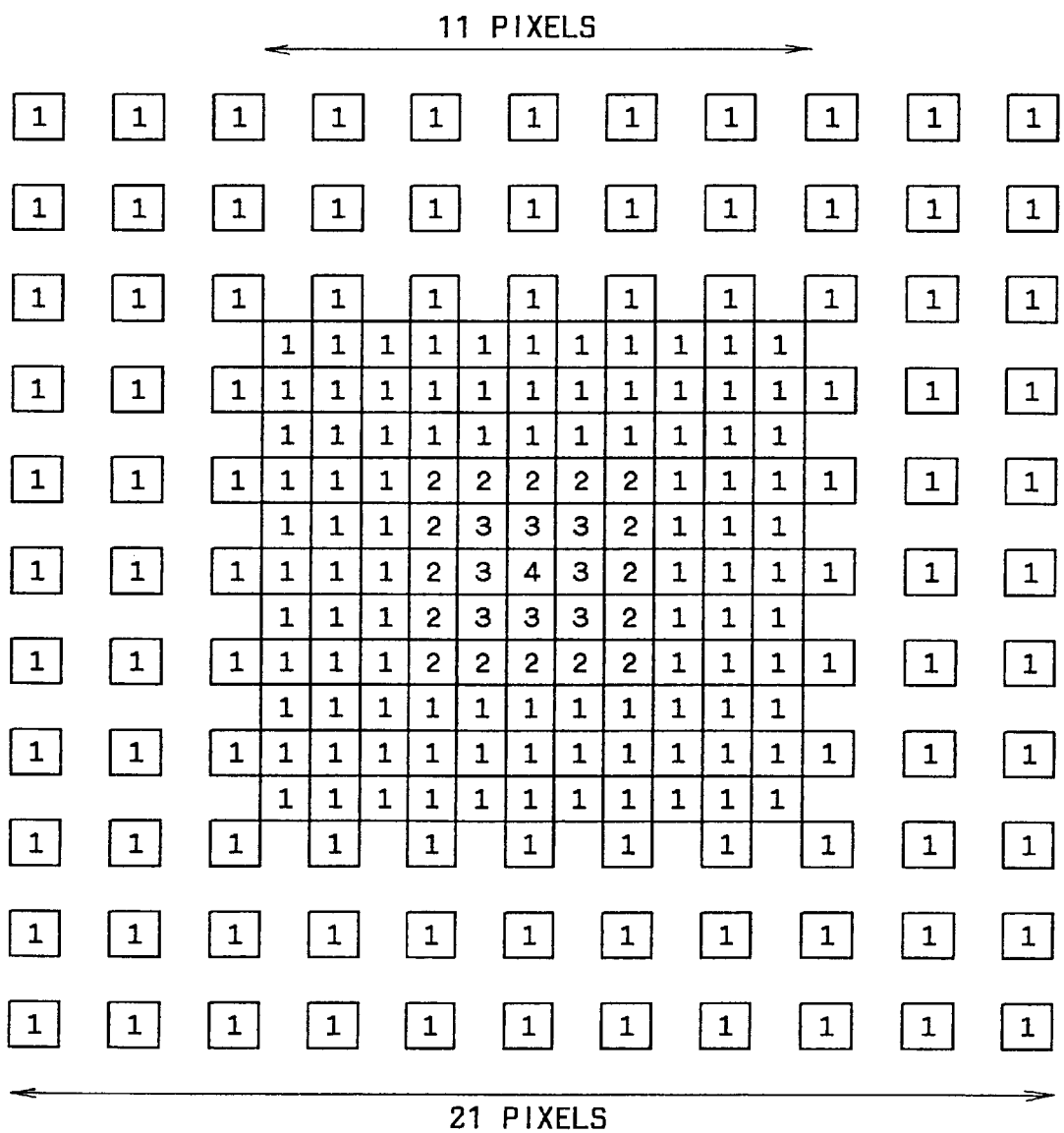
FIG. 9 is view for explaining a weighting method used when searching a motion vector according to the present invention.

A motion vector searching method is as follows:

A so-called "pixel-matching" method that weights generally a center pixel in a processable area is used for determining a motion vector of a control grid point. FIG. 9 is an illustration of a weighted area of pixels. In FIG. 9, the processable area is composed of 21 pixels for instance each in X-direction and Y-direction. The pixel matching is such that an area of a reference frame, which matches with the processable area of a current frame is determined by calculation and then motion vectors are determined as displacement values in X-direction and Y-direction. In matching calculation, a difference between the processable area of the current video-frame and the matched area of the reference frame processable is multiplied by a weighting coefficient. By doing so, motion vectors are searched putting a weight on a center pixel in the processable area.

Figure 10B:
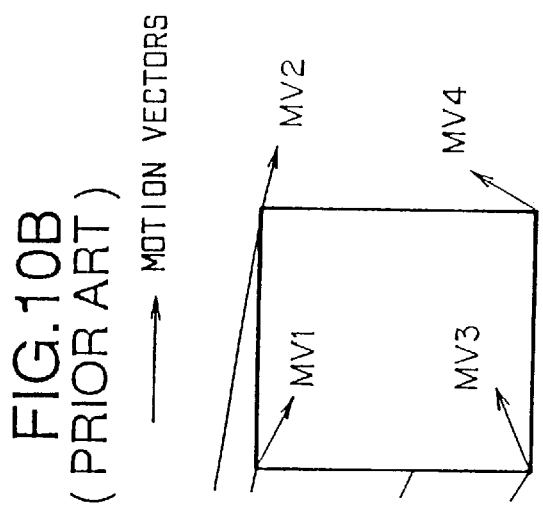
FIG. 10 is a view for explaining a control grid and a motion vector according to a prior art.
Figure 10A:
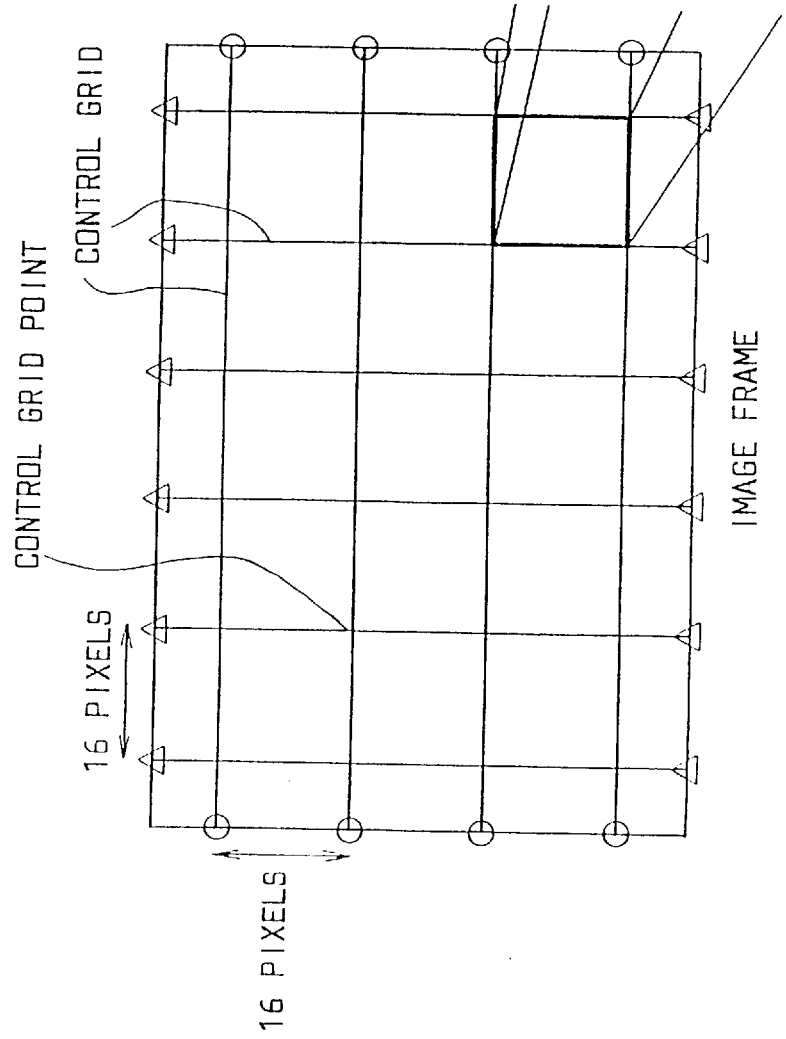

Motion vectors at control grid points located at the periphery of a video-frame are set as follows:

Motion vectors at quadrangular control grid points:
X- and Y-components of each vector are set both at 0.
Motion vectors at the top and bottom control grid points (triangles shown in FIG. 10):
An X-component is determined as an X-component of a motion vector detected at a control grid point one inside from an objective control grid point. A Y-component is set at 0.
Motion vectors at the left-side and right-side control-grid points (circles shown in FIG. 10):
An X-component of each motion vector is set at 0.
A Y-component is determined as a Y-component of a motion vector detected at a control grid point one inside from an objective control grid point.

The affine transformation is described as follows:

The affine transformation is conducted by representing a map from a video-frame to another video-frame by using six parameters.

The affine transformation is conducted, for the sake of simplifying calculation of affine parameters, usually on a triangular area.

FIG. 11 is a view for explaining a method for interframe prediction by using affine transformation in the case of forward predicting.

Motion vectors of control grid points A, B, C and D of the current video-frame are detected at corresponding control grid points A', B', C' and D' of a reference video-frame.

Three of four control grid points are first selected and an area is divided to determine affine parameters. For example, the area on the current video-frame is divided into two triangles ABC and BCD on the current video-frame and a corresponding area on the reference video-frame is divided into two triangles A'B'C' and B'C'D'.

On the triangles into which the area is divided, affine parameters are determined from vertex positions of each triangle (vertex positions of one triangle and motion vectors of the other may be used).

A predictive video-frame is generated by mapping thereto all pixels of all triangular sub-areas according to the obtained affine parameters.

If a position of any referred pixel in the reference video-frame is not an integer, a predicted value is bilinearly interpolated to determine a pixel value of the predicted video-frame.

A predicted video-frame is generated by performing the above-mentioned processing operations.

The operation of a motion-compensated interframe predicting portion in a video-coding device and a video-decoding device and methods applied therein will be described below.

Figure 12:
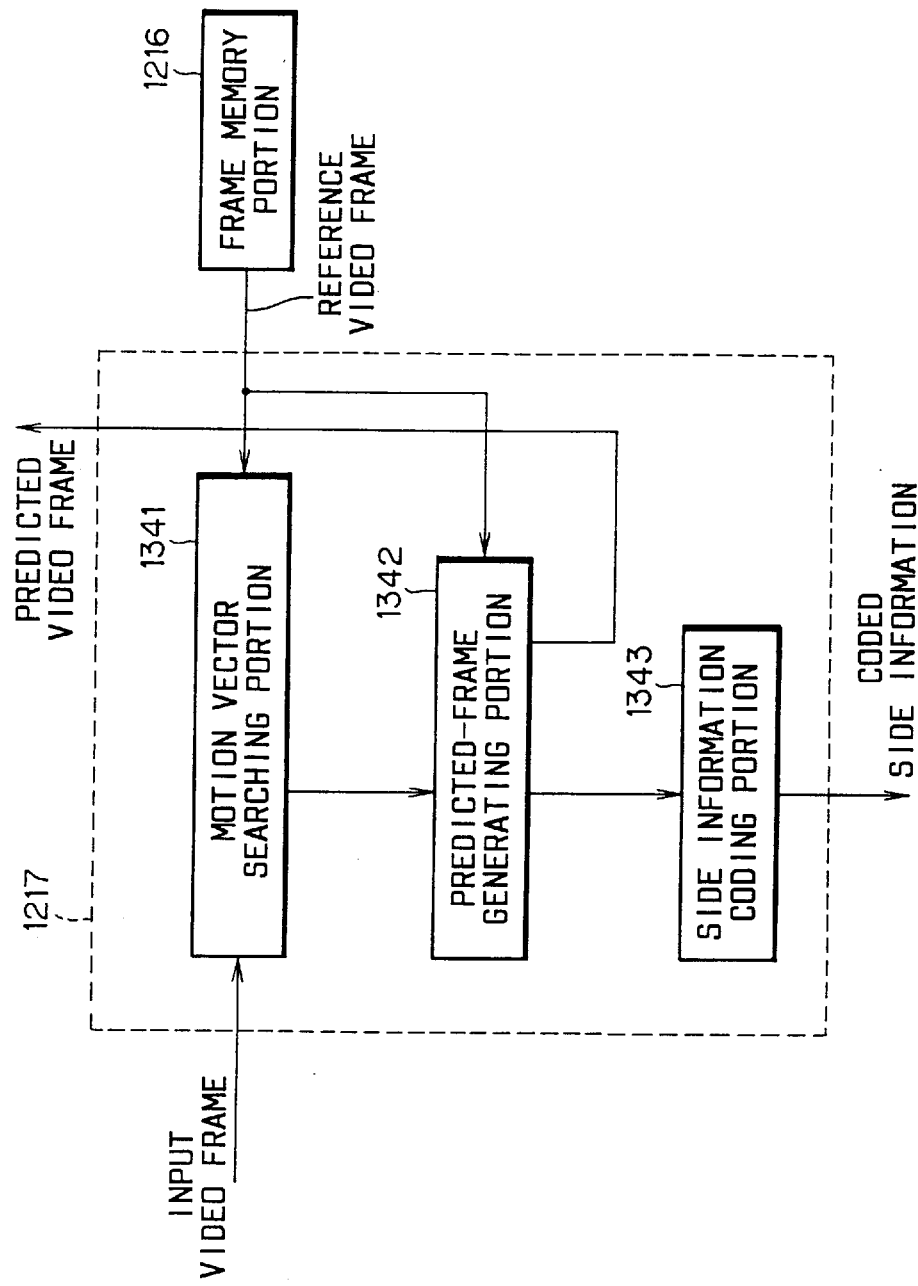
FIG. 12 shows an exemplified structure of a motion-compensated interframe-predicting portion of a conventional video coding device.

An exemplified structure of a motion-compensated interframe predicting portion 1217 (shown in FIG. 5) and its operation will be first described as follows:

As shown in FIG. 12, the motion-compensated interframe-predicting portion 1217 comprises a motion-vector searching portion 1341, a predicted-frame generating portion 1342 and a motion-vector coding portion 1343.

The motion-vector searching portion 1341 searches motion vectors in an input video-frame and a reference video-frame read from a frame memory portion 1216 and outputs the detected motion-vectors to the predicted frame generating portion 1342.

The predicted frame generating portion 1342 generates a predictive image by using any one of prediction methods, i.e., block-displacement method, affine transformation method and bilinear transformation method, etc.

In the process of generating a predicted video-frame, side-information such as area-information and motion vectors can be obtained.

The generated predicted video-frame is transferred to the subtracting portion 1211 and the adder portion 1215 while the side-information is transferred to the side-information coding portion 1343.

The side-information coding portion 1343 encodes the side-information received from the predicted-frame generating portion 1342 and outputs the coded side-information.

Figure 13:
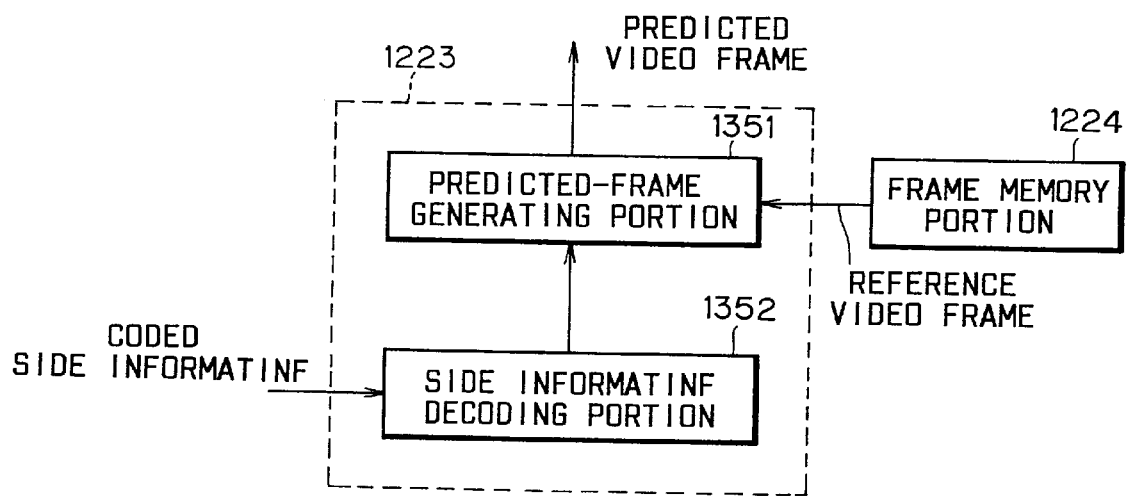
FIG. 13 shows an exemplified structure of a motion-compensated interframe-predicting portion of a conventional video decoding device.

The structure and the operation of the motion-compensated interframe-predicting portion 1223 (shown in FIG. 8) of a conventional video-decoding device will be now described as follows:

As shown in FIG. 13, the motion-compensated interframe predicting portion 1223 is composed of a predicted-frame generating portion 1351 and side-information decoding portion 1352.

Coded side-information inputted into the motion-compensated interframe predicting portion 1223 is transferred to the side-information decoding portion 1352.

The side-information decoding portion 1352 decodes the received coded side-information, obtains decoded side-information including area-information and motion vectors, etc., and outputs the decoded side-information to the predicted-frame generating portion 1351.

The predicted-frame generating portion 1351 performs interframe-prediction processing by using the side-information received from the side-information decoding portion 1352 and the reference video-frame received from the frame memory portion 1324 and outputs the produced predicted video-frame to the adder portion 1222.

An embodiment of the present invention will be explained below referring to the accompanying drawings. FIG. 14 shows an exemplified structure of an interframe predicting portion of a video coding device according to the present invention.

As shown in FIG. 14, the video coding device comprises a frame memory portion 111 for storing already encoded video signals, a motion vector detecting portion 112 for determining a representative motion vector per unit area from a difference between an input video signal and a video signal read from the frame memory portion 111, a weighting coefficient control portion 113 for determining weighting coefficient for each representative motion vector and instructing the weighting of each representative motion vector, a motion vector interpolating portion 114 for determining a motion vector per pixel from a representative motion vector, a pixel value predicting portion 115 for preparing a predicted video signal from a video signal read from the frame memory portion 111 by using each motion vector per pixel.

The frame memory portion 111, the motion vector detecting portion 112 and the pixel value predicting portion 115 are similar in function to those of the conventional video coding device. The video coding device according to the present invention differs from the conventional device by provision of the weighting coefficient control portion 113 for specifying a weighting coefficient for each representative motion vector and a vector interpolating portion 114 which determines a motion vector per pixel from a representative motion vector outputted by the motion vector detecting portion 112 and by using a weighting coefficient for each vector, said coefficient being outputted from the weight coefficient control portion 113.

The operations of the weighting coefficient control portion 113 and the motion vector interpolating portion 114, both of which are essential portions of the embodiment, are as follows:

In this embodiment, the motion vector interpolating portion 114 uses the bilinear transformation method for determining a motion vector of a pixel but it may also use the affine transformation method. Like in the above-mentioned conventional coding device, the motion vector interpolating portion 114 performs operation on each unit-area. Namely, a unit-area for bilinear transformation is an area enclosed by four neighboring representative points (three representative points in the case of the affine transformation) corresponding to representative motion vectors outputted from the motion vector detecting portion 112. The weighting coefficient control portion 113 decides weighting coefficients for respective motion vectors of respective vertices (representative points) for a unit-area to be transformed. At this time, it may be considered that pixels neighboring to the representative points are subjected to most strong effect of vectors of respective nearest representative points. Accordingly, a unit-area to be transformed is further divided into subareas which are given different weighting coefficients. FIG. 3(c) illustrates that a unit area is divided into four subareas.

The weighting coefficient control portion 113 judges whether motion vectors of vertices of a unit-area for transformation represent a movement of the same object of an image, i.e., said unit-area exists on one object in the image or not. When having judged the motion vectors concern the same object, the weight coefficient control portion 113 instructs the motion vector interpolating portion 114 to evenly weight all representative motion vectors of vertices (e.g., all with the same coefficient of 1). When having judged the vertices of the unit-area existing on different objects, the weight coefficient control portion 113 decides weighting coefficients in such a way that a motion vector of a vertex existing on the same object as a remarked subarea represented by a vertex is weighted with a larger weighting coefficient and a motion vector of a vertex judged to exist on a different object is weighted with a smaller weighting coefficient. In the extreme case, the weighting coefficient control portion 113 instructs the motion vector interpolating portion 114 to weight the motion vector of the different object with a weighting coefficient of 0 not to use said vector. The determination of weight coefficients is conducted subarea by subarea. Weighting is controlled in such a way that a motion vector which was given a large weighting coefficient in an subarea is given a small weighting coefficient in other subareas. This is illustrated in FIG. 3(d). Weighting coefficients outputted by weighting coefficient control portion 113 may be a series of real numbers or they may be determined by selecting the most approximates to an optimal value from discretely defined values, e.g., 0, 0.25, 0.5, 0.75 and 1.

The motion vector interpolating portion 114 weights every representative motion vector with a weighting coefficient specified by the weighting coefficient control portion 113 and then calculates motion vectors of respective pixels in the subarea and outputs the calculation results. When a motion vector of a vertex of a unit-area for transformation is $MV_i$ (i=1, 2, 3, 4) and a weight for the motion vector $w_{i,j}$ (i,j=1, 2, 3, 4), a weighting method may have by way of example as follows:

$$WMV_j = \sum_i w_{ij} \cdot MV_i \quad (i, j = 1, 2, 3, 4) \quad (1)$$

The usual bilinear transformation equation may be calculated by using the weighted motion vector $WMV_j$. When a motion vector $MVP_{xy}$ of a pixel having coordinates (x, y) is determined from a base motion vector $MV_i$ by bilinear transformation and a weight $w_i$ (i=1, 2, 3, 4) is given to the motion vector, the following equation is described.

$$WMVP_{xy} = w \cdot MVP_{xy} + (1 - w) \cdot \sum_i w_i \cdot MV_i \quad (i = 1, 2, 3, 4) \quad (2)$$

A coefficient w indicates a weighting ratio as a whole. The pixel motion vector $MVP_{xy}$ is corrected to $WMVP_{xy}$ in view of weighting.

The motion vector interpolating portion 114 performs the above-mentioned operations for each subarea by using the weighting coefficient specified for each subarea by the weighting coefficient control portion 113.

The weight coefficient control portion 113 may have M sets of weighting coefficients previously prepared, for example:

W={Wm} (m=1,2, . . . M)
Wm={Wmij} (i,j=1, 2, 3, 4)

It may select one of the prepared coefficients as an optimal weight pattern for each unit-area or subarea, which coefficient is nearest to a weighting coefficient determined for the unit-area or subarea by the above-mentioned weighting coefficient processing. In this case, the weight coefficient control portion 113 give information about a selected pattern to the motion vector interpolating portion 114. It is also possible to previously prepare weight patterns of paired weighting coefficients, one of which is for one subarea and the other is for other subarea. In this case, it becomes possible to specify weighting coefficients for all subareas of a unit-area at a time by specifying only a weight pattern for the unit-area.

In this instance, the motion vector interpolating portion 114 holds the same weight patterns as those held in the weighting coefficient control portion 113, and it determines a motion vector for each pixel in the similar way as described before by using weighting coefficients for each motion vector according to the specified weight coefficient pattern. It outputs the calculation results.

Figure 15:
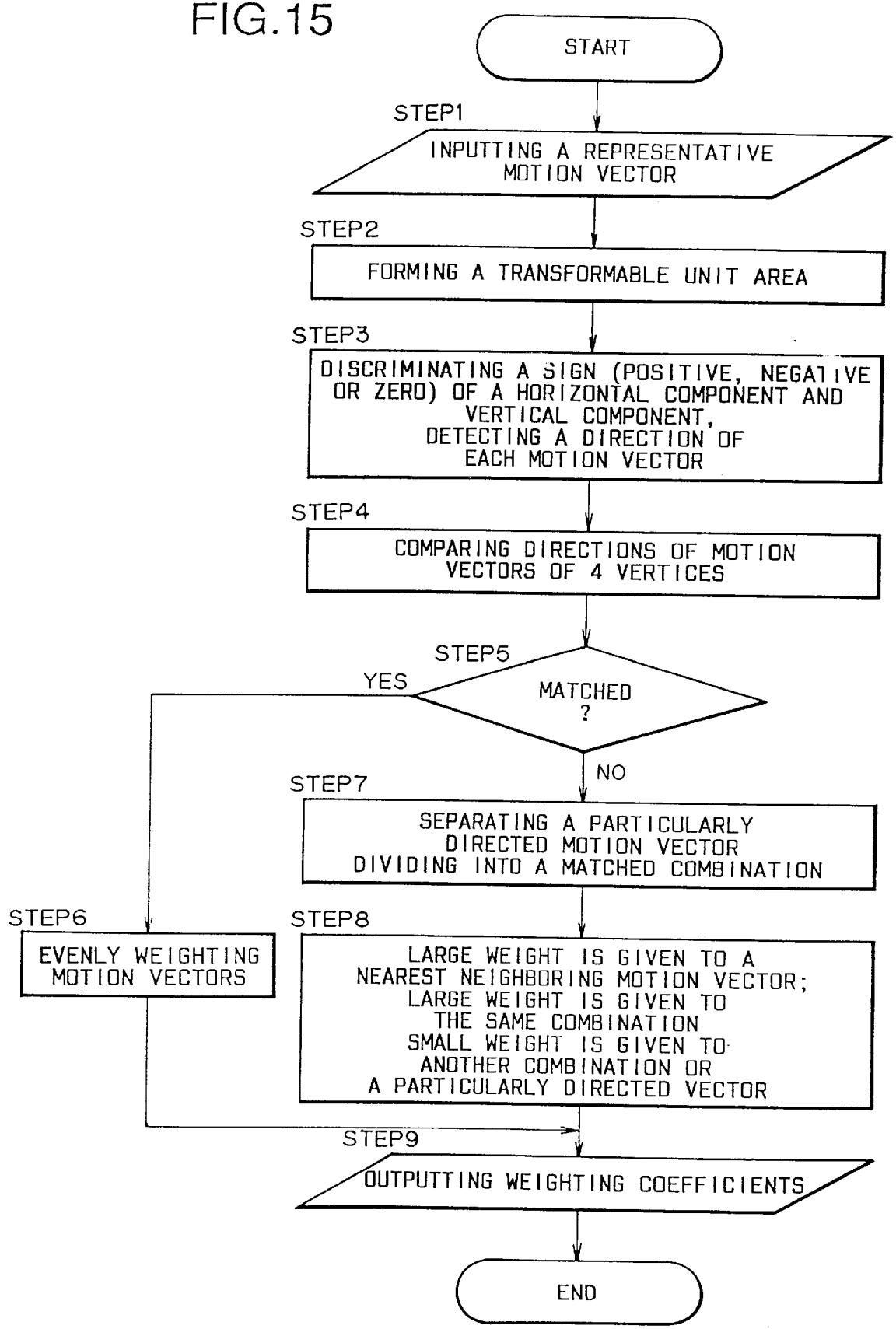
FIG. 15 is a flow chart showing a first example of operations of a weighting coefficient control portion of a video coding device according to the present invention.

Referring to a flow chart shown in FIG. 15, a first example of the weighting coefficient control portion 113 of video coding device according to the present invent ion will be described as follows:

The motion vector detecting portion 112 enters representative motion vectors into a weighting coefficient control portion 113 (Step 1). The weight coefficient control portion 113 forms a transformable unit area of four neighboring representative points (Step 2). Then, it examines signs of horizontal and vertical components of each representative point of each vertex and classify directions of motion vectors by extracting only positive, negative or zero signs (Step 3). The examination results are compared with each other to determine whether motion vectors of four vertices have roughly matched directions (Steps 4 and 5). If the motion vectors were recognized to be of a small dispersion and enough adjusted, they are considered to represent the same object of an image and the same weighting coefficients are outputted (Step 6, 9). The transformable unit-area, if there is found a large dispersion between the motion vectors, is judged to include a plurality of different objects in an image. A vector showing a particular direction is separated and put into another matched group (Step 7). Weighing coefficients are decided for each subarea of the transformable unit area in such a way that a nearest neighboring motion vector of a remarked subarea and a motion vector showing a matched direction is weighted heavy and the motion vector judged to belong to other group or to show a particular direction is weighted light (Steps 8 and 9).

Figure 16:
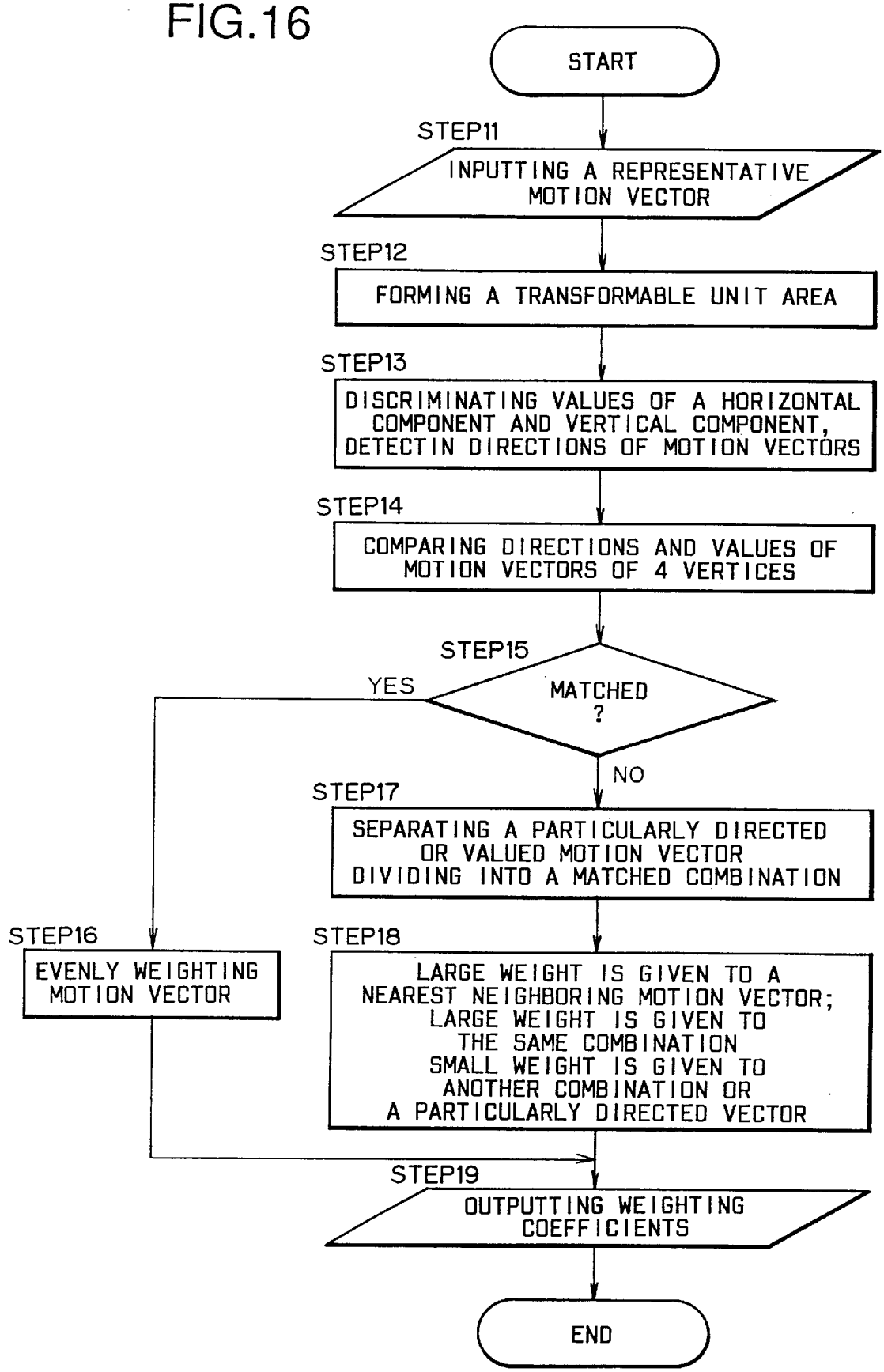
FIG. 16 is a flow chart showing a second example of operations of a weighting coefficient control portion of a video coding device according to the present invention.

Referring to a flow chart shown in FIG. 16, a second example of the weight coefficient control portion 113 of video coding device according to the present invention will be described as follows:

Like the first example, a motion vector detecting portion 112 enters representative motion vectors into a weighting coefficient control portion 113 (Step 1) whereby a transformable unit area is formed by four neighboring representative points (Step 2). Then, horizontal and vertical component values of four neighboring representative vectors of every vertex are compared with each other (Steps 2 and 4) and the motion vectors of the four vertices are examined whether they are matched in their directions and magnitudes (Step 5). When the examination result shows the motion vectors are satisfactorily matched to each other without a large dispersion, the motion vectors are considered to represent the same object in an image and a uniform weighting coefficient is outputted for them (Steps 6 and 9). If there is found a large dispersion between the motion vectors, the unit-area to be transformed is judged to include a plurality of different objects in an image. A motion vector showing a particular direction and magnitude is separated and put into another matched group (Step 7). Weighting coefficients for each subarea of the transformable unit area are decided in such a way that a nearest neighboring motion vector of a remarked subarea and a motion vector matched thereto are weighted heavy and the motion vector judged to belong to other group or to show a particular direction is weighted light (Steps 8 arid 9).

The second example differs from the first example by using not only vector signs but also vector values itself and being therefore capable of more accurately determining a direction of each vector and discriminating two motion vectors directed in the same direction but having different magnitudes. Namely, more strict processing of the vectors can be accomplished.

Figure 17:
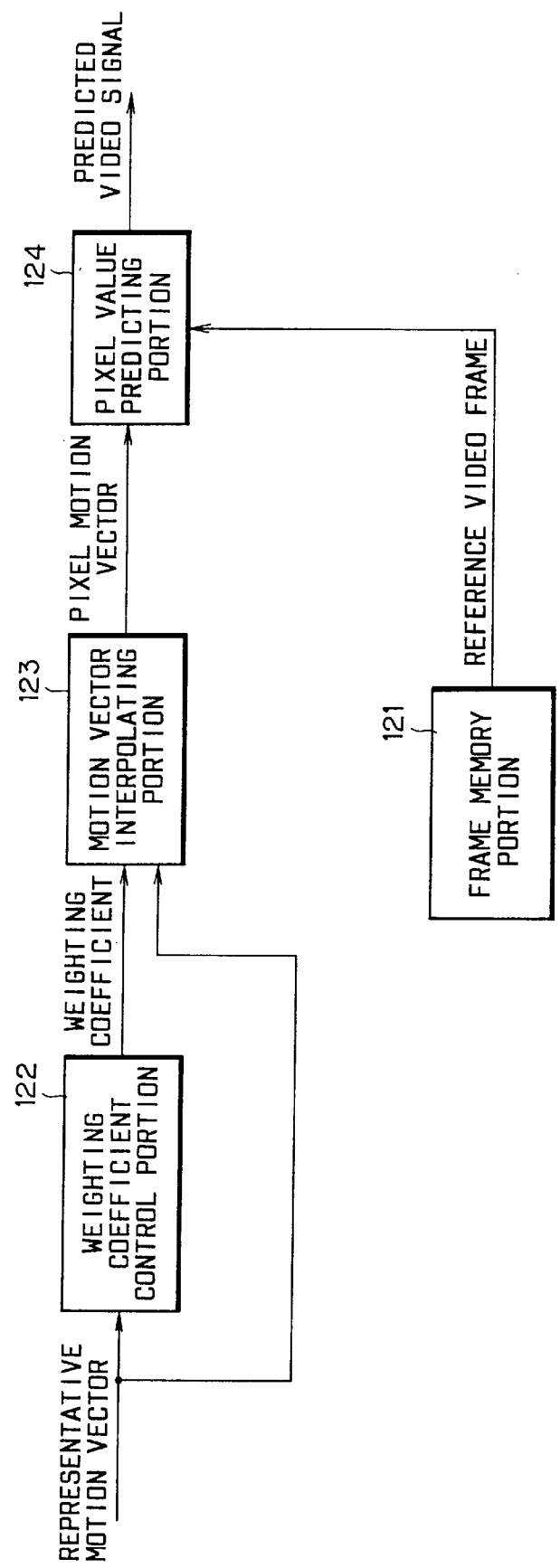
FIG. 17 is a simplified block diagram of a video decoding device embodying the present invention.

FIG. 17 shows a first example of a structure of an interframe predicting portion composing a video decoding device according to the present invention. The video decoding device of FIG. 17 comprises a frame memory portion 121 for storing already decoded video signals, a weighting coefficient control portion 122 for determining and designating weighting coefficients for representative motion vectors inputted for every transformable unit-area, a motion vector interpolating portion 123 for determining a motion vector per pixel from the representative motion vectors and the weighting coefficients, a pixel value predicting portion 124 for preparing a predicted video signal from a video signal read from the frame memory portion 121 by using the motion vector per pixel.

The frame memory portion 121 and the pixel value predicting portion 124 are similar in function to those of the conventional video decoding device. The video decoding device according to the present invention differs from the conventional video decoding device in that the weighting coefficient control portion 122 is provided for specifying a weighting coefficient for each representative motion vector and a motion vector interpolating portion 123 is used for determining and outputting motion vectors pixel by pixel by using representative motion vector and a weighting coefficient for each vector outputted by the weighting coefficient control portion 122.

The operations of the weighting coefficient control portion 122 and the motion vector interpolating portion 123, both of which are essential portions of the embodiment, will be described below. However, both portions function similarly to those of the coding device according to the present invention. In other words, the decoding device performs the same processing operations that the coding device does.

The weighting coefficient control portion 122 decides weighting coefficients for respective motion vectors of respective vertices (representative points) for a unit-area to be processed by the motion vector interpolating portion 123 and specifies the coefficients for each subdivision of the transformable unit area. The weighting coefficient control portion 122 also judges whether motion vectors of vertices of a unit-area for transformation represent a movement of the same object in an image, i.e., said unit-area exists on one object in the image or not. When having judged the motion vectors concern the same object, the weight coefficient control portion 122 instructs the motion vector interpolating portion 123 to evenly weight all representative motion vectors of vertices. When having judged any vertex of the unit-area existing on different objects, the weighting coefficient control portion 122 decides weighting coefficients in such a way that a motion vector of a vertex existing on the same object as a remarked subarea represented by a vertex is weighted with a larger weighting coefficient and a motion vector of a vertex judged to exist on a different object is weighted with a smaller weighting coefficient. The processing operations and outputs of the weighting coefficient control portion 122 are similar to those of the weighting coefficient control portion 113 of the video coding device.

The motion vector interpolating portion 123 receives the designated weighting coefficients from the weighting coefficient control portion 122 and calculates motion vectors for every pixel in the subarea by using the received coefficients in the same way as described for weighting motion vectors by the motion vector interpolating portion 113 of the video coding device.

The weighting coefficient control portion 122 may have M sets of weighting coefficients previously prepared and may select one of them as an optimal weight pattern for each unit-area or subarea, which coefficient is nearest to a weighting coefficient determined for the unit-area or subarea by the above-mentioned weighting coefficient processing. This feature is the same as described in the video coding device. In this case, the weighting coefficient control portion 122 give information about the selected pattern to the motion vector interpolating portion 123.

The motion vector interpolating portion 123 has the same weight patterns as held in the weighting coefficient control portion 122, determines motion vectors for pixels by using the corresponding weighting coefficients according to the specified weight pattern in the above-mentioned way and outputs the weighted motion vectors.

Figure 18:
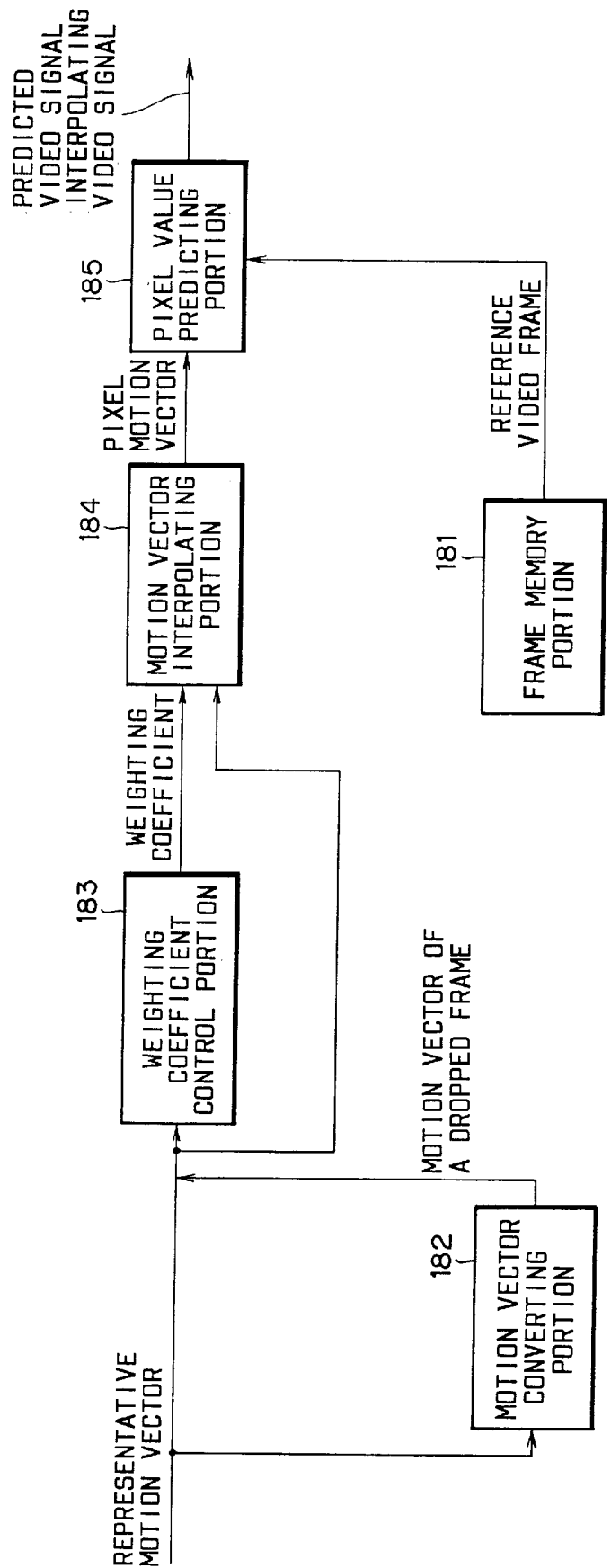
FIG. 18 is a simplified block diagram showing an exemplified structure of a video decoding device according to the present invention.

FIG. 18 shows a second exemplified structure of an interframe predicting portion of a video decoding device according to the present invention.

The video decoding device of FIG. 18 comprises a frame memory portion 181 for already decoded video signals, a motion vector converting portion 182 for calculating representative motion vectors for an dropped frame from representative motion vectors for a coded frame, a weighting coefficient control portion 183 for determining and indicating weighting coefficients of representative motion vectors inputted for a unit area, a motion vector interpolating portion 184 for calculating a motion vector for each pixel from the corresponding representative motion vector by using the weighting coefficients and a pixel value predicting portion 185 for preparing a predicted video signal from a video signal read from the frame memory portion 181 by using the motion vector per pixel.

The frame memory portion 181, the weighting coefficient control portion 183, the motion vector interpolating portion 184 and the pixel value predicting portion 185 are similar in function to those of the first embodiment of the video decoding device. This second embodiment of the video decoding device differs from the first embodiment by provision of motion vectors of encoded video frame and of the motion vector converting portion 182 for outputting motion vectors of video frames omitted without having been encoded.

The operation of the motion vector converting portion 182 is as follows:

The motion vector converting portion 182 internally divides a representative motion vector for an input coded video frame according to a temporal distance between two neighboring video frames and a temporal position of an omitted video frame. For example, a first frame of a video sequence was first encoded and a fifth frame was next encoded. Namely, three frames (second, third and fourth frames) were skipped. Now, representative motion vectors for the fifth video frames are inputted. In this case, a temporal distance between the coded frames (i.e., the first frame and the fifth frame) is 4. As the motion vectors for the fifth frame may represent a movement for 4-frame time, the vector value is proportionally distributed to the dropped frames: motion vectors for the second frame, the third frame and the fourth frame are determined by multiplying the fifth-frame motion-vector value by ¼, ½ and ¾ respectively. The determined values are outputted as the motion vectors for respective dropped frames.

The outputted motion vectors are transferred to the weighting coefficient control portion 183 and the motion vector interpolating portion 184, wherein the vectors are processed in the same way as in the first embodiment. Finally, predicted video-signals are prepared by the pixel value predicting portion 185 and outputted as interpolating video-signals of the dropped video-frames.

As is apparent from the foregoing description, the video coding device and the video decoding device according to the present invention offers following advantages:

A video coding device is featured in that weighting coefficient control means determines weighting coefficient for each representative vector obtained by vector detecting means and give an instruction to motion vector interpolating means which can, therefore, accurately determine a motion vector of each pixel with a minimized effect of unrelated motion vectors even in the case of mismatches existing between a transformable unit-area and a content or position and movement of an object, realizing the improvement of the efficiency of interframe prediction coding. Accordingly, the application of this video-coding device can realize very high efficient video-coding system that is desired for use in very low bit-rate video-communication.

The video coding device is featured in that weight coefficient control means selects a suitable one of previously prepared and stored patterns of weighting coefficients for each representative motion vector and gives an instruction to motion vector interpolating means which can, therefore, accurately determine a motion vector of each pixel with a minimized effect of unrelated motion vectors in each transformable unit area, achieving a considerable improvement of the efficiency of interframe prediction coding by applying the above-mentioned simplified method. Owing to the increased efficiency of video coding with a reduced data amount, this video-coding device can realize saving in hardware and software and be manufactured with a reduced size at a low cost.

A video-coding device is featured in that its weight coefficient control means determines a weighting coefficient according to only a direction of each representative motion vector, considerably simplifying processing operations of the weight coefficient control means. Accordingly, the video-coding device, which has a high efficiency video-interframe prediction method giving an increased efficiency of video coding, has a small size and is inexpensive to manufacture.

A video-coding device is featured in that weighting coefficient control means determines a vector weighting coefficient according to a vector value of each representative motion vector to enable motion vector interpolating means to strictly discriminating motion vectors irrelevant to a pixel in a transformable unit area, achieving an improved quality of motion vectors of respective pixels. Accordingly, the video-coding device has a high efficiency video-interframe predicting system giving an increased efficiency of video coding enough to realize the encoding of video-signals at a further decreased bit-rate.

A video-decoding device is featured in that weighting coefficient control means determines weighting coefficient for each representative vector obtained by vector detecting means and give an instruction to motion vector interpolating means which can, therefore, accurately determine a motion vector of each pixel with a minimized effect of unrelated pixel's motion vector even in the case of mismatches existing between a transformable unit-area and a content or position and movement of an object, achieving a considerable improvement of the efficiency of interframe prediction and an increased quality of decoded video-signals. Accordingly, this video-decoding device can obtain high-quality decoded video-signals suitable for use in a very low bit-rate video-communications.

A video-decoding device is featured in that weighting coefficient control means selects a suitable one of previously prepared and stored patterns of weighting coefficients for each representative motion vector and gives an instruction to motion vector interpolating means which can, therefore, accurately determine a motion vector of each pixel with a minimized effect of unrelated motion vectors in each transformable unit area, achieving a considerable improvement of the efficiency of interframe prediction and an increased quality of decoded video-signals by using the above-mentioned simplified method. Accordingly, this video-decoding device can realize saving in hardware and software and be manufactured with a reduced size at a low cost.

A video-decoding device is featured in that its weight coefficient control means determines a weighting coefficient according to only a direction of each representative motion vector, considerably simplifying processing operations of the weight coefficient control means. Accordingly, the video-coding device, which has a high efficiency video-interframe prediction method giving an increased efficiency of video coding, has a small size and is inexpensive to manufacture.

A video-decoding device is featured in that weighting coefficient control means determines a vector weighting coefficient according to a vector value of each representative motion vector to enable motion vector interpolating means to strictly discriminating motion vectors irrelevant to a pixel in a transformable unit area, achieving an improved quality of motion vectors of respective pixels. Accordingly, the video-coding device has a high efficiency video-interframe prediction system method giving an increased efficiency of video coding enough to realize the encoding of video-signals at a further decreased bit-rate.

A video-decoding device is featured in that motion vector converting means determines a motion vector for a dropped frame from a representative motion vector inputted for a transformable unit area of encoded frame and prepares an interpolating video-signal corresponding to a frame skipped without having been encoded. This enables obtaining interpolating video-signals according to motion vectors of pixels accurately determined with a minimized effect of motion vectors irrelevant to those in a transformable unit-area. Namely, quality and temporal resolution of restorable images can be remarkably improved. Accordingly, the decoding device can obtain decoded video signals giving a smooth motion picture of high image quality even in a very low bit-rate video-communications.

Referring to accompanying drawings, preferred embodiments of the present invention will be described as follows:

The general operation of video-coding and video-decoding devices according to the present invention is the same as described before for the conventional video-coding and video-decoding devices. FIG. 5 illustrates an exemplified structure of the conventional video-coding device and FIG. 6 illustrates an exemplified structure of the conventional decoding device.

Accordingly, the operation of a motion-compensated interframe predicting portion of a video-coding device according to the present invention and the operation of a motion-compensated interframe predicting portion of a video-decoding device according to the present invention will be explained below.

Figure 19:
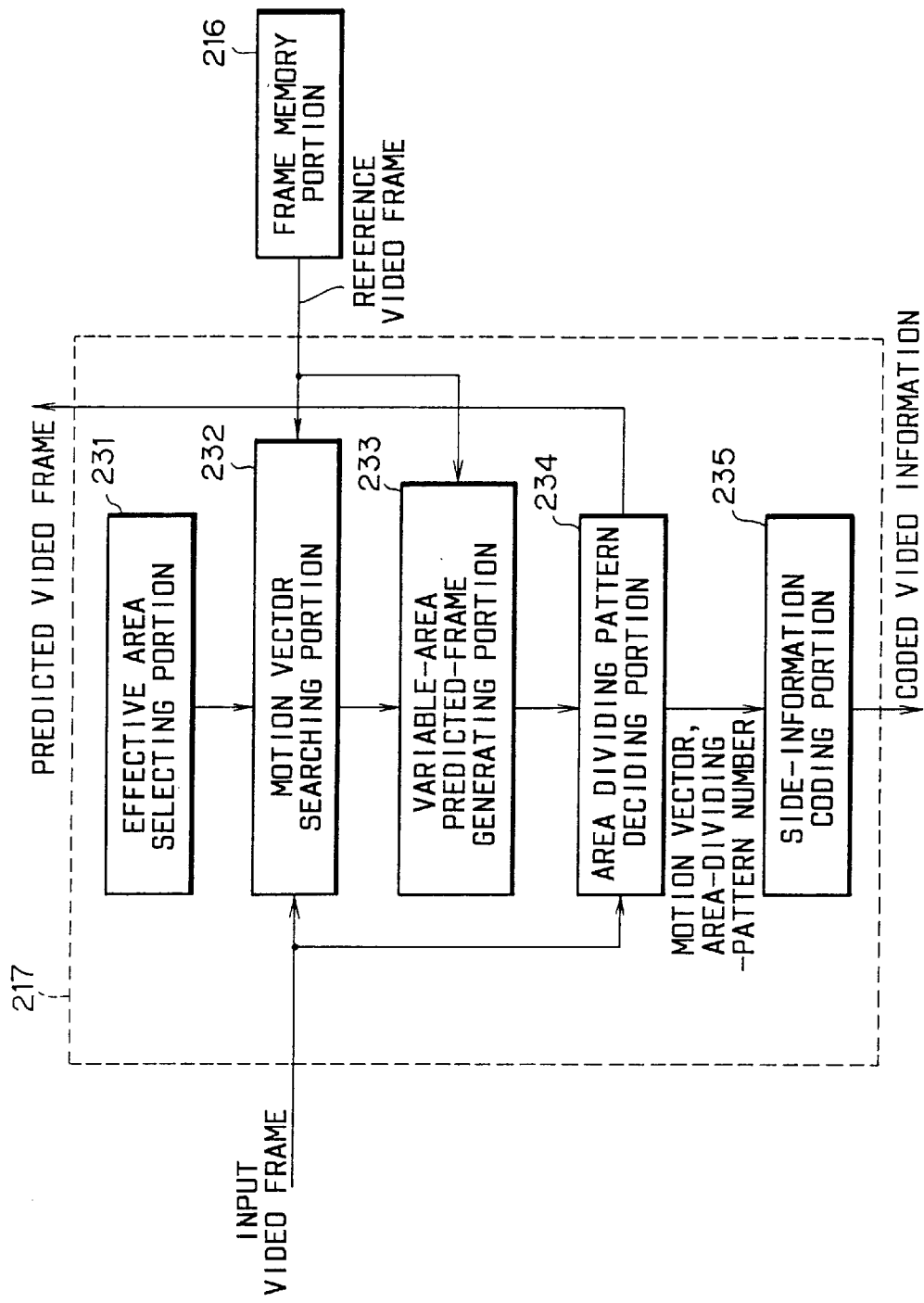
FIG. 19 shows an exemplified structure of a motion-compensated interframe predicting portion of a video coding device embodying the present invention.

A motion-compensated interframe-predicting portion for use in a video-coding device, which embodies the present invention, is described first as follows:

Referring to FIG. 19, a motion-compensated interframe-predicting portion 217 for use in a video-coding device is composed of an effective area selecting portion 231, a motion-vector searching portion 232, a variable-area predicted-frame generating portion 233, an area-dividing pattern deciding portion 234 and a side-information coding portion 235.

The effective area selecting portion 231 selects an effective-area selecting mask according to a position of a control grid on an input video-frame and outputs the selected mask to the motion vector searching portion 232.

The motion-vector searching portion 232 searches motion vectors at control grid points on the input video-frame and a reference video-frame inputted from frame memory 216 by using the effective-area mask specified by the effective-area mask selecting portion 231 and outputs the found motion vectors to the variable-area predicted-frame generating portion 233.

The variable-area predicted-frame generating portion 233 executes interframe prediction by using the motion vectors inputted from the motion-vector searching portion 232 and the reference video-frame inputted from the frame memory portion 216.

Interframe prediction is to determine affine parameters from positions of three vertices of an objective triangular area and motion vectors and then to perform affine transformation on all pixels within the triangular area by using the determined affine parameters. This processing is repeated on all objective triangular areas to generate a predicted video-frame.

As shown in FIG. 20, there are 26 patterns of dividing an area by a triangle. A rectangular area of 16 by 16 pixels can be divided into 2 triangles (divisions) in 2 patterns, 5 triangles in 8 patterns and 8 triangles in 16 patterns.

These area-dividing patterns are given numerals 1 to 26 which are referred to as area-dividing pattern numbers. The variable-area predicted-frame generating portion 233 can output a predicted video-frame generated by the above-mentioned affine transformation as well as a predicted video-frame produced by translational displacement of rectangular areas. The prediction by parallel displacement uses only a representative motion vector for each objective rectangular area. The representative motion vector is considered to be located at a center of the rectangular area (not be necessary at vertex points for motion-vectors for affine-transformation). A predicted video-frame is generated in such a way that the location of a processable rectangular area within a video-frame is displaced by the representative motion-vector value and mapped on the reference video-frame, and the rectangular area thus determined on the reference video-image is presented as a predicted image for the processable rectangular area.

An average of four motion-vectors based on four control-grid-points corresponding to four corner points of a processable rectangular area can be also used as a representative motion-vector in place of the above-mentioned center motion-vector.

The area-dividing pattern deciding portion 234 determines a difference between the predicted video-frame outputted from the variable-area predicted-frame generating portion 233 and the input video-frame and judges the necessity of redividing the processable area to obtain a minimized error information amount.

The area-dividing pattern deciding portion 234 may use all or a part of 26 patterns shown in FIG. 20 as selectable area-dividing patterns. It may select a suitable pattern from a limited number of patterns, for example, 4 patterns Nos. 1, 3, 4 and 11 each of which includes triangles each having a hypotenuse directed from the upper right to the down left, or 4 patterns Nos. 2, 7, 9 and 26 each of which includes triangles each having a hypotenuse directed from the upper left to the down right or 8 patterns that are a combination of the above-mentioned patterns Nos. 1, 2, 3, 5, 7, 9, 11 and 26.

It is also possible to uses more finely dividing patterns (of more than 8 divisions) as selectable patterns. A unit rectangular area to be divided may be in size of other than 16 by 16 pixels, for example, 32 by 32 pixels or 8 by 8 pixels.

Furthermore, the area-dividing pattern deciding portion 234 selectively uses two kinds of predicted images, i.e., a predicted image produced by affine transformation of divided areas and a predicted image generated by translational displacement of rectangular areas by the predicted-frame generating portion 233. Accordingly, the area-dividing pattern deciding portion 234 may select a suitable pattern of dividing a processable area, which can minimize error information value, among 27 kinds of patterns which includes 26 patterns shown in FIG. 20 plus a pattern for translational displacement prediction. After determining a suitable area-dividing pattern minimizing an error-information value, the area-dividing pattern deciding portion 234 outputs a predicted video-frame to the subtracting portion 1211 and the adder portion 1215 and outputs motion-vector information and area-dividing information to the side-information coding portion 235. The side-information coding portion 235 encodes the motion vectors and the area-dividing information received from the area-dividing pattern deciding portion 234 and outputs the coded data as side-information.

The motion-compensated interframe predicting portion 1217 used in the video-coding device can output a series of predicted video-frames and side-information by repeating the above-described operations.

Figure 21:
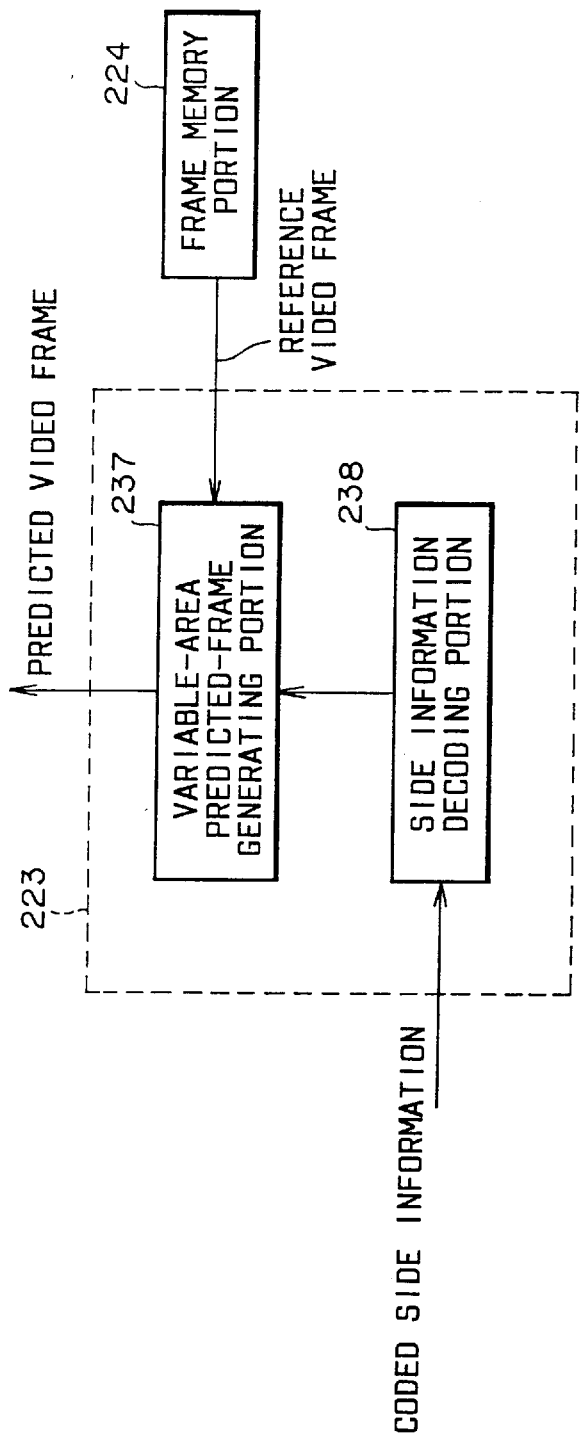
FIG. 21 shows an exemplified structure of a motion-compensated interframe predicting portion of a video decoding device embodying the present invention.

FIG. 21 shows an exemplified structure of a motion-compensated interframe-predicting portion 223 for use in a video-decoding device. In FIG. 21, numeral 237 designates a variable-area-size predicted-frame generating portion and numeral 238 designates a side-information decoding portion.

Coded side-information inputted into the motion-compensated interframe-predicting portion 223 is transferred to the side-information decoding portion 238.

The side-information decoding portion 238 decodes the received coded side-information, obtains basic vectors, additional vectors and area-dividing information and outputs the decoded side-information to the variable-area-size predicted-frame generating portion 237.

The variable-area-size predicted-frame generating portion 237 executes interframe prediction by using the motion vectors inputted from the side-information decoding portion 238 and a reference preceding video-frame inputted from a frame memory portion 224. At this time, the interframe prediction is conducted on each triangle into which an objective area was divided according to the area-dividing information.

The interframe prediction is to determine affine parameters from positions of three vertices of an objective triangular area and motion vectors and then to perform affine transformation on all pixels within the triangular area by using the determined affine parameters. This processing is repeated on all objective triangular areas to generate a predicted video-frame.

The variable-area-size predicted-frame generating portion 237 outputs a predicted video-frame generated by the above-mentioned affine transformation or a predicted video-frame produced by translational displacement of rectangular areas. The prediction by translational displacement is to map the location of a processable rectangular area within a video-frame onto a reference video-frame and displace it by a representative motion-vector value, taking the determined rectangular area on the reference video-frame as a predicted image for the processable rectangular area.

The variable-area predicted-frame generating portion 237 outputs the generated predicted video-frame to an adder portion 1222.

The motion-compensated interframe predicting portion 1217 used in the video-coding device outputs a series of predicted video-frames by repeating the above-described operations.

Figure 22A:
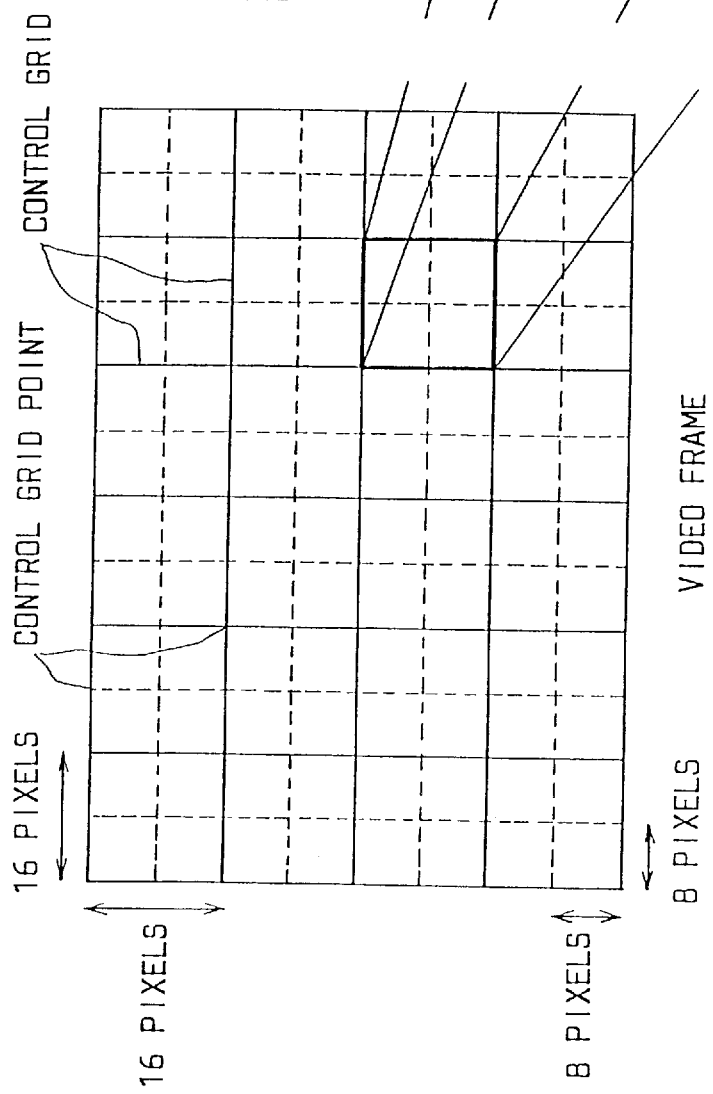
FIG. 22 is a view for explaining a control grid and a motion vector according to the present invention.
Figure 22B:
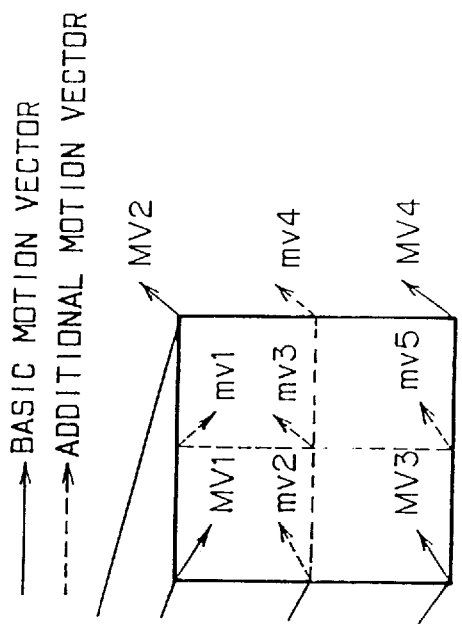

A motion vector searching system according to the present invention is as follows:

FIG. 22 is a view for explaining a control grid and motion vectors. Referring to FIG. 22, setting of control grid points is first explained as follows:

The present invention adopts a variable in size processable area for which control grid points are set as shown in FIG. 22.

In the instance of FIG. 22, control grid points are set for each unit area of 16 by 16 pixels and of 8 by 8 pixels.

In searching motion-vectors, weighting is conducted in the same way as the conventional searching method. In addition to this, the searching method according to the present invention uses effective-area selecting masks. Namely, valid and invalid parts of each processable area for weighting can be specified by using the effective-area selecting mask.

Figure 23:
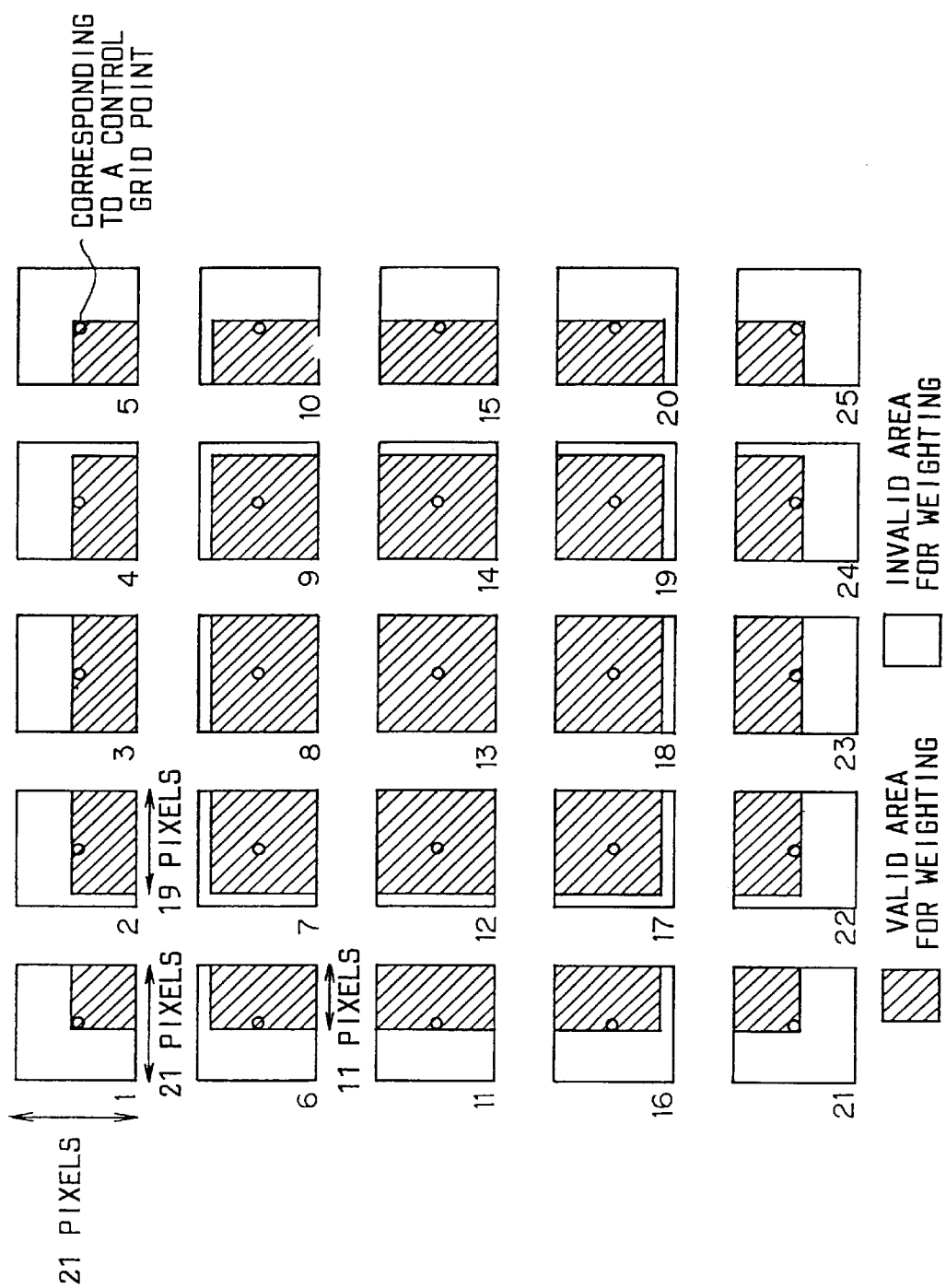
FIG. 23 shows all kinds of effective-area selecting masks according to the present invention.

FIG. 23 shows all kinds of effective-area selecting masks, which are selectively used depending upon locations of control grid points existing within a video-frame.

For example, mask 1 is used for searching a motion vector at an upper left control grid point whose coordinates are (0, 0).

Mask 2 is used for searching a motion vector at a control grid point of coordinates (8, 0), mask 3 for searching at a point of coordinates (16, 0), mask 6 for searching at a point of coordinates (0, 8), mask 7 for searching at a point of coordinates (8, 8), mask 8 for searching at a point of coordinates (8, 16), mask 12 for searching at a point of coordinates (0, 16), mask 13 for searching at a point of coordinates (8, 16). Similarly, masks 4, 5, 9, 10, 14, 16, 17, 18, 19, 20, 21, 22, 23, 24 and 25 are used at the left end and the down end of the video-frame.

As described above, searching of motion vectors according to the present invention is conducted using only a part of a processable area.

Two kinds of motion vector coding methods will be described below. In FIG. 22, there are shown motion vectors in a processable area:

(1) Method 1

Basic motion vectors (MV1–4) are encoded by encoding a difference of each vector value from just before encoded motion vector (this is the same as the conventional case).

Predicted values are determined from the basic motion vector (MV1–4) as follows and additional vectors (mv1–5) are encoded by coding differences from the respective predicted values.

PMV1, PMV2, PMV3, PMV4, PMV5 are predicted values of additional motion-vectors mv1, mv2, mv3, mv4 and mv5 respectively and have the following respective expressions:

PMV1=(MV1+MV2)/2

PMV2=(MV1+MV3)/2

PMV3=(MV1+MV2+MV3+MV4)/4

PMV4=(MV2+MV4)/2

PMV5=(MV3+MV4)/2

Differences between mv1, mv2, mv3, mv4 and mv5 and PMV1, PMV2, PMV3, PMV4, PMV5 are determined and encoded.

The differential values dmv1, dmv2, dmv3, dmv4 and dmv5 of the respective additional motion-vectors are expressed as follows:

dmv1=mv1–PMV1 dmv2=mv2–PMV2 dmv3=mv3–PMV3 dmv4=mv4–PMV4 dmv5=mv5–PMV5

(2) Method 2

Basic motion vectors (MV1–4) are encoded by encoding a difference of each vector value from just before encoded motion vector (this is the same as the conventional case).

An average of 4 basic motion vectors (MV1–4) is taken as a predicted value and differences of respective additional motion vectors (mv1–5) from the predicted value are determined and encoded.

PMV is a predicted value and has the following expression:

PMV=(MV1+MV2+MV3+MV4)/4

Differences of mv1, mv2, mv3, mv4 and mv5 from PMV are calculated and encoded respectively.

The differential values dmv1, dmv2, dmv3, dmv4 and dmv5 of the respective additional motion-vectors are expressed as follows:

dmv1=mv1–PMV dmv2=mv2–PMV dmv3=mv3–PMV dmv4=mv4–PMV dmv5=mv5–PMV

Two kinds of decoding methods for decoding basic motion vectors and additional motion vectors will be described as follows:

(1) Method 1

Basic motion vectors (MV1–MV4) are decoded by decoding a difference of each vector value from just before decoded motion vector (this is the same as the conventional case).

Additional motion vectors (mv1–5) are decoded as differences from the respective predicted values determined from the basic motion vector (MV1–4). The each differential value is added to a corresponding predicted value.

The predicted values are set as follows:

PMV1, PMV2, PMV3, PMV4, PMV5 are predicted values of additional motion vectors mv1, mv2, mv3, mv4 and mv5 respectively and have the following respective expressions:

PMV1=(MV1+MV2)/2

PMV2=(MV1+MV3)/2

PMV3=(MV1+MV2+MV3+MV4)/4

PMV4=(MV2+MV4)/2

PMV5=(MV3+MV4)/2

Differences between mv1, mv2, mv3, mv4 and mv5 and PMV1, PMV2, PMV3, PMV4, PMV5 are determined and decoded.

The decoded differential values dmv1, dmv2, dmv3, dmv4 and dmv5 of the respective additional motion-vectors are expressed as follows:

mv1=PMV1+dmv1 mv2=PMV2+dmv2 mv3=PMV3+dmv3 mv4=PMV4+dmv4 mv5=PMV5+dmv5

(2) Method 2

Basic motion vectors (MV1–4) are decoded as differences from respective just-before decoded motion-vectors (this is the same as the conventional case).

Additional motion vectors (mv1–5) are decoded as differences from a predicted value determined from basic motion vectors (MV1–4) and each of the decoded differences is added to the predicted value.

The predicted value is an average of 4 basic motion vectors like the case of encoding the motion vectors.

PMV is a predicted value and has the following expression:

PMV=(MV1+MV2+MV3+MV4)/4

The decoded differential values dmv1, dmv2, dmv3, dmv4 and dmv5 of the respective additional motion-vectors are expressed as follows:

mv1=PMV+dmv1
mv2=PMV+dmv2
mv3=PMV+dmv3
mv4=PMV+dmv4
mv5=PMV+dmv5

Another method for coding motion vectors is described as follows:

The above-described coding method encodes basic motion vectors and then encodes additional motion vectors by using information concerning the basic motion vectors whereas the coding method to be explained below can sequentially encode necessary motion vectors making no distinction of kinds of motion vectors.

Figure 24:
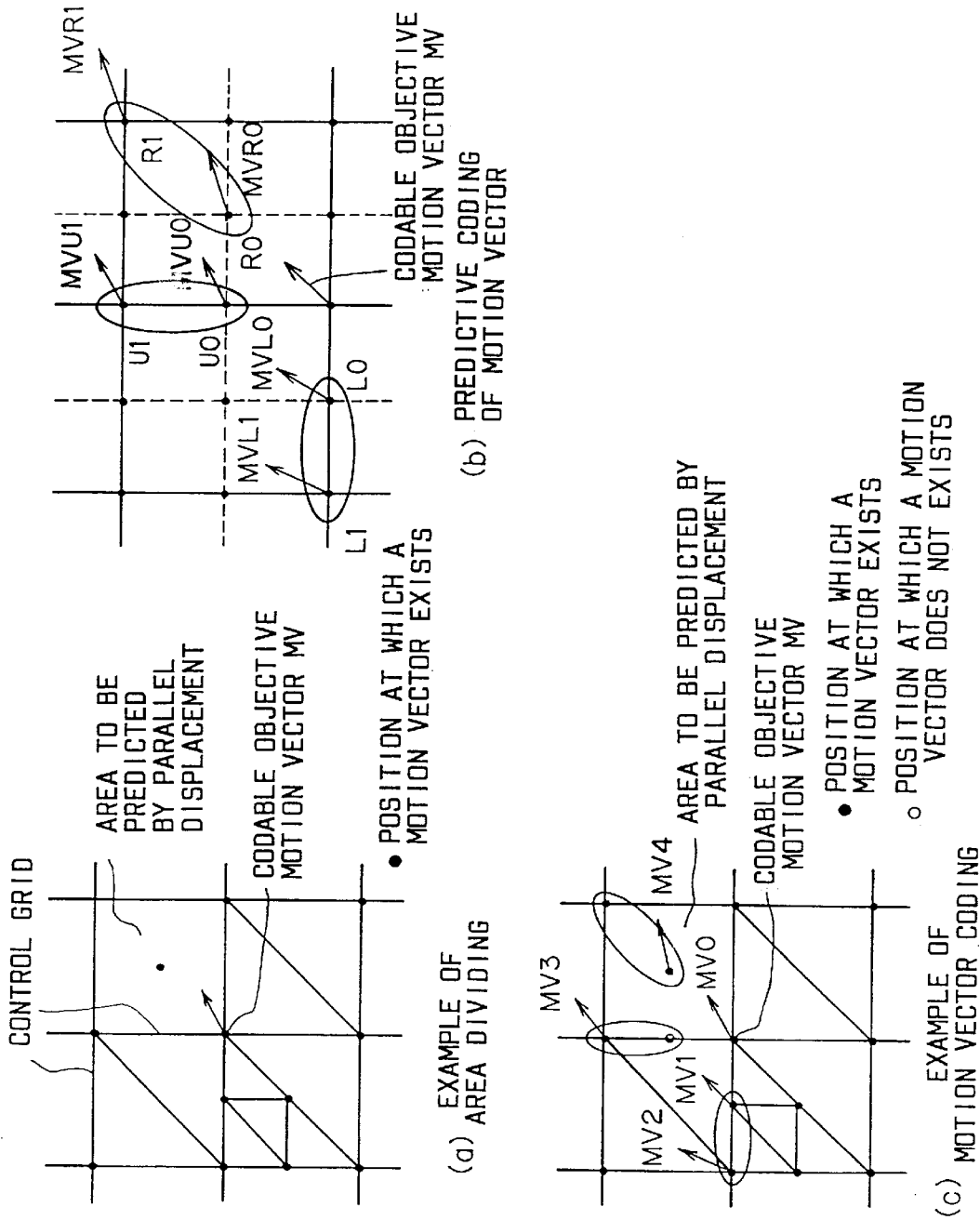
FIG. 24 is a view for explaining a motion-vector predictive coding method according to the present invention.

FIG. 24(a) illustrates an example of dividing a processable area according to the present invention. In FIG. 24(a), there are also shown positions of motion-vectors corresponding to control grid points within a divided processable area These motion vectors must be all encoded by the side-information coding portion 235 but other motion vectors are not encoded since they are not required for generating a predicted video-frame according to the area dividing pattern specified by the area-dividing pattern deciding portion 234. The video-coding device according to the present invention does not necessarily encode all motion vectors at all control grid points. Namely, necessary motion vectors and unnecessary motion vectors are identified by the result of dividing a coding video-frame area. This allows selective encoding only necessary motion vectors.

Referring to FIG. 24(b), a motion-vector coding method including how to determine predicted values of motion vectors is described as follows:

Motion vectors that exist on the left-side, just above and the upper right-side of an objective motion-vector are first determined for obtaining a predicted value for the objective motion-vector MV. The left-side motion vectors MVL0 and MVL1 at two positions L0 and L1 are examined. When only one of two motion vectors exists, said motion vector is decided as the left motion vector. When both motion vectors exist, one nearer to the objective motion vector, i.e., MVL0 is selected as the left motion vector. A suitable value, e.g., (0, 0) is determined as the left motion vector value if no motion-vector is found.

Similarly, the upper motion vector is determined as one of motion vectors MVU0 and MVU1 existing at two positions U0 and U1 respectively and the upper right motion vector is determined as one of MVR0 and MVR1 existing at two positions R0 and R1 respectively.

A predicted value of the codable object motion-vector is determined from three obtained motion vectors (left, upper and upper right vectors). The predicted value can be calculated by any one of the conventional methods, i.e., by calculating a mean value of three motion vectors or a median of three motion vectors. A difference between the obtained predicted value and the objective motion-vector value is determined and encoded same as the conventional method.

FIG. 24(c) shows an example of coding motion vectors in the area divided as shown in FIG. 24(b). As mentioned above, a left motion-vector MV1 (nearer than MV2), an upper motion-vector MV3 and an upper-right motion-vector MV4 are obtained for the objective motion-vector MV0.

A method for decoding coded motion vectors in the side-information decoding portion 238 of the video-decoding device according to the present invention will be explained as follows:

Three motion-vectors which were decoded and exist left, upper and upper right from an objective motion-vector, are determined in the same way as described for the case of encoding the motion vectors. These three motion-vectors are identical to those obtained by the coding side. Accordingly, a predicted value of the objective motion-vector, which is determined from said three motion-vectors, is identical to the predicted value obtained at the coding side. In the video-decoding device, the side-information decoding portion 238 decodes the coded input value representing a difference between the predicted value and the objective motion-vector value and adds the decoded difference value to the predicted value, thereby the objective motion-vector value can be reproduced.

Methods for coding and decoding area-dividing information are as follows:

In the case of encoding the area-dividing information, each area-dividing information is described with 5 bits since each information may take a numeral from 1 to 26 (number of area-dividing patterns).

However, variable-length coding can be conducted if probability of occurrence of patterns is non-uniformly distributed. Namely, area-dividing patterns that may occur at a high frequency are encoded with short-length codes and area-dividing patterns that may occur at a low frequency are coded with long-length codes.

In the case of decoding the area-dividing information, the coded area-dividing information is decoded by a variable-length decoding method.

The operation of the area-dividing pattern deciding portion 234 and related portions will be described below.

Figure 25:
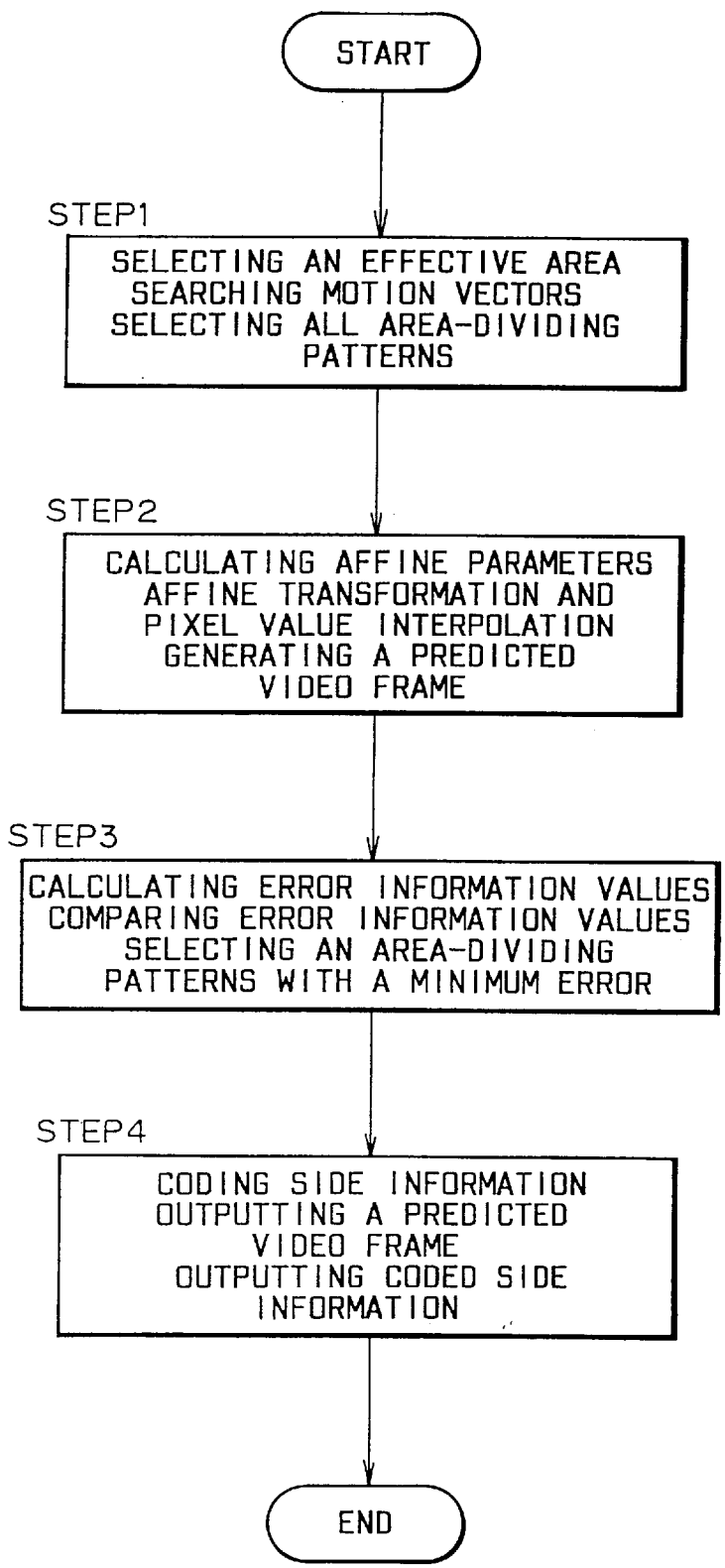
FIG. 25 is a flow chart showing a first example of processing operations of motion-compensated interframe prediction according to the present invention.
Figure 26:
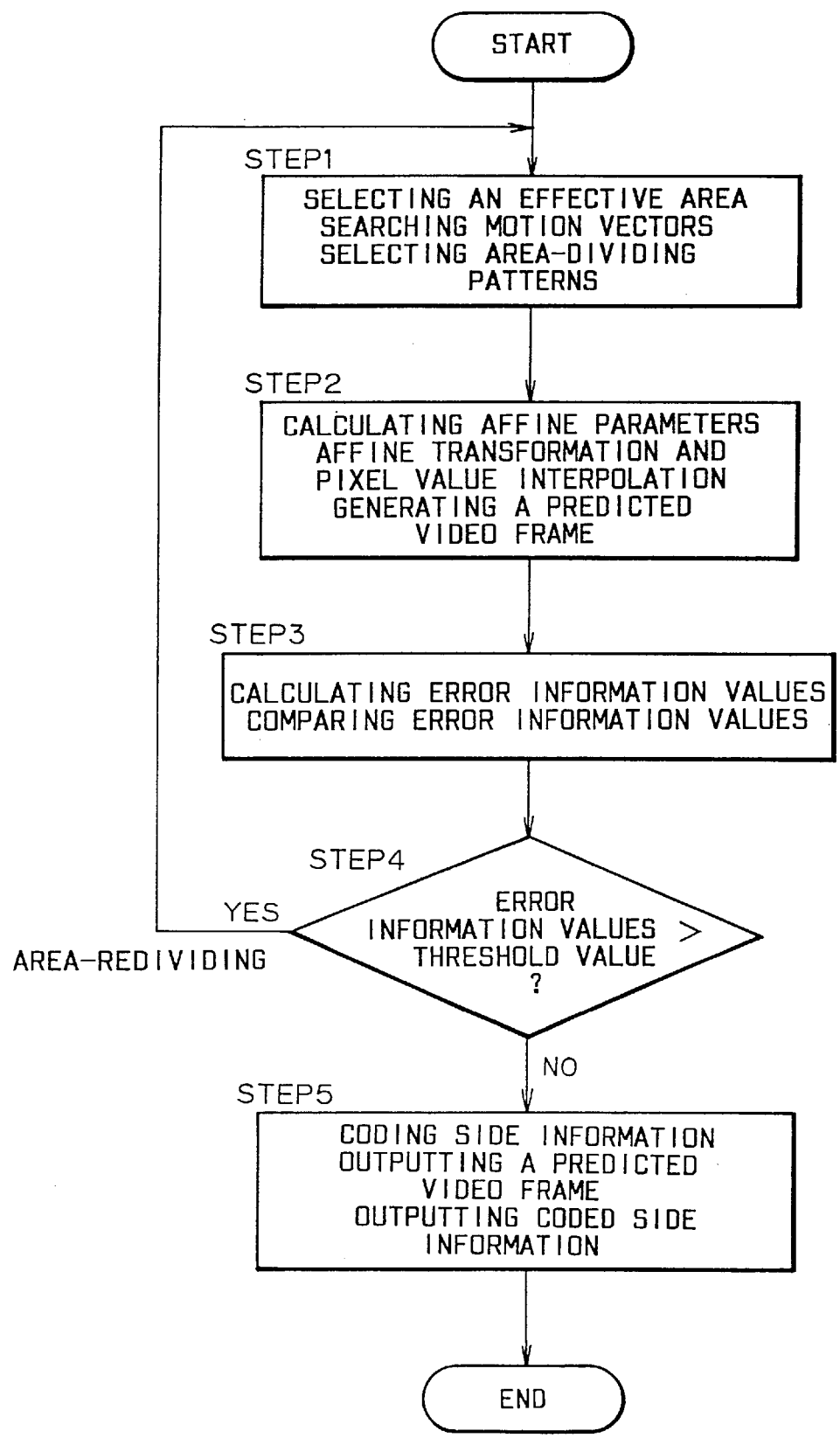
FIG. 26 is a flow chart showing a second example processing operations of motion-compensated interframe prediction according to the present invention.

FIG. 25 is a flow chart representing a sequence of operations for determining all error-information amount of all kinds of area dividing patterns and outputting an area-dividing pattern and motion vectors having a least amount of error-information. FIG. 26 is a flow chart representing a sequence of operations for judging the necessity of redividing an processable area by comparing error-information amount with a threshold value.

The flow chart of FIG. 25 is first described as follows:

An effective area for searching motion vectors is selected according to co-ordinates of control grid points and motion vectors thereof are searched (Step 1). All basic motion vectors and additional motion vectors are searched to provide the possibility of processing with all kinds of area-dividing patterns.

Affine parameters on each triangle of each area are determined and affine transformation and pixel-value interpolation are made for each area to generate a predicted video-frame (Step 2).

At this time, a predicted video-frame produced by translational displacement of rectangular areas is outputted together with the predicted video-frame produced by the affine transformation. The translational displacement prediction is such that a processable objective rectangular area within a video-frame is displaced by its representative motion-vector value and mapped onto a reference video-frame to determine a predicted area thereon. The determined area of the reference video-frame is then outputted as a predicted image.

An error-information amount is calculated for each area-dividing pattern, the calculation results are compared with each other and such an area-dividing pattern that may have a minimized amount of error-information is finally selected (Step 3).

As described before, the number of selectable area-dividing patterns may be 26 (all kinds of patterns shown in FIG. 20) or be limited to the specified number of patterns, e.g., 4 patterns No. 1, 3, 5, 11, or 4 patterns No. 2, 7, 9, 26, or 8 patterns No. 1, 2, 3, 5, 7, 9, 11 (a combination of the above-mentioned two groups)

As described before, a predicted image generated by affine transforming a divided area and a predicted image generated by translational displacement of a rectangular area may be used. Namely, it is possible to use 27 kinds of area patterns including 26 patterns of FIG. 20 and a predicted translational displacement image.

The number of the selected area-dividing pattern and necessary motion vectors (basic and additional motion vectors) are encoded and the predicted video-frame and the coded side-information are outputted (Step 4).

The flow chart of FIG. 26 is now explained as follows:

An effective area for searching motion vectors is selected according to co-ordinates of control grid points and motion vectors thereof are searched (Step 1). At this time, either of area-dividing patterns No. 1 and No. 2 is specified. (It is also possible to specify both patterns No. 1 and No. 2 and select either one having smaller amount of error-information as an initial set number.)

Affine parameters on each triangle of each area are determined and affine transformation and pixel-value interpolation are made for each area to generate a predicted video-frame (Step 2).

At this time, a predicted video-frame produced by translational displacement of rectangular areas is outputted together with the predicted video-frame produced by the affine transformation. The translational displacement prediction is such that a processable objective rectangular area within a video-frame is displaced by its representative motion-vector value and mapped onto a reference video-frame to determine a predicted area thereon. The determined area of the reference video-frame is then outputted as a predicted image.

An error-information amount is calculated for each area-dividing pattern and each calculation result is compared with a preset threshold value (Step 3). If the error-information amount exceeds the threshold value, the area-dividing pattern is changed by suitable one. A next processable area-dividing pattern-number is selected among all kinds of 26 patterns shown in FIG. 20 or from the limited number of area-dividing patterns, e.g., 4 patterns No. 1, 3, 5, 11, or 4 patterns No. 2, 7, 9, 26, or 8 patterns No. 1, 2., 3, 5, 7, 9, 11 (a combination of the above-mentioned two groups).

Any area-dividing pattern is adopted when its error-information amount does not exceed the threshold value (Step 4).

The number of the selected area-dividing pattern and necessary motion vectors (basic and additional motion vectors) are encoded and the predicted video-frame and the coded side-information are outputted (Step 5).

As is apparent from the foregoing description, the present invention offers the following advantages:

(1) This video-coding device is characterized in that it is provided with a variable-area predicted-frame generating portion for adaptively dividing a processable area according to motion-vectors and a reference video-frame for motion-compensated interframe prediction and generating a predicted video-frame by conducting affine transformation and an area-dividing pattern deciding portion for controlling dividing of a processable area and outputting a predicted video-frame and side-information such as motion vector information and area-dividing information and can realize dividing a processable area into an optimal pattern to meet the processable object size and shape, reducing an error-information amount and effective coding of a sequence of video-frames.

(2) This video-coding device is characterized in that it is provided with a variable-area predicted-frame generating portion for generating a predicted video-frame by parallel displacement of a processable area and generating a predicted video-frame by affine transformation of a processable area adaptively divided according to motion-vectors and a reference video-frame for motion-compensated interframe prediction and an area-dividing pattern deciding portion for controlling dividing of a processable area and outputting a predicted video-frame and side-information such as motion vector information and area-dividing information and can realize dividing a processable area into areas optimal to the processable object size and shape, preventing the decrease of prediction efficiency due to geometrical deformation peculiar to affine transformation, accurate representation of movement even in the case of including translational displacement of an area in an input video-image and effective coding of a sequence of video-frames with a reduced amount of error-information.

(3) This video-coding device is featured in that it is provided with an effective-area selecting portion for selecting a valid processing mask or an invalid processing mask depending upon location of an objective area in a video-frame when searching a motion vector and can more accurately search motion vectors at control grid points at periphery of a video-frame.

(4) This video-coding device corresponds to the video-coding device mentioned above (1) or (2) with the motion-vector searching system mentioned above (3) and can more accurately search motion vectors at control grid points at periphery of a video-frame and can achieve more efficient motion-compensated interframe prediction by using the motion vectors.

(5) This video-coding device has a side-information coding portion for encoding an additional motion vector as a difference from a mean of 4 basic motion-vectors and can save the number of codes used for encoding motion vectors.

(6) This video-coding device corresponds to the video-coding device with the motion-vector coding system mentioned above (5) and can save the number of codes used for encoding motion vectors, divide an objective area optimally to the object shape, prevent the decrease of prediction efficiency due to geometrical deformation peculiar to affine transformation, accurately represent the object movement even in the case of including translational displacement of an area in an input video-image and effectively encode a sequence of video-frames with a reduced amount of error-information.

(7) This video-coding device is featured in that it is provided with a side-information coding portion for encoding an additional motion vector positioned between two basic motion-vectors as a difference from a mean of the two basic motion-vectors and encoding a center additional motion-vector as a difference from a mean of four basic motion-vectors and can save the number of codes used for encoding motion vectors.

(8) This video-coding device has, in addition of the features mentioned above (1) or (2), a motion vector coding system mentioned above (7) and can save the number of codes for encoding motion vectors when coding side-information, optimally divide a processable area to meet the processable object size and shape, prevent the decrease of prediction efficiency due to geometrical deformation peculiar to affine transformation, accurately represent the objective movement even in the case of including translational displacement of an area in an input video-image and effectively encode a sequence of video-frames with a reduced amount of error-information.

(9) This video-coding device is provided with a side-information coding portion for encoding an objective motion-vector by prediction from values of three motion-vectors which are already encoded basic or additional motion-vectors existing at the left-side, the just upper-side and the upper right-side of the object motion vector and can effectively encode motion vectors, even though dispersively located in a video-frame, by using a two-dimensional correlation of motion vectors, realizing effectively saving the amount of codes used for coding the motion vectors.

(10) This video-coding device having the features mentioned above (9) is capable of determining a mean of the three motion vectors as a predicted value of the objective motion-vector and encoding a difference between the codable objective motion-vector and the predicted value and can effectively save the amount of codes necessary for coding motion vectors by effectively using a specified correlation of an objective motion vector with surrounding motion vectors.

(11) This video-coding device has the features mentioned above (9) and is capable of determining a median of the three motion vectors as a predicted value of the objective motion-vector and encoding a difference between the objective motion-vector and the predicted value and can effectively save the amount of codes necessary for coding motion vectors by prediction encoding of an objective motion vector by using a motion vector value having a high correlation with the motion vectors surrounding the objective motion vector.

(12) This video-coding device has the features mentioned above (1) or (2) and the motion-vector coding portion defined in any one of claims 9, 10 and 11 and can effectively encode motion vectors with a saved amount of codes, even though dispersively located in a video-frame, by using two-dimensional correlation of motion vectors when coding side-information, optimally divide a processable area to meet the processable object size and shape, prevent the decrease of prediction efficiency due to geometrical deformation peculiar to affine transformation, accurately represent the objective movement even in the case of including translational displacement of an area in an input video-image and effectively encode a sequence of video-frames with a reduced amount of error-information.

(13) This video-coding device has the features mentioned above any one of (1), (2), (4), (6), (8) and (12) and is further provided with an area-dividing pattern deciding portion for indicating kinds of dividing patterns of all areas to the variable-area predicted-frame generating portion, adopting an area-dividing pattern minimizing a predicted-error (error information value), outputting motion-vectors and area-dividing information to side-information coding portion and outputting a predicted video-frame. Accordingly, it can determine and output an optimal area dividing pattern minimizing the error-information amount by a single pass from all selectable patterns including translational displacement.

(14) This video-coding device has the features mentioned above any one of (1), (2), (4), (6), (8) and (12) and is further provided with an area-dividing pattern deciding portion which instructs the variable-area predicted-frame generating portion to divide a processable area into two small areas as an initial setting, instructs the the variable-area predicted-frame generating portion to more finely divide the area again if a predicted error (error information value) of a predicted-frame generated with the initial setting exceeds a preset threshold value, and which deciding portion outputs motion-vectors and area-dividing information to the side-information coding portion when the prediction error (error information value) became smaller than the preset threshold value, and also outputs a predicted video-frame. It can, therefore, determine and output a suitable area-dividing pattern with a relatively reduced amount of calculations.

(15) This video-coding device has the features mentioned above any one of (1), (2), (4), (13) and (14) and is further provided with: a motion-compensated interframe predicting portion for generating a predicted video-frame from an input video-frame and a reference video-frame received from a frame memory, outputting the predicted video-frame to a subtracting portion and an adder portion and outputting side-information; the subtracting portion for determining a difference between the input video-frame and the predicted video-frame received from the motion-compensated interframe-predicting portion and outputting an error (differential) video-frame to a video coding portion; the video-coding portion for encoding an error (differential) video-frame from the subtracting portion according to an instruction of the coding control portion and outputting a coded video information to a video-decoding portion; the video-decoding portion for decoding the coded video information received from the video coding portion and outputting a decoded video frame to the adder portion; the adder potion for adding the predicted video-frame received from the motion-compensated interframe-predicting portion to the decoded video-frame received from the video decoding portion and outputting an obtained reference video-frame to the frame memory: and the frame memory for storing the reference video-frame received from the adder portion and outputting the stored reference video-frame to the motion-compensated interframe-predicting portion. Accordingly, this device can more accurately search motion-vectors, optimally divide a processable area to the object size and shape, prevent the decrease of prediction efficiency due to geometrical deformation peculiar to affine transformation, accurately represent the object movement even in the case of including translational displacement of an area in an input video-image with a reduced amount of error-information and effectively encode a sequence of video-frames with a reduced amount of codes for coding motion vectors.

(16) This video-decoding device for reproducing a video-frame from a coded side-information inputted from a video-coding device and a reference video-frame inputted from a frame memory is featured in that a motion-compensated interframe-predicting portion for generating and outputting a predicted video-frame by changing a codable area-size is provided with a side-information decoding portion for decoding coded side-information received from the video coding device and obtaining thereby motion-vectors and area-dividing information and a variable-area predicted video-frame generating portion for generating a predicted video-frame by using motion vectors and area dividing information from the side-information decoding portion and a reference video-frame from the frame memory. Accordingly, this device can optimally divide a processable area to the object size and shape, accurately represent the object movement even in the case of including translational displacement of an area in an input video-image and effectively decode a sequence of video-frames with a reduced amount of error-information.

(17) This video decoding device can effectively decode coded motion vectors by using its side-information decoding portion for decoding four basic motion-vectors contained in the side-information before decoding motion-vectors and decoding additional motion-vectors representing a difference from a mean of the basic vectors.

(18) This video-decoding device has the features mentioned above (16) and the side-information decoding system mentioned above (17) and can effectively decode coded motion vectors, optimally divide a processable area to the object size and shape, accurately represent the object movement even in the case of including parallel displacement of an area in an input video-image and effectively decode a sequence of video-frames with a reduced amount of error-information.

(19) This video-decoding device can effectively decode coded motion vectors by using its side-information decoding portion for decoding four basic motion-vectors contained in the side-information before decoding motion-vectors and for decoding an additional motion-vector positioned between two basic motion-vectors as a difference from an obtained mean of the two basic motion-vectors and decoding a center additional motion-vector as a difference from an obtained mean of four basic motion-vectors;

(20) This video-decoding device has the features mentioned above (16) and the side-information decoding system defined in claim 19 and can effectively decode coded motion vectors, optimally divide a processable area to the object size and shape, accurately represent the object movement even in the case of including translational displacement of an area in an input video-image and effectively decode a sequence of video-frames with a reduced amount of error-information.

(21) This video-decoding device is provided with a side-information decoding portion which decodes an objective motion-vector value by prediction from values of three motion-vectors which are already decoded basic or additional motion-vectors existing at the left-side, the just upper-side and the upper right-side of the object motion vector. Accordingly, it can effectively decode vectors which were dispersively located in a video-frame and encoded with a saved amount of codes by using two-dimensional correlation of motion vectors.

(22) This video-decoding device has the features mentioned above (21) and is provided with a side-information decoding portion that determines a mean of the three motion-vectors as a predicted value of the objective motion-vector and obtains the decoded objective motion-vector value by adding the decoded difference value to the predicted value. Accordingly, it can effectively decode vectors which were encoded by effectively using a specified correlation of an objective motion vector with surrounding motion vectors.

(23) This video-decoding device has the features mentioned above (21) and is provided with a side-information decoding portion for determining a median of the three motion-vectors as a predicted value of the objective motion-vector and obtaining a decoded objective motion-vector value by adding the decoded difference value to the predicted value. It can effectively decode the objective motion vector that was predictively encoded by using a motion vector value having a high correlation with the motion vectors surrounding the objective motion vector.

(24) This video-decoding device has the features mentioned above (16) and is provided with the motion vector decoding system mentioned above any one of (21), (22) and (23). It can effectively decode motion vectors that were dispersively located in a video-frame and encoded by using two-dimensional correlation of motion vectors, optimally divide a processable area to meet the processable object size and shape, accurately represent the objective movement even in the case of including parallel displacement of an area in an input video-image and effectively decode a sequence of video-frames with a reduced amount of error-information.

(25) This video-decoding device has the features mentioned above any one of (16), (18), (20) and (24), and is further provided with a video-decoding portion for decoding a coded video-information inputted from a video coding device and outputting the decoded video-information, an adder portion for adding a decoded video-frame inputted from the video decoding portion to a predicted video-frame inputted from the motion-compensated interframe predicting portion and outputting an obtained video-frame as an output video-frame and a frame memory for storing a video-frame from the adder portion and for outputting said stored video-frame as a reference video-frame to the frame inputted from the motion-compensated interframe predicting portion. Accordingly, it can effectively decode coded motion vectors and coded areas optimally divided to the object size and shape, accurately represent the objective movement even in the case of including translational displacement of an area in an input video-image and effectively decode a sequence of video-frames with a reduced amount of error-information.

Referring to accompanying drawings, preferred embodiments of the present invention will be described as follows:

The general operation of video-coding and video-decoding devices according to the present invention is the same as described before for the conventional video-coding and video-decoding devices shown in FIGS. 5 and 6.

FIG. 5 illustrates an exemplified structure of the conventional video-coding device and FIG. 6 illustrates an exemplified structure of the conventional decoding device.

Accordingly, the operation of a motion-compensated interframe predicting portion of a video-coding device according to the present invention and the operation of a motion-compensated interframe predicting portion of a video-decoding device according to the present invention will be explained below.

Figure 27:
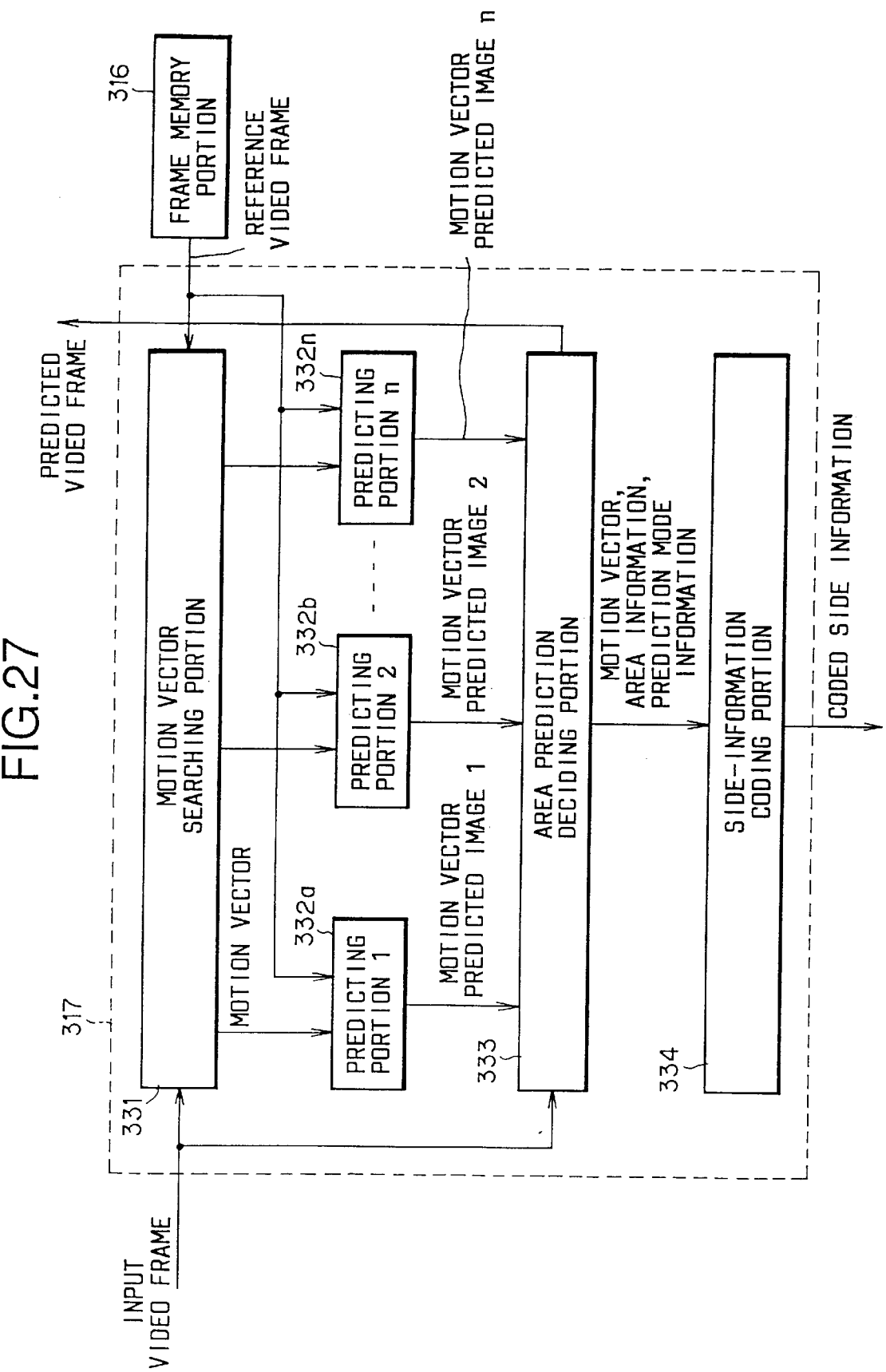
FIG. 27 shows an exemplified structure of a motion-compensated interframe-predicting portion of a video coding device according to the present invention.

Referring to FIG. 27, a motion-compensated interframe-predicting portion 317 for use in a video-coding device, which embodies the present invention, is described first as follows:

In FIG. 27, a motion-compensated interframe-predicting portion 317 for use in a video-coding device comprises a motion-vector searching portion 331, predicting portions 332a, 332b, . . . 332n, an area prediction deciding portion 333 and a side-information coding portion 334.

The motion-vector searching portion 331 searches motion on the input video-frame with reference to a reference video-frame received from memory frame portion 316 and outputs the found motion vectors to the predicting portions No. 1–n (332a–332n).

The predicting portions No. 1–n (332a–332n) which are different from each other by predicting methods, generate respective predictive images by executing different kinds (No. 1–n) of motion-compensated interframe prediction by using the motion vectors received from the motion-vector searching portion 331 and the reference video-frame received from the frame memory portion 316.

At this time, each of the predicting portions No. 1–n (332a–332n) divides the received reference video-frame into one or more small areas and performs interframe prediction processing operations on each of small areas which will be hereinafter referred to as processable or processed small areas.

Each of the predicting portions No. 1–n (332a–332n) transfers the produced predicted images (for one or more small processable areas) and the motion-vectors used for interframe prediction to the area prediction deciding portion 333.

The area prediction deciding portion 333 determines a difference of the input video-frame from each of the predictive images (No. 1–n) received from predicting portions No. 1–n (332a–332n), selects an optimal one (with a minimal error) of the predictive images differently predicted for each small processable area, and produces a predicted video-frame composed of the selected predictive small-areas images having the minimized error. The area prediction deciding portion 333 outputs the composed image as a predicted video-frame and transfers the side-information including motion vectors, area-information and prediction mode information, etc., to the side-information coding portion 334.

The side-information coding portion 334 encodes the side-information (motion vectors, area-information, prediction-mode information) received from the area prediction deciding portion 333 and outputs the coded side-information.

Figure 28:
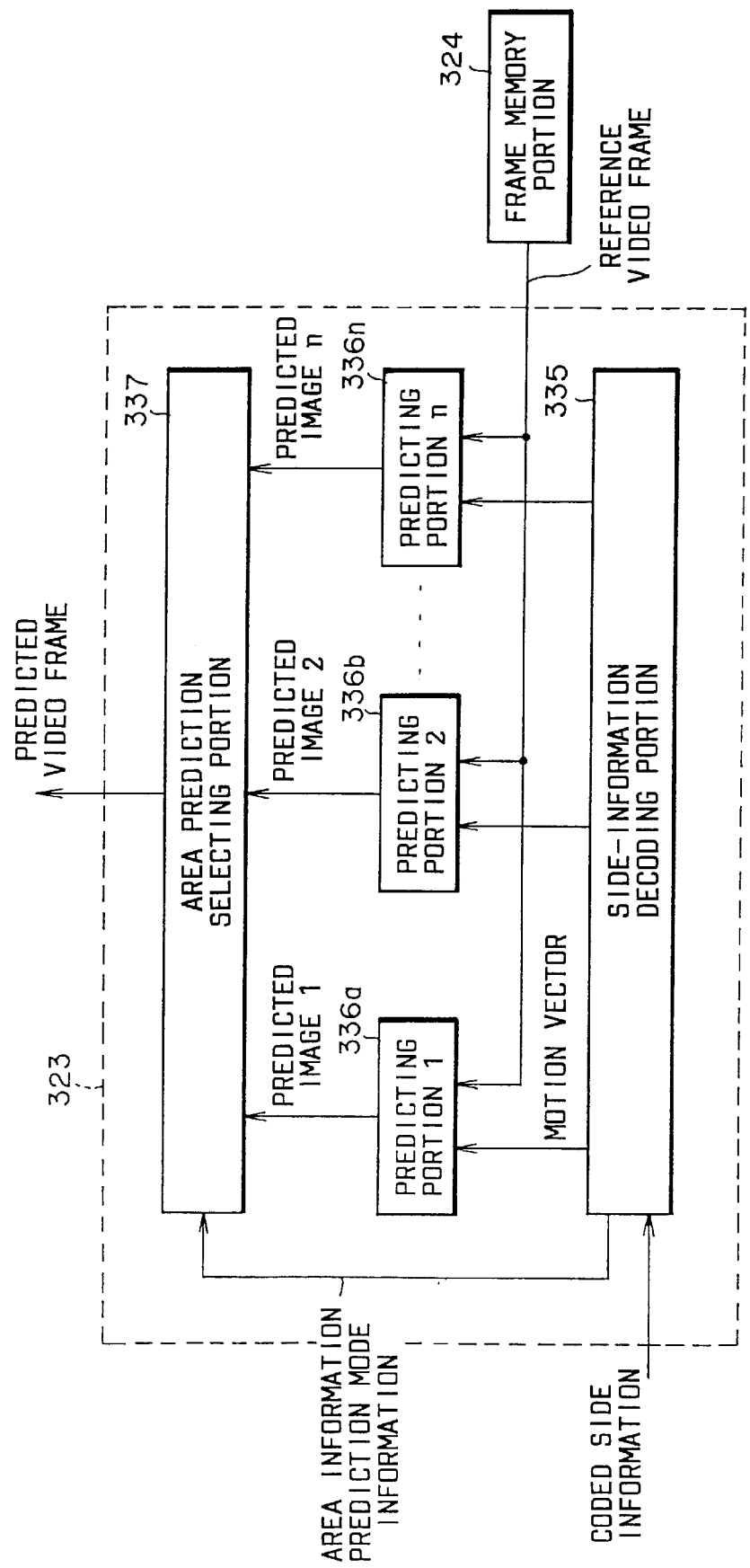
FIG. 28 shows an exemplified structure of a motion-compensated interframe-predicting portion of a video decoding device according to the present invention.

FIG. 28 shows an exemplified structure of a motion-compensated interframe-predicting portion 323 for use in a video-decoding device. In FIG. 28, numeral 335 denotes a side-information decoding portion, numeral 336a, 336b . . . 336n denote predicting portions 1, 2 . . . n respectively and numeral 337 denotes an area prediction selecting portion.

Coded side-information inputted into the motion-compensated interframe-predicting portion 323 is transferred to the side-information decoding portion 335.

The side-information decoding portion 335 decodes the received coded side-information, obtains motion vectors, area-information and prediction modes and supplies the motion vectors to the predicting portions No. 1–n (336a–336n) and outputs the area-information and prediction mode information to the area prediction selecting portion 337.

The predicting portions No. 1–n (336a–336n) which are different from each other by predicting methods, generate respective predictive images by executing different kinds (No. 1–n) of motion-compensated interframe prediction by using the motion vectors received from the side-information decoding portion 335 and the reference video-frame received from the frame memory portion 316. At this time, each of the predicting portions No. 1–n (336a–336n) divides the received reference video-frame into one or more small areas and perform the interframe-prediction processing operation on each of small areas.

Each of the predicting portions No. 1–n (336a–336n) transfers the produced predicted images (for one or more small processable areas) to the area prediction selecting portion 337.

The area prediction selecting portion 337 generates a predicted video-frame by selecting the predicted images No. 1–n received from the predicting portions No 1–n (336a–336n) according to the area-information and prediction mode information received from the side-information decoding portion 335. The area prediction selecting portion 337 outputs the thus obtained predicted video-frame.

Figure 29A:
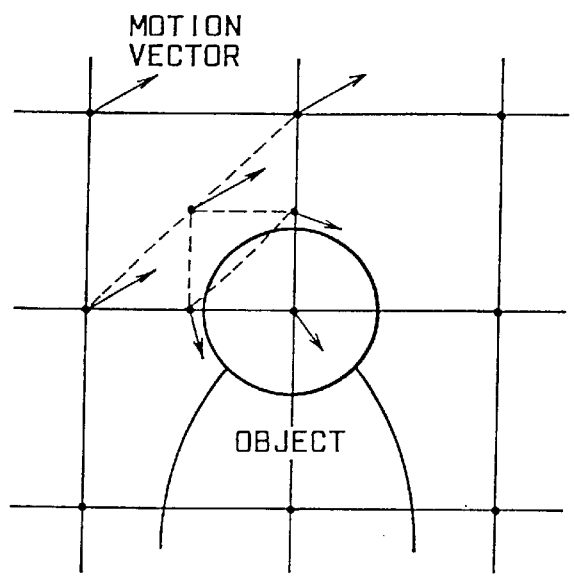
FIGS. 29A and 29B are a view for explaining an example of selecting a prediction method for an processable area.
Figure 29B:
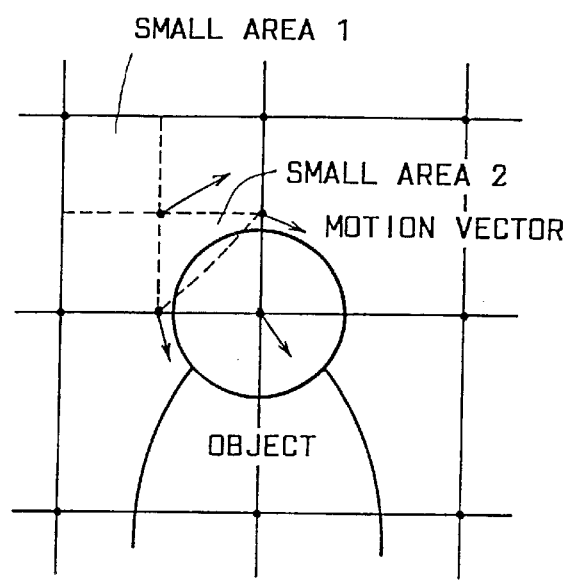

The predicting portion is described as follows:

FIGS. 29A and 29B show an example of selecting a prediction method.

Any conventional prediction system uses only one prediction method for motion-compensated interframe prediction for a certain area of an image. Therefore, it is apt to finely divide the area, resulting in increasing the amount of side-information (e.g., motion vectors) as shown in FIGS. 29A and 29B.

The prediction system according to the present invention divides an area of an image into small areas and applies different kinds of prediction methods to the small areas for motion-compensated interframe prediction.

As shown, for example, FIGS 29A and 29B, a small area 1 (netted) and a small area 2 consisting of two triangles are differently processed by applying different kinds of motion-compensated interframe prediction, i.e., the small area 1 is processed by block-displacement and the small area 2 is processed by affine transformation. In this instance, the small area 1 uses an upper left motion vector.

As apparent from FIG. 29A and 29B, the application of different kinds of motion-compensated interframe-prediction methods can reduce the number of necessarily used motion-vectors from 7 in FIG. 29A to 4 in FIG. 29B.

In the shown case, the predicting portion 1 (332a) divides a unit-area of 16 by 16 pixels into small areas and process each small area by the block displacement method for motion-compensated interframe prediction while the predicting portion 2 (332b) divides the unit-area into small areas and process each small area by the affine transformation method for motion-compensated interframe prediction.

As described above, the present invention makes it possible to process not only unit-size areas but areas of different sizes by applying different kinds of methods for motion-compensated interframe prediction, e.g., overlapped motion-compensative method, bilinear transformation method, background prediction method in addition to the above-mentioned block-displacement and affine transformation methods.

Figure 30A:
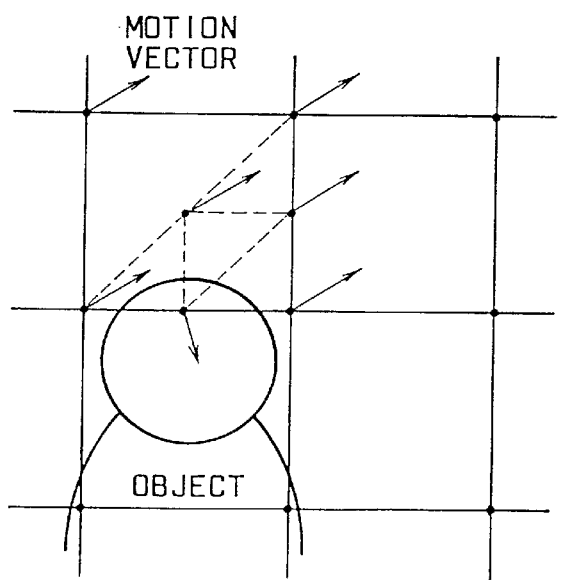
FIGS. 30A and 30B are a view for explaining an example of dividing a processable area.
Figure 30B:
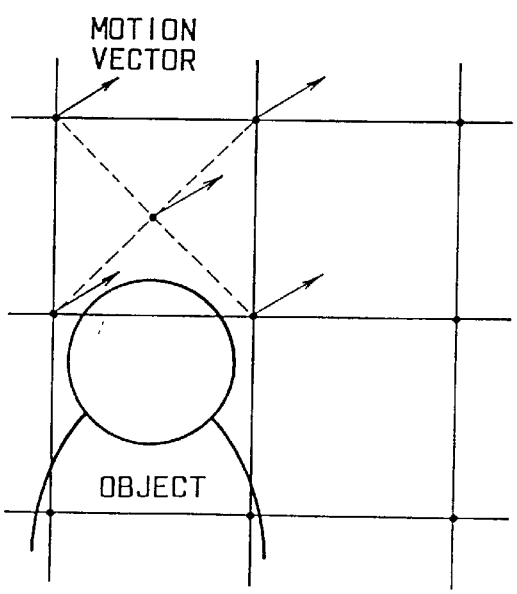
Figure 31:
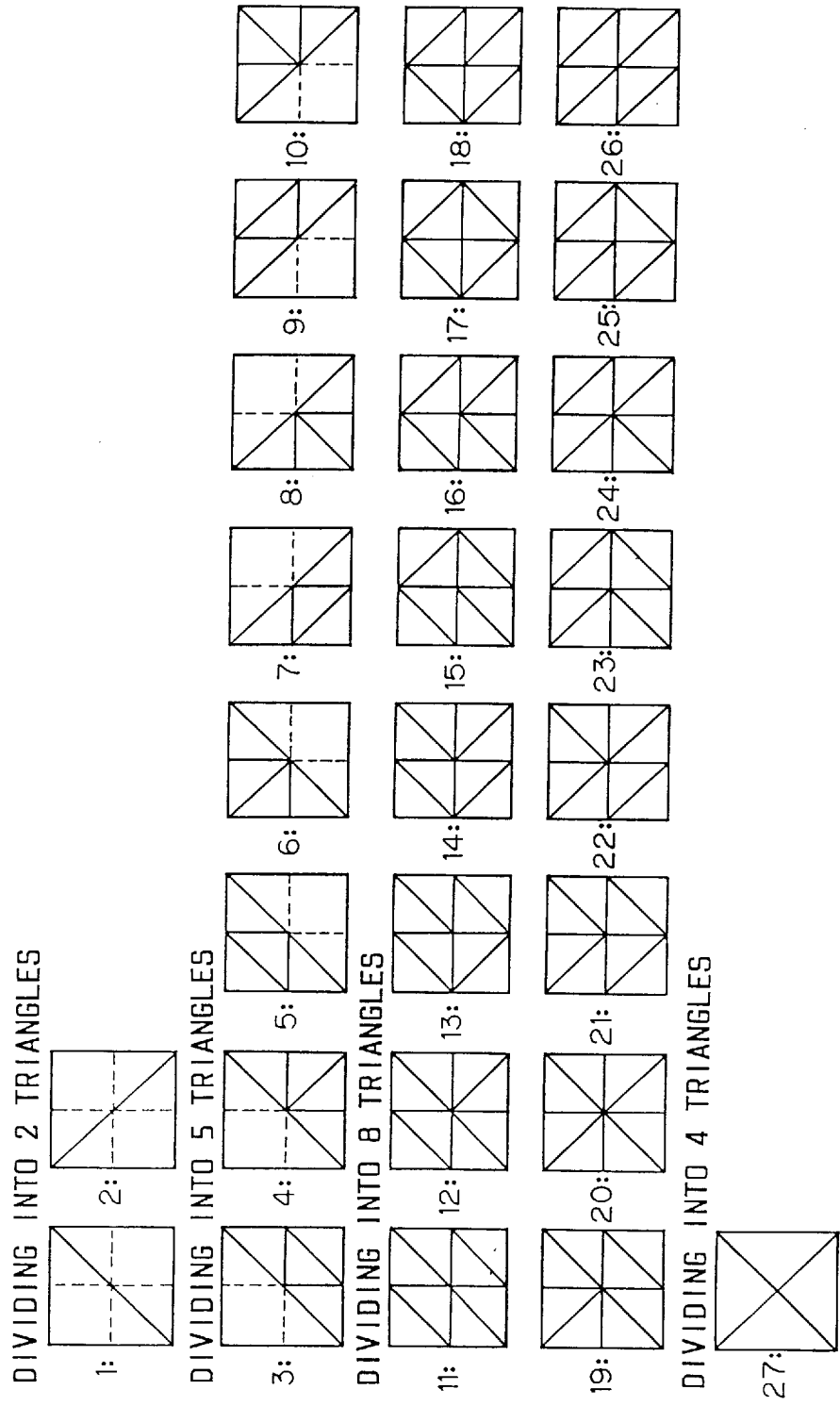
FIG. 31 is a view showing patterns for dividing an processable area into triangles.

A predicting portion that works by the affine-transformation method is described as follows:

FIG. 30A and 30B show an example of dividing an area in the case of conducting the motion-compensative interframe prediction by using the affine transformation technique. In the case of motion-compensated interframe prediction by the affine transformation, a unit area of 16 by 16 pixels is divided into a plurality of triangles to be processed. FIG. 31 shows examples of dividing a unit-area of 16 by 16 pixels into a plurality of triangular areas.

In conducting motion-compensated interframe-prediction of an object shown in FIGS. 30A and 30B by using the affine transformation, the area can be divided into 5 triangles as shown in FIG. 30A or it can be diagonally divided into 4 triangles as shown in FIG. 30B. As is apparent from two figures, the number of motion-vectors necessary for prediction processing can be reduced from 7 in the former usual case to 5 in the latter case.

Even in the case when an area is divided diagonally into a small number of subareas, e.g., four areas (in pattern 27 of FIG. 31) or two areas (in pattern 1 or 2 of FIG. 31), a sufficiently high efficiency of a video-frame prediction with a reduced amount of side-information (e.g., with the reduced number of motion vectors) can be achieved by generating a plurality of predictive images by applying different prediction methods to each small areas.

As is apparent from the foregoing description, the present invention offers the following advantageous effects:

(1) A video coding device comprises a predicting portion for generating a plurality of predictive images of small variable-size areas by applying different predicting methods to each of the small variable-size areas in the process of the motion-compensated interframe prediction and outputting the generated predictive images, an area prediction deciding portion for determining an adaptive area size and an adaptive prediction method according to a plurality of the predictive images received from the predicting portion and outputting side-information composed of area-information, prediction-mode information, motion-vectors and so on, and a side-information coding potion for encoding the side-information outputted from the area prediction deciding portion. Accordingly, this device can selectively use, among a plurality of prediction methods for motion-compensated interframe-prediction, an adaptive one to minimize the amount of side-information or prediction error value.

(2) A video coding device comprises a predicting portion for generating a plurality of predictive images of respective unit areas or further-divided subareas by applying different predicting methods to each of the unit areas or each of the subareas in the process of the motion-compensated interframe prediction and then outputting the generated predictive images, an area prediction deciding portion for determining an area-information indicating whether the predicted images received from the predicting portion are unit-area images or subarea images and prediction methods applied to the respective predicted images and outputting side-information including area-information, prediction mode information, motion-vectors and the like, and a side-information coding portion for encoding the side-information received from the area prediction deciding portion. Accordingly, the device can selectively use, among a plurality of prediction methods for motion-compensated interframe-prediction, an adaptive one to minimize the amount of side-information or prediction error value.

(3) A video coding device comprises a predicting portion for generating a plurality of predictive images of respective variable-size small areas by using a block-displacement (overlap motion-compensative) predicting method, an affine transform predicting method, bilinear transform predicting method and a background predicting method, etc. in the process of the motion-compensated interframe prediction and then outputting the generated predictive images, an area prediction deciding portion for determining an adaptive area-size and an adaptive prediction method from the predictive images received from the predicting portion and outputting side-information including area-information, prediction mode information and motion-vectors, etc., and a side-information coding portion for encoding the side-information received from the area prediction deciding portion. This device, therefore, can selectively use a plurality of prediction methods for motion-compensated interframe prediction coding so as to minimize the amount of side-information or prediction error value.

(4) A video coding device is provided with a predicting portion for diagonally dividing each encodable unit-area into two or four subareas, producing a predictive image for each subarea by affine transformation in the process of the motion-compensated interframe prediction and outputting the produced predicted images, and, therefore, can reduce the amount of the side-information (motion vectors and so on) or the prediction error value in accordance with the shape, size and location of an object in the video-frame. This could not be realized by the conventional system.

(5) A video coding device has the same functions as mentioned above any one of items (1), (2) and (3) and is provided with a predicting portion for diagonally dividing each encodable unit-area into two or four subareas, producing a predictive image for each subarea by affine transformation in the process of the motion-compensated interframe prediction and outputting the produced predicted images. Accordingly, the device can selectively use a plurality of prediction methods for motion-compensated interframe prediction coding so as to minimize the amount of side-information or prediction error value. It can also reduce the amount of the side-information (motion vectors and so on) or the prediction error value in accordance with the shape, size and location of an object in the video-frame. This could not be realized by the conventional system.

(6) A video decoding device comprises a side-information decoding portion for decoding coded side-information including area-information, prediction mode information and motion-vectors, etc. and outputting the decoded side-information, a predicting portion for generating a plurality of predictive images of small variable-size areas by applying different predicting methods to each of the small variable-size areas in the process of the motion-compensated interframe prediction and outputting the generated predictive images, and an area-prediction-mode selecting portion for generating an adaptive predictive image from a plurality of the predictive images received from the predicting portion according to the information received from the side-information decoding portion. Accordingly, this device can selectively use, among a plurality of prediction methods for motion-compensated interframe-prediction, an adaptive one to minimize the amount of side-information or prediction error value.

(7) A video decoding device comprises a side-information decoding potion for decoding coded side-information including area-information, prediction mode information and motion-vectors, etc. and outputting the decoded side-information, a predicting portion for generating a plurality of predictive images of respective decodable unit-areas or further-divided subareas by applying different predicting methods to each of the unit areas or each of the subareas in the process of the motion-compensated interframe prediction and then outputting the generated predictive images, and an area-prediction-mode selecting portion for generating an adaptive predictive image from a plurality of the predictive images received from the predicting portion according to the information received from the side-information decoding portion. Accordingly, this device can selectively use, among a plurality of prediction methods for motion-compensated interframe-prediction, an adaptive one to minimize the amount of side-information or prediction error value.

(8) A video decoding device comprises a side-information decoding potion for decoding coded side-information including area-information, prediction mode information and motion-vectors, etc. and outputting the decoded side-information, a predicting portion for generating a plurality of predictive images of respective decodable unit-area or further divided subareas by using a block-displacement (overlapped motion-compensative) predicting method, an affine transform predicting method, bilinear transform predicting method and a background predicting method, etc., in the process of the motion-compensated interframe prediction and then outputting the generated predictive images, and an area-prediction-mode selecting portion for generating an adaptive predictive image from a plurality of the predictive images received from the predicting portion according to the information received from the side-information decoding portion Accordingly, this device can selectively use, among a plurality of prediction methods for motion-compensated interframe-prediction, an adaptive one to minimize the amount of side-information or prediction error value.

(9) A video decoding device is provided with a predicting portion for diagonally dividing each decodable unit-area into two or four subareas, producing a predictive image for each subarea by affine transformation in the process of the motion-compensated interframe prediction and outputting the produced predicted images and, therefore, can reduce the amount of the side-information (motion vectors and so on) or the prediction error value in accordance with the shape, size and location of an object in the video-frame. This could not be realized by the conventional system.

(10) A video decoding device has the same functions as mentioned above any one of items (7) and (8) and is provided with a predicting portion for diagonally dividing each decodable unit-area into two or four subareas, producing a predictive image for each subarea by affine transformation in the process of the motion-compensated interframe prediction and then outputting the produced predicted images. Accordingly, the device can selectively use a plurality of prediction methods for motion-compensated interframe prediction coding so as to minimize the amount of side-information or prediction error value. It can also reduce the amount of the side-information (motion vectors and so on) or the prediction error value in accordance with the shape, size and location of an object in the video-frame. This could not be realized by the conventional system.

We claim:

1. A video-coding device for encoding predicted error information determined as a difference between an input video-frame and a predicted video-frame obtained by executing motion-compensated interframe prediction, wherein a motion-compensated interframe predicting portion is provided with a variable-area predicted-frame generating portion for dividing a processable area of the input video-frame into suitable areas according to motion vectors and a reference video-frame and generating a predicated video-frame by using a motion vector per pixel determined from the inputted motion vectors and an area dividing pattern deciding portion for controlling dividing of a processable area and outputting a predicted video-frame and side-information such as motion vectors and area-dividing information.

2. A video-coding device for encoding predicted error information determined as a difference between an input video-frame and a predicted video-frame obtained by executing motion-compensated interframe prediction, wherein a motion-compensated interframe predicting portion is provided with a variable-area predicted-frame generating portion for dividing a processable area of the input video-frame into suitable areas according to motion vectors and a reference video-frame and generating a predicated video-frame by using a motion vector per pixel determined from the inputted motion vectors and by translational displacement of processable areas and an area dividing pattern deciding portion for controlling dividing of a processable area and outputting a predicated video-frame and side-information such as motion vectors and area-dividing information.

* * * * *